United States Patent
Lim et al.

(10) Patent No.: US 12,549,301 B2
(45) Date of Patent: Feb. 10, 2026

(54) METHOD AND APPARATUS FOR TRANSMITTING/RECEIVING UPLINK DATA REPETITIONS FOR NETWORK COOPERATIVE COMMUNICATIONS

(71) Applicant: SAMSUNG ELECTRONICS CO., LTD., Suwon-si (KR)

(72) Inventors: Seongmok Lim, Suwon-si (KR); Youngrok Jang, Suwon-si (KR); Ameha Tsegaye Abebe, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 18/007,422

(22) PCT Filed: Jan. 18, 2022

(86) PCT No.: PCT/KR2022/000941
§ 371 (c)(1),
(2) Date: Jan. 30, 2023

(87) PCT Pub. No.: WO2022/154647
PCT Pub. Date: Jul. 21, 2022

(65) Prior Publication Data
US 2023/0344576 A1    Oct. 26, 2023

(30) Foreign Application Priority Data

Jan. 18, 2021 (KR) .................. 10-2021-0007048

(51) Int. Cl.
*H04L 5/00* (2006.01)
*H04L 1/08* (2006.01)
*H04W 72/232* (2023.01)

(52) U.S. Cl.
CPC .............. *H04L 5/0048* (2013.01); *H04L 1/08* (2013.01); *H04W 72/232* (2023.01)

(58) Field of Classification Search
CPC ......... H04L 5/0048; H04L 1/08; H04L 1/189; H04L 1/1893; H04L 1/1896;
(Continued)

(56) References Cited

U.S. PATENT DOCUMENTS

2019/0281588 A1    9/2019  Zhang et al.
2020/0252241 A1    8/2020  Park et al.
(Continued)

FOREIGN PATENT DOCUMENTS

EP          3923648 A1     12/2021
KR    10-2022-0053449 A     4/2022
(Continued)

OTHER PUBLICATIONS

Supplementary European Search Report dated Jan. 30, 2024, in connection with European Patent Application No. 22739839.3, 10 pages.
(Continued)

*Primary Examiner* — Dady Chery

(57) ABSTRACT

The present disclosure relates to a 5G or 6G communication system for supporting higher data transmission rates. According to an embodiment of the present disclosure, provided is a method performed in a communication system by a terminal. The method is characterized by comparing the steps of: receiving an RRC message comprising configuration information for a first SRS resource set and a second SRS resource set; receiving, from a base station, a DCI for indicating at least one of a first SRI or a second SRI on a PDCCH; and performing repetition of PUSCH transmission on the basis of at least one of the SRI indicated by the DCI, the first SRS resource set, or the second SRS resource set,
(Continued)

wherein the first SRI is associated with the most recent transmission before the PDCCH of the SRS resource identified by the first SRI in the first SRS resource set, and the second SRI is associated with the most recent transmission before the PDCCH of the SRS resource identified by the second SRI in the second SRS resource set.

15 Claims, 25 Drawing Sheets

(58) Field of Classification Search
CPC ... H04L 5/0044; H04L 5/0053; H04L 5/0094; H04L 5/0035; H04W 72/232; H04W 72/1268; H04B 7/06968; H04B 7/0456; H04B 7/0639; H04B 7/0617; H04B 7/024
See application file for complete search history.

(56) References Cited

U.S. PATENT DOCUMENTS

| | | | |
|---|---|---|---|
| 2022/0200752 A1* | 6/2022 | Matsumura | H04L 5/0048 |
| 2023/0104029 A1* | 4/2023 | Matsumura | H04W 72/23 370/329 |
| 2023/0189280 A1* | 6/2023 | Xu | H04B 7/0695 370/329 |

FOREIGN PATENT DOCUMENTS

| | | |
|---|---|---|
| KR | 10-2022-0053457 A | 4/2022 |
| WO | 2020122687 A1 | 6/2020 |

OTHER PUBLICATIONS

International Search Report and Written Opinion of the International Searching Authority dated Apr. 25, 2022, in connection with International Application No. PCT/KR2022/000941, 8 pages.
Qualcomm Incorporated, "Enhancements on Multi-TRP for PDCCH, PUCCH and PUSCH," 3GPP TSG-RAN WG1 Meeting #103-e, R1-2009251,e-Meeting, Oct. 26-Nov. 13, 2020, 33 pages.
ZTE, "Multi-TRP enhancements for PDCCH, PUCCH and PUSCH," 3GPP TSG RAN WG1?Meeting #103-, R1-2007764, e-Meeting, Oct. 26-Nov. 13, 2020, 22 pages.
Vivo, "Further discussion on enhancement of MTRP operation," 3GPP TSG RAN WG1 #103-e, R1-2007645, e-Meeting, Oct. 26-Nov. 13, 2020, 15 pages.
3GPP TS 38.214 V16.4.0 (Dec. 2020) 3rd Generation Partnership Project; Technical Specification Group Radio Access Network; NR; Physical layer procedures for data (Release 16); 169 pages.
Office Action issued Nov. 11, 2025, in connection with Korean Patent Application No. 10-2021-0007048, 9 pages.

* cited by examiner

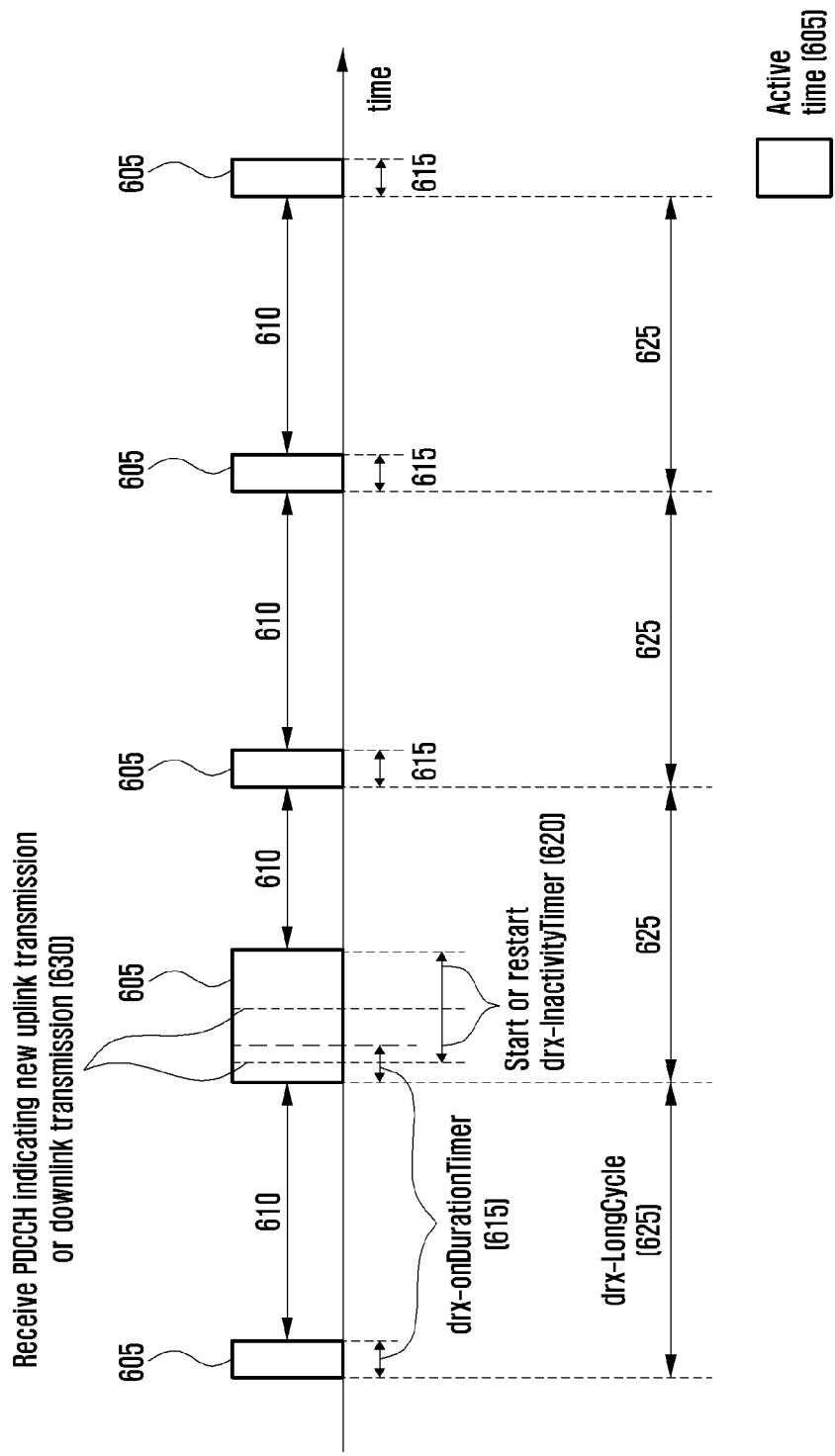

METHOD AND APPARATUS FOR TRANSMITTING/RECEIVING UPLINK DATA REPETITIONS FOR NETWORK COOPERATIVE COMMUNICATIONS

CROSS-REFERENCE TO RELATED APPLICATIONS

This application is a 371 of International Application No. PCT/KR2022/000941 filed on Jan. 18, 2022, which claims priority to Korean Patent Application No. 10-2021-0007048 filed on Jan. 18, 2021, the disclosures of which are herein incorporated by reference in their entirety.

BACKGROUND

1. Field

The disclosure relates to a method and an apparatus for performing data repetitive transmission and reception in a network cooperative communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The information is presented only as background information and is to help for understanding of the disclosure. A determination about which content of the disclosure can be applied as the prior art has not been made, and any argument has not been made.

SUMMARY

Various embodiments of the disclosure provide an apparatus and a method for effectively providing a service in a mobile communication system.

According to an embodiment of the disclosure, a method of a UE in a communication system is provided. The method includes: receiving a radio resource control (RRC) message including configuration information for a first sounding reference signal (SRS) resource set and a second SRS resource set from a BS; receiving downlink control information (DCI) indicating at least one of a first SRS resource indicator (SRI) or a second SRI from the BS through a physical downlink control channel (PDDCH); and performing repetition of physical uplink shared channel (PUSCH) transmission, based on at least one of the SRI indicated by the DCI, the first SRS resource set, or the second SRS resource set, wherein the first SRI is associated with the latest transmission before the PDCCH of SRS resources identified by the first SRI within the first SRS resource set and the second SRI is associated with the latest transmission before the PDCCH of SRS resources identified by the second SRI within the second SRS resource set.

According to an embodiment of the disclosure, a method of a BS in a communication system is provided. The method includes: transmitting a radio resource control (RRC) message including configuration information for a first sounding reference signal (SRS) resource set and a second SRS resource set to a UE; and transmitting downlink control information (DCI) indicating at least one of a first SRS resource indicator (SRI) or a second SRI to the UE through a physical downlink control channel (PDDCH), wherein at least one of the SRI indicated by the DCI, the first SRS resource set, or the second SRS resource set is used for repetition of physical uplink shared channel (PUSCH) transmission, the first SRI is associated with the latest transmission before the PDCCH of SRS resources identified by the first SRI within the first SRS resource set, and the second SRI is associated with the latest transmission before the PDCCH of SRS resources identified by the second SRI within the second SRS resource set.

According to an embodiment of the disclosure, a UE in a communication system is provided. The UE includes: a transceiver; and a controller connected to the transceiver and configured to receive a radio resource control (RRC) message including configuration information for a first sounding reference signal (SRS) resource set and a second SRS resource set from a BS, receive downlink control information (DCI) indicating at least one of a first SRS resource indicator (SRI) or a second SRI from the BS through a physical downlink control channel (PDDCH), and perform repetition of physical uplink shared channel (PUSCH) transmission, based on at least one of the SRI indicated by the DCI, the first SRS resource set, or the second SRS resource set, wherein the first SRI is associated with the latest transmission before the PDCCH of SRS resources identified by the first SRI within the first SRS resource set and the second SRI is associated with the latest transmission before the PDCCH of SRS resources identified by the second SRI within the second SRS resource set.

According to an embodiment of the disclosure, a BS in a communication system is provided. The BS includes: a transceiver; and a controller connected to the transceiver and configured to transmit a radio resource control (RRC) message including configuration information for a first sounding reference signal (SRS) resource set and a second SRS resource set to a UE and transmit downlink control information (DCI) indicating at least one of a first SRS resource indicator (SRI) or a second SRI to the UE through a physical downlink control channel (PDDCH), wherein at least one of the SRI indicated by the DCI, the first SRS resource set, or the second SRS resource set is used for repetition of physical uplink shared channel (PUSCH) transmission, the first SRI is associated with the latest transmission before the PDCCH of SRS resources identified by the first SRI within the first SRS resource set, and the second SRI is associated with the latest transmission before the PDCCH of SRS resources identified by the second SRI within the second SRS resource set.

According to various embodiments of the disclosure, a method of performing uplink data repetitive transmission and reception in a network cooperative communication system and an apparatus capable of performing the same are provided. According thereto, a more improved performance gain can be obtained.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF THE DRAWINGS

FIG. 6 illustrates an example of a discontinuous reception (DRX) operation in a wireless communication system according to various embodiments of the disclosure;

DETAILED DESCRIPTION

Figure 1:
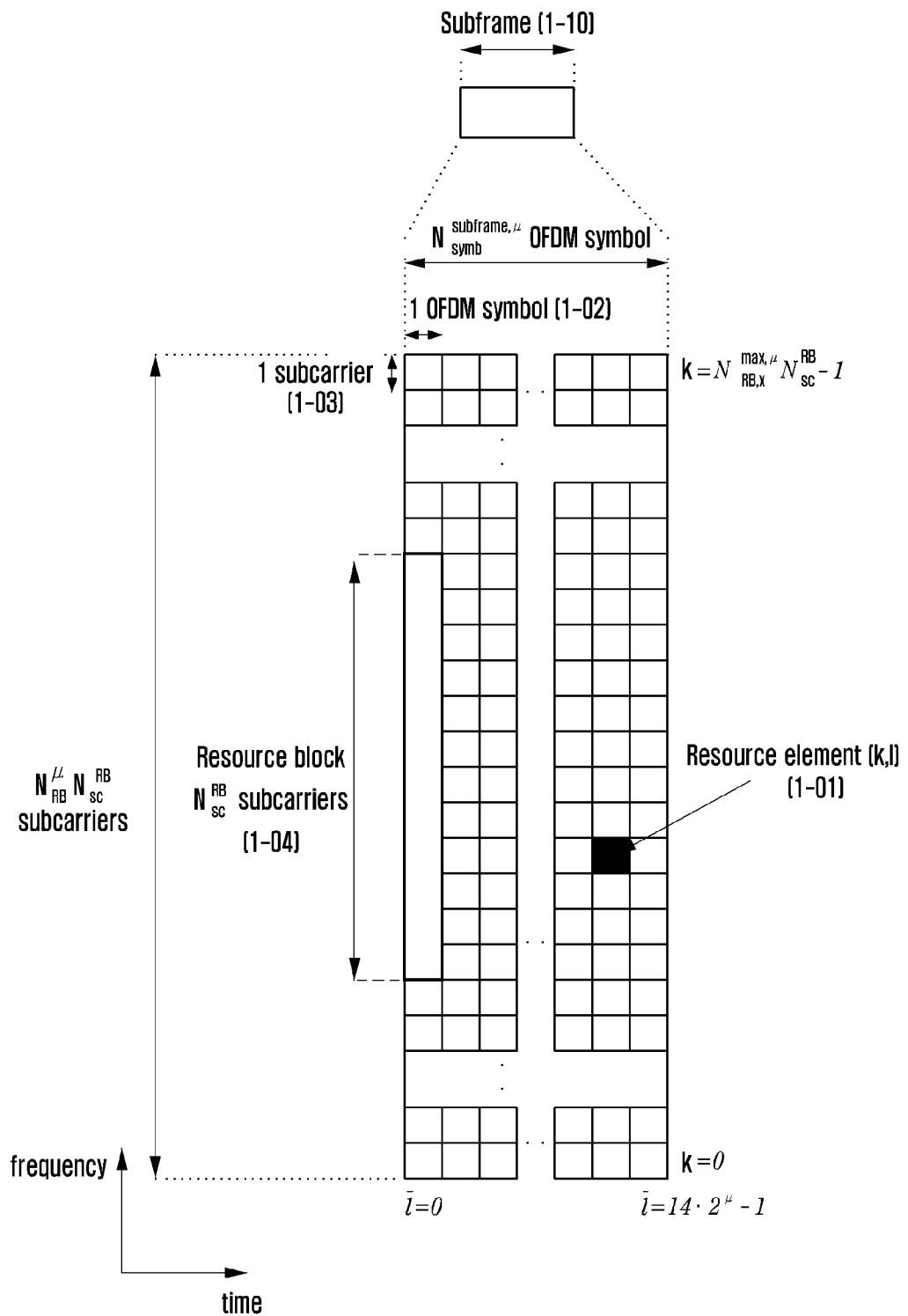
FIG. 1 illustrates a basic structure of time-frequency domains in a wireless communication system according to an embodiment of the disclosure.

Hereinafter, embodiments of the disclosure will be described in detail with reference to the accompanying drawings.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, in the embodiments, the "unit" may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10-15 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

Three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

[NR Time-Frequency Resources]

Hereinafter, a frame structure of the 5G system is described in more detail with reference to the drawings.

FIG. 1 illustrates a basic structure of a time-frequency domain which is a radio resource area in which data or a control channel is transmitted in a wireless communication system according to an embodiment of the disclosure.

In FIG. 1, a horizontal axis indicates a time domain and a vertical axis indicates a frequency domain. A basic unit of resources in the time and frequency domains is a resource element (RE) 1-01 and may be defined as 1 orthogonal frequency division multiplexing (OFDM) symbol 1-02 in the time axis and 1 subcarrier 1-03 in the frequency axis. In the frequency domain, $N_{sc}^{RB}$ (for example, 12) consecutive REs may constitute one resource block (RB) 1-04.

Figure 2:
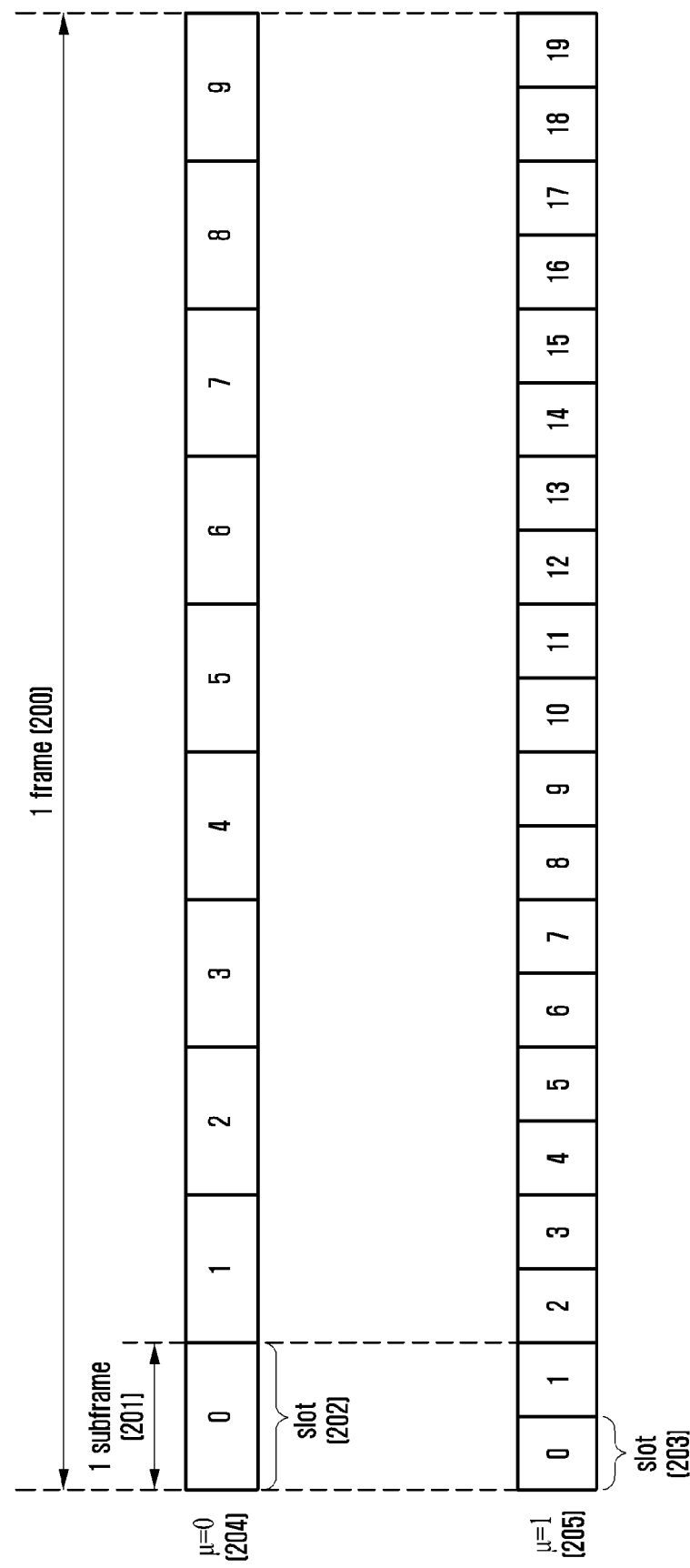
FIG. 2 illustrates frame, subframe, and slot structures in a wireless communication system according to an embodiment of the disclosure.

FIG. 2 illustrates a slot structure considered in a wireless communication system according to an embodiment of the disclosure.

In FIG. 2, an example of the structure of a frame 200, a subframe 201, and a slot 202 is illustrated. One frame 200 may be defined as 10 ms. One subframe 201 may be defined as 1 ms, and accordingly one frame 200 may include a total of 10 subframes 201. One slot 220 or 230 may be defined as 14 OFDM symbols (that is, the number of symbols ($N_{symb}^{slot}$) per slot=14). One subframe 210 may include one or a plurality of slots 220 or 230, and the number of slots 220 or 230 per subframe 201 may vary depending on a configuration value μ 204 or 205 for subcarrier spacing. In the example of FIG. 2, the cases in which the subcarrier spacing configuration values μ=0 204 and μ=1 205 are illustrated. One subframe 201 may include one slot 202 in the case of μ=0 204, and one subframe 201 may include two slots 203 in the case of μ=1 205. That is, the number of slots ($N_{slot}^{subframe,\mu}$) per subframe may be different according to the configuration value μ for subcarrier spacing, and accordingly, the number of slots ($N_{slot}^{frame,\mu}$) per frame may be different. $N_{slot}^{subframe,\mu}$ and $N_{slot}^{frame,\mu}$ according to each subcarrier spacing configuration μ may be defined as shown in [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, a configuration of a bandwidth part (BWP) in the 5G communication system will be described in detail with reference to the drawings.

Figure 3:
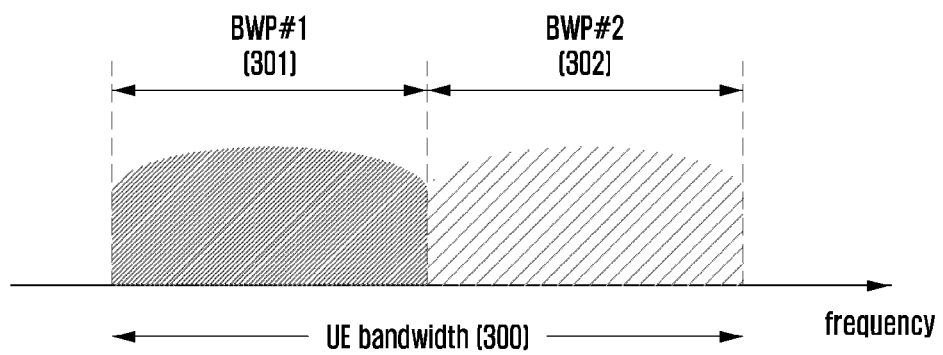
FIG. 3 illustrates an example of a configuration of the BWP in the wireless communication system according to an embodiment of the disclosure.

FIG. 3 illustrates an example of a configuration for a BWP in a wireless communication system according to an embodiment of the disclosure.

FIG. 3 shows an example in which a UE bandwidth 300 is configured as two bandwidth parts, that is, BWP #1 301 and BWP #2 302. The BS may configure one or a plurality of BWPs in the UE, and the following information may be configured to each BWP.

TABLE 2

| BWP ::= | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |

TABLE 2-continued

| cyclicPrefix | ENUMERATED { extended } |
|---|---|
| (cyclic prefix) | |
| } | |

Of course, the disclosure is not limited to the example, and various parameters related to a BWP as well as the configuration information may be configured in the UE. The information may be transmitted from to the UE by the BS through higher-layer signaling, for example, radio resource control (RRC) signaling. Among one or a plurality of configured BWPs, at least one BWP may be activated. Information indicating whether to activate the configured BWPs may be semi-statically transferred from the BS to the UE through RRC signaling or may be dynamically transferred through Downlink Control Information (DCI).

According to some embodiments, the UE before the radio resource control (RRC) connection may receive a configuration of an initial BWP for initial access from the BS through a master information block (MIB). More specifically, the UE may receive configuration information for a control resource set (CORESET) and a search space in which a PDCCH for receiving system information (remaining system information (RMSI) or system information block 1 (SIB1)) required for initial access through the MIB can be transmitted in an initial access step. Each of the CORESET and the search space configured through the MIB may be considered as an identity (ID) 0. The BS may inform the UE of configuration information such as frequency allocation information for control resource set #0, time allocation information, numerology, and the like through the MIB. Further, the BS may inform the UE of configuration information for a monitoring period and an occasion of control resource set #0, that is, configuration information for search space #0 through the MIB. The UE may consider a frequency region configured as control resource set #0 acquired from the MIB as an initial bandwidth part for initial access. At this time, the ID of the initial BWP may be considered as 0.

The configuration of the bandwidth part supported by 5G may be used for various purposes.

According to some embodiments, when a BWP supported by the terminal is smaller than the system BWP, the smaller BWP may be supported through the configuration of the BWP. For example, the BS may configure a frequency location (configuration information 2) of the BWP in the UE, and thus the UE may transmit and receive data at a specific frequency location within the system bandwidth.

According to some embodiments, the BS may configure a plurality of BWPs in the UE in order to support different numerologies. For example, in order to support the terminal to perform data transmission and reception using both subcarrier spacing of 15 kHz and subcarrier spacing of 30 kHz, two BWPs may be configured as subcarrier spacings of 15 kHz and 30 kHz, respectively. Different BWPs may be frequency-division-multiplexed, and when data is transmitted and received at particular subcarrier spacing, the BWP configured at the corresponding subcarrier spacing may be activated.

Further, according to some embodiments, the BS may configure BWPs having different sizes in the UE in order to reduce power consumption of the UE. For example, when the UE supports a very large bandwidth, for example, 100 MHz and always transmits and receives data through the corresponding bandwidth, very high power consumption may be generated. Particularly, monitoring an unnecessary downlink control channel through a large bandwidth of 100

MHz in the state in which there is no traffic is very inefficient from the aspect of power consumption. In order to reduce power consumption of the UE, the BS may configure a BWP having a relatively narrow bandwidth, for example, a bandwidth of 20 MHz. The UE may perform a monitoring operation in the bandwidth part of 20 MHz in the state in which there is no traffic, and if data is generated, may transmit and receive data through the bandwidth part of 100 MHz according to an instruction from the BS.

In a method of configuring the BWP, UEs before the RRC connection may receive configuration information for an initial bandwidth part through a master information block (MIB) in an initial access step. More specifically, the UE may receive a configuration of a control resource set (CORESET) for a downlink control channel in which downlink control information (DCI) for scheduling a system information block (SIB) can be transmitted from an MIB of a physical broadcast channel (PBCH). A bandwidth of the control resource set configured as the MIB may be considered as an initial bandwidth part, and the terminal may receive a physical downlink shared channel (PDSCH), in which the SIB is transmitted, through the configured initial bandwidth part. The initial BWP may be used not only for reception of the SIB but also other system information (OSI), paging, or random access.

[SS/PBCH Block]

Subsequently, a synchronization signal (SS)/PBCH block in 5G is described.

The SS/PBCH block may be a physical layer channel block including a primary SS (PSS), a secondary SS (SSS), and a physical broadcast channel (PBCH). A detailed description thereof is made below.

PSS: is a signal which is a reference of downlink time/frequency synchronization and provides some pieces of information of a cell ID.

SSS: is a reference of downlink time/frequency synchronization and provides the remaining cell ID information which the PSS does not provide. In addition, the SSS serves as a reference signal for demodulation of a PBCH.

PBCH: provides necessary system information required for transmitting and receiving a data channel and a control channel by the terminal. The necessary system information may include control information related to a search space indicating radio resource mapping information of a control channel, scheduling control information for a separate data channel for transmitting system information, and the like.

SS/PBCH block: includes a combination of PSS, SSS, and PBCH. One or a plurality of SS/PBCH blocks may be transmitted within a time of 5 ms, and each of the transmitted SS/PBCH blocks may be separated by an index.

The UE may detect the PSS and the SSS in an initial access stage and decode the PBCH. The UE may acquire an MIB from the PBCH and receive a configuration of control resource set (CORESET) #0 (corresponding to a control resource set having control resource set index 0) therefrom. The UE may monitor control resource set #0 on the basis of the assumption that the selected SS/PBCH block and a demodulation reference signal (DMRS) transmitted in control resource set #0 are quasi co-located (QCLed). The UE may receive system information through downlink control information transmitted in control resource set #0. The UE may acquire configuration information related to a random access channel (RACH) required for initial access from the received system information. The UE may transmit a physical RACH (PRACH) to the BS in consideration of the selected SS/PBCH block index, and the BS receiving the PRACH may acquire the SS/PBCH block index selected by the UE. The BS may know which block is selected by the UE from among the SS/PBCH blocks and that CORESET #0 related thereto is monitored.

[DRX]

FIG. 6 illustrates an example of a discontinuous reception (DRX) operation in a wireless communication system according to various embodiments of the disclosure.

DRX is an operation in which the UE using a service discontinuously receives data in an RRC-connected state in which a radio link is established between the BS and the UE. When DRX is applied, the UE may turn on a receiver at a specific time point and monitor a control channel, and when there is no data received for a predetermined period, turn off the receiver to reduce power consumption of the UE. The DRX operation may be controlled by a MAC layer device on the basis of various parameters and a timer.

Referring to FIG. 6, an active time 605 is a time during which the UE wakes up every DRX cycle and monitors a PDCCH. The active time 605 may be defined as follows.

drx-onDurationTimer or drx-InactivityTimer or drx-RetransmissionTimerDL or drx-RetransmissionTimerUL or ra-ContentionResolutionTimer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble drx-onDurationTimer, drx-InactivityTimer, drx-RetransmissionTimerDL, drx-RetransmissionTimerUL, ra-ContentionResolutionTimer, and the like are timers of which values are configured by the BS, and have functions configured to monitor a PDCCH by the UE in the state in which a predetermined condition is satisfied.

The drx-onDurationTimer 615 is a parameter for configuring a minimum time during which the UE is awake in a DRX cycle. The drx-InactivityTimer 620 is a parameter for configuring a time during which the UE is additionally awake when a PDCCH indicating new uplink transmission or downlink transmission is received as indicated by reference numeral 630. The drx-RetransmissionTimerDL is a parameter for configuring a maximum time during which the UE is awake in order to receive downlink retransmission in a downlink HARQ procedure. The drx-RetransmissionTimerUL is a parameter for configuring a maximum time during which the UE is awake in order to receive a grant of uplink retransmission in an uplink HARQ procedure. The drx-onDurationTimer, drx-InactivityTimer, drx-RetransmissionTimerDL, and drx-RetransmissionTimerUL may be configured as, for example, a time, the number of subframes, the number of slots, and the like. The ra-ContentionResolutionTimer is a parameter for monitoring a PDCCH in a random access procedure.

An inactive time 610 is a time in which no PDCCH monitoring is performed or a time in which no PDCCH reception is performed during the DRX operation, and the remaining time except for the active time 605 in the entire time in which the DRX operation is performed. When the PDCCH is not monitored during the active time 605, the UE may enter a sleep or inactive state and reduce power consumption.

The DRX cycle refers to a cycle on which the UE wakes up and monitors a PDCCH. That is, the DRX cycle is a time interval or a cycle of on duration from monitoring of the PDCCH to monitoring of the next PDCCH by the UE. The DRX cycle has two types such as a short DRX cycle and a long DRX cycle. The short DRX cycle may be optionally applied.

The long DRX cycle 625 is a longer cycle among the two DRX cycles configured in the UE. The UE starts the drx-onDurationTimer 615 at a time point at which the long DRX cycle 625 passes after a start point (for example, a start symbol) of the drx-onDurationTimer 615 while the long DRX cycle operates. In the operation of the long DRX cycle 625, the UE may start the drx-onDurationTimer 615 in a slot after drx-SlotOffset in a subframe that satisfies [Equation 1] below. Here, the drx-SlotOffset is a delay before the drx-onDurationTimer 615 starts. The drx-SlotOffset may be configured as, for example, a time, the number of slots, or the like.

$$[(SFN \times 10)+\text{subframe number}] \text{modulo}(drx-\text{Long-Cycle})=drx=\text{StartOffset} \quad [\text{Equation 1}]$$

The drx-LongCycleStartOffset and drx-StartOffset may be used to define a subframe for starting the Long DRX cycle 625. The drx-LongCycleStartOffset may be configured as, for example, a time, the number of subframes, the number of slots, or the like.

[PDCCH: Related to DCI]

Subsequently, downlink control information (DCI) in a 5G system will be described in detail.

In the 5G system, scheduling information for uplink data (or a physical uplink data channel (physical uplink shared channel (PUSCH)) or downlink data (or physical downlink data channel (physical downlink shared channel (PDSCH)) is transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a Physical Downlink Control Channel (PDCCH) via a channel coding and modulation process. A cyclic redundancy check (CRC) may be added to a DCI message payload and may be scrambled by a radio network temporary identifier (RNTI) corresponding to the identity of the UE. Depending on the purpose of the DCI message, for example, UE-specific data transmission, a power control command, a random access response, or the like, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled with a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, the following information.

TABLE 3

Identifier for DCI formats - [1] bit
Frequency domain resource assignment -$\lceil \log_2(N_{RB}^{UL, BWP}(N_{RB}^{UL, BWP} +1)/2) \rceil$ ] bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
- Uplink (UL)/supplementary UL (SUL) indicator - 0 or 1 bit DCI format 0_1 may be used for non-fallback DCI for scheduling a PUSCH in which case the CRC may be scrambled by a C-RNTI. DCI format 0_1 in which the CRC is scrambled by the C-RNTI may include, for example, the following information.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2) \rceil$ bits
Time domain resource assignment –1, 2, 3, or 4 bits
Virtual resource block (VRB)-to-physical resource block (PRB) mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits SRS resource indicator $\left\lceil \log_2\left(\sum_{k=1}^{L_{max}} \binom{N_{SRS}}{k}\right)\right\rceil$ or $\lceil \log_2(N_{SRS})\rceil$ bits $\left\lceil \log_2\left(\sum_{k=1}^{L_{max}} \binom{N_{SRS}}{k}\right)\right\rceil$ bits for non−codebook based PUSCH transmission;

$\lceil \log_2(N_{SRS})\rceil$ bits for codebook based PUSCH transmission.
Precoding information and number of layers -up to 6 bits
Antenna ports - up to 5 bits
SRS request - 2 bits
Channel state information (CSI) request - 0, 1, 2, 3, 4, 5, or 6 bits
Code block group (CBG) transmission information - 0, 2, 4, 6, or 8 bits
Phase tracking reference signal (PTRS)-demodulation reference signal (DMRS) association - 0 or 2 bits.
beta_offset indicator - 0 or 2 bits
  DMRS sequence initialization - 0 or 1 bit DCI format 1_0 may be used for fallback DCI for scheduling a PDSCH in which case the CRC may be scrambled by a C-RNTI. DCI format 1_0 in which the CRC is scrambled by the C-RNTI may include, for example, the following information.

TABLE 5

Identifier for DCI formats - [1] bit
Frequency domain resource
assignment -[[$\log_2(N_{RB}^{DL,\,BWP}(N_{RB}^{DL,\,BWP}+1)/2)$]] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
- PDSCH-to-HARQ feedback timing indicator - [3] bits DCI format 1_1 may be used for non-fallback DCI for scheduling a PDSCH in which case the CRC may be scrambled by a C-RNTI. DCI format 1_1 in which the CRC is scrambled by the C-RNTI may include, for example, the following information.

TABLE 6

Carrier indicator - 0 or 3 bits
Identifier for DCI formats - [1] bits
Bandwidth part indicator - 0, 1 or 2 bits
Frequency domain resource assignment
For resource allocation type 0, [$N_{RB}^{DL,\,BWP}/P$] bits
For resource allocation type 1, [$\log_2(N_{RB}^{DL,\,BWP}(N_{RB}^{DL,\,BWP}+1)/2)$] bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 0 or 1 bit
Rate matching indicator - 0, 1, or 2 bits
Zero power (ZP) channel state information (CSI)-reference signal (RS) trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
Code block group (CBG) flushing out information - 0 or 1 bit
- DMRS sequence initialization - 1 bit

[PDCCH: CORSET, REG, CCE, Search Space]

Hereinafter, the downlink control channel in the 5G communication system will be described in more detail with reference to the drawings.

Figure 4:
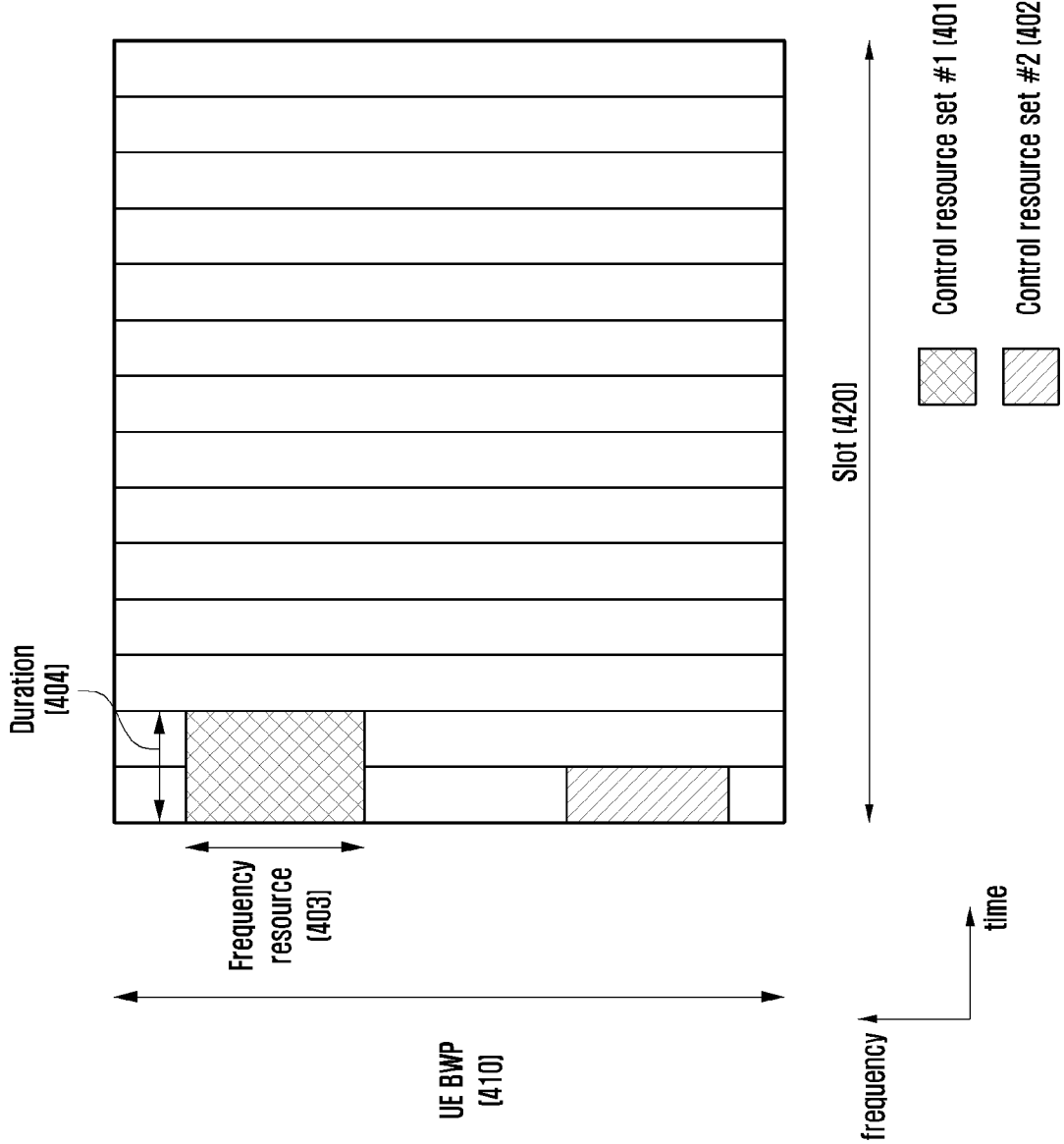
FIG. 4 illustrates an example of a configuration of a control resource set of a downlink control channel in a wireless communication system according to an embodiment of the disclosure.

FIG. 4 illustrates an example of configuring a control resource set (CORESET) in which a downlink control channel is transmitted in the wireless communication system according to an embodiment of the disclosure. FIG. 4 illustrates an example in which a UE bandwidth part 410 is configured in the frequency axis and two control resource sets (control resource set #1 401 and control resource set #2 402) are configured within one slot 420 in the time axis. The control resource sets 401 and 402 may be configured in specific frequency resources 403 within a total UE BWP 410 in the frequency axis. The control resource set may be configured as one or a plurality of OFDM symbols in the time axis, which may be defined as a control resource set duration 404. Referring to the example illustrated in FIG. 4, control resource set #1 401 may be configured as a control resource set duration of 2 symbols, and control resource set #2 402 may be configured as a control resource set duration of 1 symbol.

The resource control set in 5G may be configured in the UE by the BS through higher-layer signaling (for example, system information, a master information block (MIB), or radio resource control (RRC) signaling). Configuring the control resource set in the UE may mean providing information such as a control resource set identity, a frequency location of the control resource set, and a symbol length of the control resource set. For example, the following information may be included.

TABLE 7

| | |
|---|---|
| ControlResourceSet ::= | SEQUENCE { |
| Corresponds to L1 parameter 'CORESET-ID' | |
| controlResourceSetId | ControlResourceSetId, |
| (control resource set identity) | |
| frequencyDomainResources | BIT STRING (SIZE (45)), |
| (frequency axis resource allocation information) | |
| duration | INTEGER |
| (1..maxCoReSetDuration), | |
| (time axis resource allocation information) | |
| cce-REG-MappingType | CHOICE { |
| (CCE-to-REG mapping scheme) | |
| interleaved | SEQUENCE { |
| reg-BundleSize | ENUMERATED |
| {n2, n3, n6}, | |
| (REG bundle size) | |
| precoderGranularity | ENUMERATED |
| {sameAsREG-bundle, allContiguousRBs}, | |
| interleaverSize | ENUMERATED |
| {n2, n3, n6} | |
| (interleaver size) | |
| shiftIndex | |
| INTEGER(0..maxNrofPhysicalResourceBlocks-1) | |
| OPTIONAL | |
| (interleaver shift) | |
| }, | |
| nonInterleaved | NULL |
| }, | |
| tci-StatesPDCCH | SEQUENCE(SIZE |
| (1..maxNrofTCI-StatesPDCCH)) OF TCI-StateId | |
| OPTIONAL, | |
| (QCL configuration information) | |
| tci-PresentInDCI | ENUMERATED {enabled} |
| OPTIONAL,  -- Need S | |
| } | |

In [Table 7], tci-StatesPDCCH (hereinafter, referred to as a transmission configuration indication (TCI) state) configuration information may include information on one or a plurality of synchronization signal (SS)/physical broadcast channel (PBCH) block indexes or channel state information reference signal (CSI-RS) indexes having the quasi co-located (QCL) relationship with a DMRS transmitted in the corresponding CORESET.

Figure 5A:
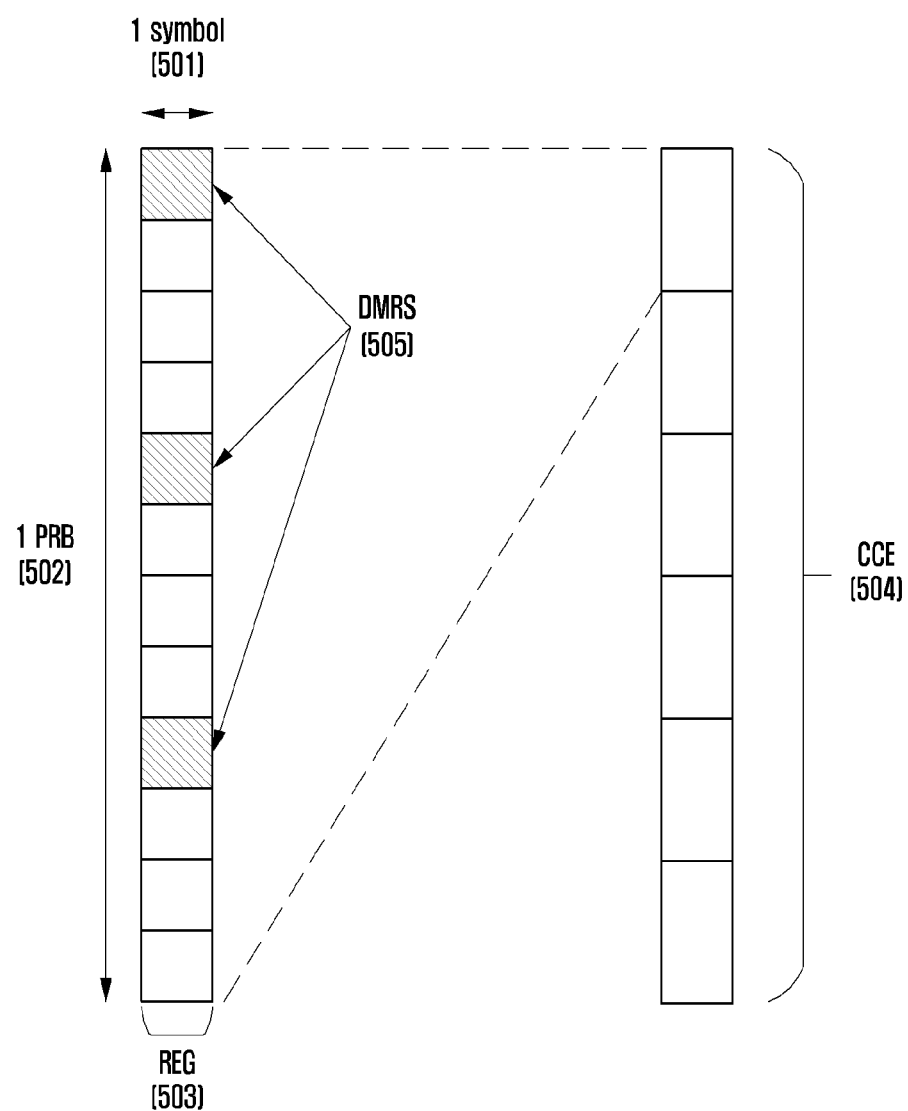
FIG. 5A illustrates a structure of a downlink control channel in a wireless communication system according to an embodiment of the disclosure.

FIG. 5A illustrates a structure of a downlink control channel in a wireless communication system according to an embodiment of the disclosure.

Referring to FIG. 5A, the basic unit of time and frequency resources included in the control channel may be a resource element group (REG) 503, and the REG 503 may be defined as one OFDM symbol 501 in the time axis and one physical resource block (PRB) 502 in the frequency axis, that is, as 12 subcarriers. The BS may configure a downlink control channel allocation unit by concatenating the REGs 503.

As illustrated in FIG. 5A, when the basic unit in which downlink control channels are allocated in 5G is a control channel element (CCE) 504, one CCE 504 may include a plurality of REGs 503. For example, the REG 503 illustrated in FIG. 5 may include 12 REs and, when 1 CCE 504 includes 6 REGs 503, 1 CCE 504 may include 72 REs. When a downlink control resource set is configured, the corresponding resource set may include a plurality of CCEs 504, and a specific downlink control channel may be mapped to one or a plurality of CCEs 504 according to an aggregation level (AL) within the control resource set and then transmitted. CCEs 504 within the CORESET may be distinguished by numbers and the numbers of the CCEs 504 may be assigned according to a logical mapping scheme.

The basic unit of the downlink control channel illustrated in FIG. 5A, that is, the REG 503, may include all of REs to which the DCI is mapped and the region to which a DMRS 505, which is a reference signal for decoding the REs, is mapped. As illustrated in FIG. 5, 3 DMRSs 505 may be transmitted within 1 REG 503. The number of CCEs required to transmit the PDCCH may be 1, 2, 4, 8, or 16 according to the aggregation level (AL), and the different number of CCEs may be used to implement link adaptation of the downlink control channel. For example, if AL=L, one downlink control channel may be transmitted through L CCEs. The UE is required to detect a signal in the state in which the UE is not aware of information on the downlink control channel, and a search space indicating a set of CCEs may be used to assist such a blind decoding. The search space is a set of downlink control channel candidates including CCEs for which the terminal should attempt decoding at the given aggregation level, and there are several aggregation levels at which one set of CCEs is configured by 1, 2, 4, 8, and 16 CCEs, so that the terminal has a plurality of search spaces. The search space set may be defined as a set of search spaces at all configured aggregation levels.

The search space may be classified into a common search space and a UE-specific search space. UEs in a predetermined group or all UEs may search for a common search space of the PDCCH in order to receive cell-common control information such as dynamic scheduling for system information or paging messages. For example, PDSCH scheduling allocation information for transmission of an SIB including information on a service provider of a cell may be received by searching for a common-search space of the PDCCH. In the case of the common search space, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined as a UE identity and a function of various system parameters.

In 5G, parameters for the PDCCH search space may be configured in the terminal by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type, that is, a common search space or a UE-specific search space, a combination of a DCI format and an RNTI to be monitored in the corresponding search space, and a CORESET index for monitoring the search space. For example, the following information may be included.

TABLE 8

```
SearchSpace ::=                               SEQUENCE {
Identity of the search space. SearchSpaceId = 0 identifies the SearchSpace
configured via PBCH
(MIB) or ServingCellConfigCommon.
searchSpaceId                                 SearchSpaceId,
(search space identifier)
controlResourceSetId                          ControlResourceSetId,
(control resource set identifier)
monitoringSlotPeriodicityAndOffset            CHOICE {
(monitoring slot level period)
sl1                                           NULL,
sl2
    INTEGER (0..1),
sl4
    INTEGER (0..3),
sl5                                           INTEGER
(0..4),
sl8
    INTEGER (0..7),
sl10                                          INTEGER
(0..9),
sl16                                          INTEGER
(0..15),
sl20                                          INTEGER
(0..19)
}
                                              OPTIONAL,
duration (monitoring length)                  INTEGER (2..2559)
monitoringSymbolsWithinSlot                   BIT STRING (SIZE
(14))
    OPTIONAL,
(monitoring symbol within slot)
nrofCandidates                                SEQUENCE {
(number of PDCCH candidates at each aggregation level)
aggregationLevel1                             ENUMERATED  {n0,
n1, n2, n3, n4, n5, n6, n8},
aggregationLevel2                             ENUMERATED  {n0,
n1, n2, n3, n4, n5, n6, n8},
aggregationLevel4                             ENUMERATED  {n0,
n1, n2, n3, n4, n5, n6, n8},
aggregationLevel8                             ENUMERATED  {n0,
n1, n2, n3, n4, n5, n6, n8},
aggregationLevel16                            ENUMERATED  {n0,
n1, n2, n3, n4, n5, n6, n8}
},
searchSpaceType                               CHOICE {
(search space type)
Configures this search space as common search space (CSS) and DCI
formats to monitor.
common                                        SEQUENCE {
(common search space)
}
ue-Specific                                   SEQUENCE {
(UE-specific search space)
Indicates whether the UE monitors in this USS for DCI formats 0-0 and
1-0 or for formats 0-1 and 1-1.
formats
    ENUMERATED {formats0-0-And-1-0, formats0-1-And-1-1},
...
}
```

The BS may configure one or a plurality of search space sets in the UE according to configuration information. According to some embodiments, the BS may configure search space set 1 and search space 2 in the UE, and the configuration may be performed such that DCI format A scrambled by an X-RNTI in search space set 1 is monitored in the common search space and DCI format B scrambled by a Y-RNTI in search space set 2 is monitored in the UE-specific search space.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The described RNTIs may follow the following definition and use.

Cell RNTI (C-RNTI): used for scheduling UE-specific PDSCH

Temporary cell RNTI (TC-RNTI): used for scheduling UE-specific PDSCH

Configured scheduling RNTI (CS-RNTI): used for semi-statically configured UE-specific PDSCH scheduling Random access RNTI (RA-RNTI): used for PDSCH scheduling at random access stage Paging RNTI (P-RNTI): used for PDSCH scheduling through which paging is transmitted System information RNTI (SI-RNTI): used for PDSCH scheduling through which system information is transmitted Interruption (INT)-RNTI: used for indicating whether puncturing is performed for PDSCH Transmit power control for (TPC)-PUSCH-RNTI: used for indicating PUSCH power control command Transmit power control for (TPC)-PUCCH RNTI: used for indicating PUCCH power control command Transmit power control for (TPC)-SRS RNTI: used for indicating SRS power control command The DCI formats may follow definitions below.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A search space at an aggregation level L in a search space set s in a control resource set p of 5G may be expressed as shown in the [Equation 2] below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mathrm{mod} \lfloor N_{CCE,p}/L \rfloor \right\} + i \quad \text{[Equation 2]}$$

L: aggregation level $n_{CI}$: carrier index $N_{CCE,p}$: total number of CCEs existing within control resource set p $n_{s,f}^{\mu}$: slot index $M_{p,s,max}^{(L)}$: number of PDCCH candidates at aggregation level L $m_{s,nCI}=0, \ldots, M_{p,s,max}^{(L)}-1$: index of PDCCH candidate at aggregation level L $i=0, \ldots, L-1$ $Y_{p,n_{s,f}^{\mu}} = (A_p \cdot Y_{p,n_{s,f}^{\mu}-1}) \mod D$, $Y_{p,-1} = n_{RNTI} \neq 0$, $A_0 = 39827$, $A_1 = 39829$, $A_2 = 39839$, $D = 65537$ $n_{RNTI}$: UE identifier $Y_{p,n_{s,f}^{\mu}}$ may correspond to 0 in the case of the common search space.

In the case of the UE-specific search space, $Y_{p,n_{s,f}^{\mu}}$ may correspond to a value varying depending on an identity of the UE (C-RNTI or an ID configured in the UE by the BS) and a time index.

Since a plurality of search space sets may be configured as different parameters (for example, the parameters in [Table 8]) in 5G, a search space set which the UE monitors may be different each time. For example, when search space set #1 is configured on an X-slot period, search space set #2 is configured on a Y-slot period, and X and Y are different from each other, the UE may monitor all of search space set #1 and search space set #2 in a specific slot and monitor one of search space set #1 and search space set #2 in another specific slot.

[PDCCH: Span]

The UE may report a UE capability in the case in which a plurality of PDCCH monitoring occasions exist within the slot and, at this time, the concept "span" may be used. The span is consecutive symbols in which the UE can monitor a PDCCH within the slot, and each PDCCH monitoring occasion may be within 1 span. The span may be expressed by (X,Y), in which X refers to the minimum number of symbols which should be spaced apart between first symbols of two consecutive spans and Y refers to the number of consecutive symbols for monitoring a PDCCH within 1 span. At this time, the UE may monitor the PDCCH in a section within Y symbols from the first symbol of the span within the span.

Figure 5B:
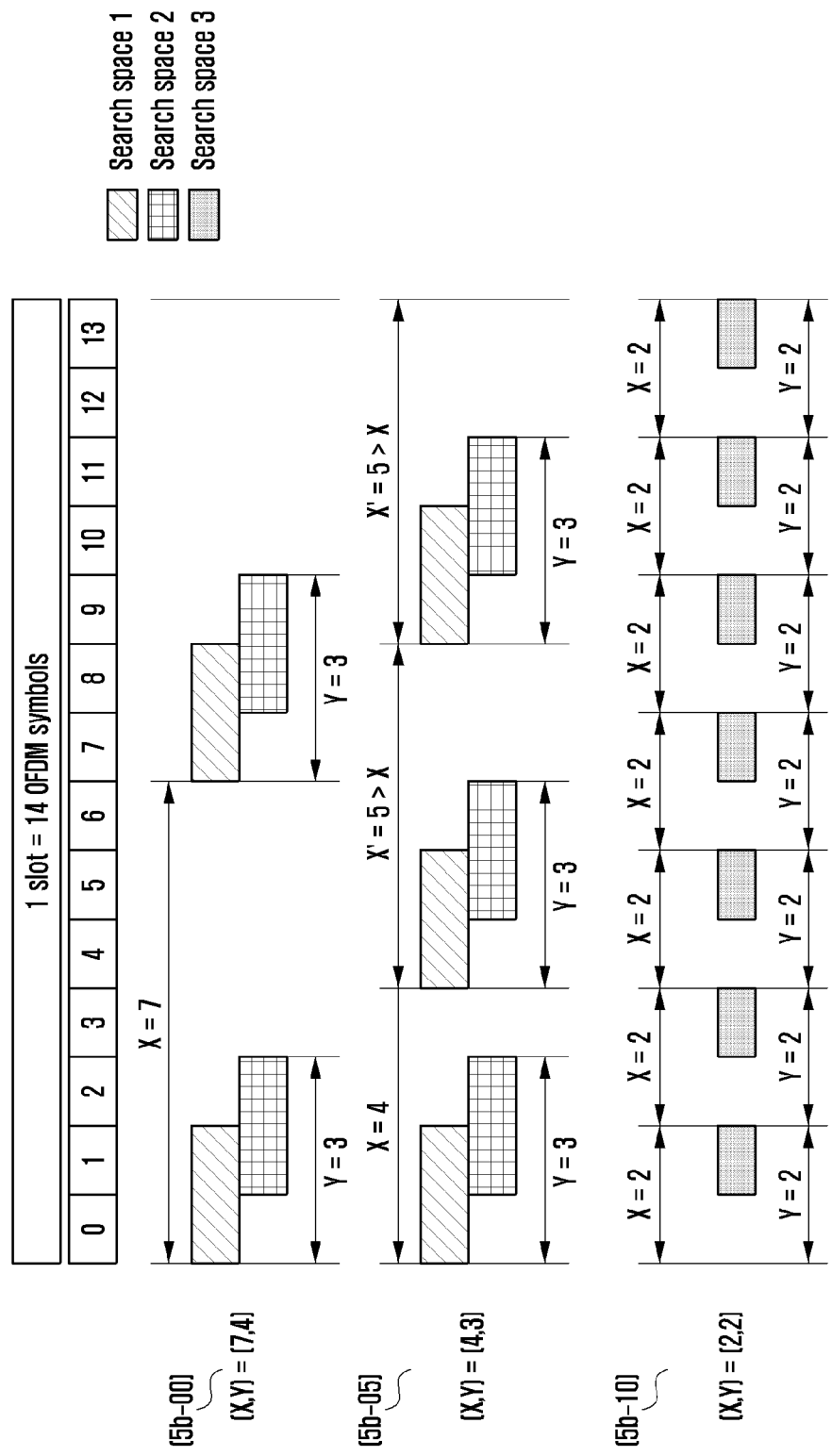
FIG. 5B illustrates the case in which the UE may have a plurality of physical downlink control channel (PDCCH) monitoring occasions within the slot through the span in a wireless communication system according to an embodiment of the disclosure.

FIG. 5B illustrates the case in which the UE may have a plurality of PDCCH monitoring occasions within the slot through the span in a wireless communication system.

The span can be expressed by (X,Y)=(7,4), (4,3), and (2,2), and the three cases are expressed as (5b-00), (5b-05), and (5b-10) in FIG. 5B. For example, (5b-00) indicates the case in which the number of spans which can be expressed by (7,4) is 2 in the slot. An interval between first symbols of the 2 spans is expressed as X=7, a PDCCH monitoring occasion may exist within a total of Y=3 symbols from the first symbol of each span, and search spaces 1 and 2 exist within Y=3 symbols. In another example, (5b-05) indicates the case in which a total number of spans which can be expressed by (4,3) is 3 in the slot, and an interval between a second span and a third span is X'=5 symbols larger than X=4.

[PDCCH: UE Capability Report]

The slot location of the common search space and the UE-specific search space is indicated by a monitoringSymbolsWitninSlot parameter in [Table 10-1], and the symbol location within the slot is indicated by a bitmap through a monitoringSymbolsWithinSlot parameter in [Table 9]. Meanwhile, the symbol location within the slot in which the UE can perform search space monitoring may be reported to the BS through the following UE capability.

UE capability 1 (hereinafter, referred to as FG 3-1). When the number of monitoring occasions (MOs) for type 1 and type 3 common search spaces or the UE-specific search space is 1 within the slot, the UE capability is a capability to monitor the corresponding MO when the corresponding MO is located within first 3 symbols in the slot as shown in [Table 10-1] below. The UE capability is a mandatory capability which all UEs supporting NR should support and whether to support the capability is not explicitly reported to the BS.

TABLE 10-1

| Index | Feature group | Components | Field name in TS 38.331 [2] |
|---|---|---|---|
| 3-1 | Basic DL control channel | One configured CORESET per BWP per cell in addition to CORESET0- CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS without dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

UE capability 2 (hereinafter, referred to as FG 3-2). When the number of monitoring occasions (MOs) for the common search space or the UE-specific search space is one within the slot, the UE capability is a capability to perform monitoring regardless of the location of a start symbol of the corresponding MO as shown in [Table 10-2] below. The UE capability can be optionally supported by the UE, and whether to support the capability is explicitly reported to the BS.

TABLE 10-2

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter, referred to as FG 3-5, 3-5a, or 3-5b). When the number of monitoring occasions (MOs) for the common search space or the UE-specific search space is plural within the slot, the UE capability indicates a pattern of MOs which the UE can monitor as shown in [Table 10-3a], [Table 10-3b], and [Table 10-3c] below. The pattern includes an interval X between start symbols of different MOs and a maximum symbol length Y of one MO. Combinations of (X,Y) supported by the UE may be one or a plurality of {(2,2), (4,3), (7,3)}. The UE capability can be optionally supported by the UE, and whether to support the capability and the combination (X,Y) are explicitly reported to the BS.

TABLE 10-3a

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonotoringAnyOccasions {3-5. withoutDCI-Gap 3-5a. withDCI-Gap} |

TABLE 10-3b

| Index | Feature group | Components | Field name in TS 38.331 [2] |
|---|---|---|---|
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |

TABLE 10-3c

| Index | Feature group | Components | Field name in TS 38.331 [2] |
|---|---|---|---|
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans | |

TABLE 10-3c-continued

| Index | Feature group | Components | Field name in TS 38.331 [2] |
|---|---|---|---|
| | | within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report whether to support UE capability 2 and/or UE capability 3 and a relevant parameter to the BS. The BS may allocate time axis resources for the common search space and the UE-specific search space on the basis of the UE capability. In the resource allocation, the BS may not place the MO at the location at which the UE cannot perform monitoring.

[PDCCH: BD/CCE Limit]

When a plurality of search space sets are configured in the UE, a method of determining a search space set which the UE should monitor may consider the following conditions.

If the UE receives a configuration of a value of monitoringCapabilityConfig-r16 which is higher-layer signaling as r15monitoringcapability, the UE defines the number of PDCCH candidates which can be monitored and a maximum value for the number of CCEs included in all search spaces (indicating all CCE sets corresponding to a union area of a plurality of search space sets) for each slot. If the UE receives a configuration of a value of monitoringCapabilityConfig-r16 as r16monitoringcapability, the UE defines the number of PDCCH candidates which can be monitored and a maximum value for the number of CCEs included in all search spaces (indicating all CCE sets corresponding to a union area of a plurality of search space sets) for each span.

[Condition 1: Limit on Maximum Number of PDCCH Candidates]

When the maximum number $M^\mu$ of PDCCH candidates which the UE can monitor according to the configuration value of higher-layer signaling as described above is defined on the basis of a slot in a cell in which subcarrier spacing is configured as $15 \cdot 2^\mu$ kHz, the maximum number $M^\mu$ may follow [Table 11-1] below, and when the maximum number $M^\mu$ is defined on the basis of a span, the maximum number $M^\mu$ may follow [Table 11-2] below.

TABLE 11-1

Maximum number of PDCCH candidates
per slot and per serving cell $M^\mu$

| |
|---|
| 44 |
| 36 |
| 22 |
| 20 |

TABLE 11-2

Maximum number $M^\mu$ of monitored
PDCCH candidates per span for combination
(X, Y) and per serving cell

| μ | (2, 2) | (4, 3) | (7, 3) |
|---|---|---|---|
| 0 | 14 | 28 | 44 |
| 1 | 12 | 24 | 36 |

[Condition 2: Limit on Maximum Number of CCEs]

When the maximum number C of CCEs included in all search spaces (indicating all CCE sets corresponding to a union area of a plurality of search space sets) according to the configuration value of higher-layer signaling is defined on the basis of a slot in a cell in which subcarrier spacing is configured as $15 \cdot 2^\mu$ kHz, the maximum number C may follow [Table 11-3] below, and when the maximum number C of CCEs is defined on the basis of a span, the maximum number C may follow [Table 11-4] below.

TABLE 11-3

| μ | Maximum number of non-overlapped CCEs per slot and per serving cell $C\mu$ |
|---|---|
| 0 | 56 |
| 1 | 56 |
| 2 | 48 |
| 3 | 32 |

TABLE 11-4

Maximum number $C\mu$ of non-overlapped CCEs per span for combination (X, Y) and per serving cell

| μ | (2, 2) | (4, 3) | (7, 4) |
|---|---|---|---|
| 0 | 18 | 36 | 56 |
| 1 | 18 | 36 | 56 |

For convenience of description, a situation in which both conditions 1 and 2 are satisfied at a specific time point is defined as "condition A". Accordingly, not satisfying condition A may mean that at least one of conditions 1 and 2 is not satisfied.

Condition A may not be satisfied at a specific time point according to a configuration of search space sets by the BS. When condition A is not satisfied at a specific time point, the UE may select and monitor only some of the search space sets configured to satisfy condition A at the corresponding time point, and the BS may transmit the PDCCH through the selected search space sets.

[PDCCH: Overbooking]

The following method may be applied as a method of selecting some of all the configured search space sets.

[Method 1]

When condition A for the PDCCH is not satisfied at a specific time point (slot), the UE (or the BS) may select a search space set having a search space type configured as a common search space in preference to a search space set having a search space type configured as a UE-specific search space from among the search space sets existing at the corresponding time point.

When all search space sets of which the search space type is configured as the common search space are selected (that is, when condition A is satisfied even after all search spaces of which the search space type is configured as the common search space are selected), the UE (or the BS) may select search space sets having the search space type configured as the UE-specific search space. At this time, when the number of search space sets configured as the UE-specific search space is plural, a search space set having a lower search space set index may have a higher priority. UE-specific search space sets may be selected within a range in which condition A is satisfied in consideration of the priority.

[QCL, TCI State]

In the wireless communication system, one or more different antenna ports (or replaced with one or more channels, signals, and combinations thereof, but commonly referred to as different antenna ports for convenience in the following description of the disclosure) may be associated by a quasi co-location (QCL) configuration shown in [Table 12] below. The TCI state is to inform of a QCL relation between a PDCCH (or a PDCCH DMRS) and another RS or channel, and a reference antenna port A (reference RS #A) and another purpose antenna port B (target RS #B) which are quasi co-located (QCLed) means that the UE is allowed to apply some or all of large-scale channel parameters estimated in the antenna port A to channel measurement from the antenna port B. The QCL is required to correlate different parameters according to 1) time tracking influenced by an average delay and a delay spread, 2) frequency tracking influenced by a Doppler shift and a Doppler spread, 3) radio resource management (RRM) influenced by an average gain, 4) beam management (BM) influenced by a spatial parameter, and the like. Accordingly, NR supports four types of QCL relations shown in [Table 12] below.

TABLE 12

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial Rx parameter may refer to some or all of various parameters such as angle of arrival (AoA), power of angular spectrum (PAS) of AoA, angle of departure (AoD), PAS of AoD, transmission and reception channel correlation, transmission and reception beamforming, and spatial channel correlation.

The QCL relation can be configured in the UE through RRC parameter TCI-state and QCL-Info as shown in [Table 13] below. Referring to [Table 13] below, the BS may configure one or more TCI states in the UE and inform the UE of a maximum of two QCL relations (qcl-Type 1 and qcl-Type 2) for an RS referring to an ID of the TCI state, that is, a target RS. At this time, each piece of the QCL information (QCL-Info) included in the TCI state includes a serving cell index and a BWP index of a reference RS indicated by the corresponding QCL information, a type and an TD of the reference RS, and the QCL type as shown in [Table 12] above.

TABLE 13

```
TCI-State ::=                      SEQUENCE {
tci-StateId                        TCI-StateId,
(ID of corresponding TCI state)
qcl-Type1                          QCL-Info,
(QCL information of first reference RS of RS (target RS) referring to
corresponding TCI state ID)
qcl-Type2                          QCL-Info
    OPTIONAL,    -- Need R
(QCL information of second reference RS of RS (target RS) referring to
corresponding TCI state ID)
...
}
QCL-Info ::=                       SEQUENCE {
cell                               ServCellIndex
    OPTIONAL,    -- Need R
(serving cell index of reference RS indicated by corresponding QCL
information)
bwp-Id                             BWP-Id
    OPTIONAL, -- Cond CSI-RS-Indicated
(BWP index of reference RS indicated by corresponding QCL
information)
referenceSignal                    CHOICE {
csi-rs                             NZP-CSI-RS-
ResourceId,
ssb                                SSB-Index
(one of CSI-RSI ID or SSB ID indicated by corresponding QCL
information)
},
qcl-Type                           ENUMERATED
{typeA, typeB, typeC, typeD},
...
}
```

Figure 7:
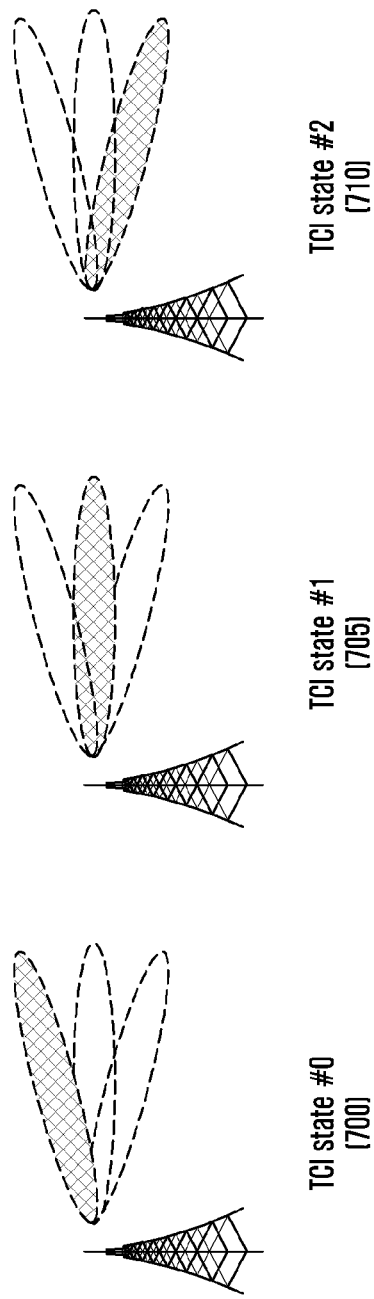
FIG. 7 illustrates an example of BS beam allocation according to a transmission configuration indication (TCI) state configuration in a wireless communication system according to an embodiment of the disclosure.

FIG. 7 illustrates an example of BS beam allocation according to a TCI state configuration in a wireless communication system according to an embodiment of the disclosure.

Referring to FIG. 7, the BS may transmit information on N different beams to the UE through N different TCI states. For example, when N=3 as illustrated in FIG. 7, the BS may notify that a qcl-Type 2 parameter included in three TCI states 700, 705, and 710 is associated with a CSI-RS or SSB corresponding to different beams to be configured as QCL type D and antenna ports referring to the different TCI states 700, 705, and 710 are associated with different spatial Rx parameters, that is, different beams.

[Table 14-1] to [Table 14-5] below show valid TCI state configurations according to the target antenna port type.

[Table 14-1] shows valid TCI state configurations when the target antenna port is a CSI-RS for tracking (TRS). The TRS is an NZP CSI-RS for which a repetition parameter is not configured and trs-Info is configured as true among CSI-RSs. The third configuration in [Table 14-1] may be used for an aperiodic TRS.

TABLE 14-1

Valid TCI state configurations when target antenna port is CSI-RS for tracking (TRS)

| Valid TCI state Configuration | DL RS 1 | qcl-Type 1 | DL RS 2 (if configured) | qcl-Type 2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

[Table 14-2] shows valid TCI state configurations when the target antenna port is a CSI-RS for CSI. The CSI-RS for CSI is an NZP CSI-RS for which a parameter (for example, a repetition parameter) indicating repetition is not configured and trs-Info is not configured as true among the CSI-RSs.

TABLE 14-2

Valid TCI state configurations when target antenna port is CSI-RS for CSI

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

[Table 14-3] shows valid TCI state configurations when the target antenna port is a CSI-RS for beam management (BM) (that is the same meaning as a CSI-RS for L1 RSRP reporting). Among the CSI-RSs, the CSI-RS for BM is an NZP CSI-RS for which a repetition parameter is configured to have a value of on or off and trs-Info is not configured as true.

TABLE 14-3

Valid TCI state configurations when target antenna port is CSI-RS for BM (for L1 RSRP reporting)

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH | QCL-TypeC | SS/PBCH block | QCL-TypeD |

[Table 14-4] shows valid TCI state configurations when the target antenna port is a PDCCH DMRS.

TABLE 14-4

Valid TCI state configurations when target antenna port is PDCCH DMRS

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

[Table 14-5] shows valid TCI state configurations when the target antenna port is a PDCCH DMRS.

TABLE 14-5

Valid TCI state configurations when target antenna port is PDSCH DMRS

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a representative QCL configuration method by [Table 14-1] to [Table 14-5], the target antenna port and the reference antenna port for each operation are configured and operated as "SSB"→"TRS"→"CSI-RS for CSI, CSI-RS for BM, PDCCH DMRS, or PDSCH DMRS". Accordingly, it is possible to assist the UE in the reception operation by associating statistical characteristics which can be measured from the SSB and the TRS with respective antenna ports.
[PDCCH: Related to TCI State]

Specifically, combinations of TCI states which can be applied to a PDCCH DMRS antenna port are as shown in [Table 14-6] below. In [Table 14-6], a fourth row is a combination assumed by the UE before the RRC configuration, and configurations after RRC are impossible.

TABLE 14-6

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
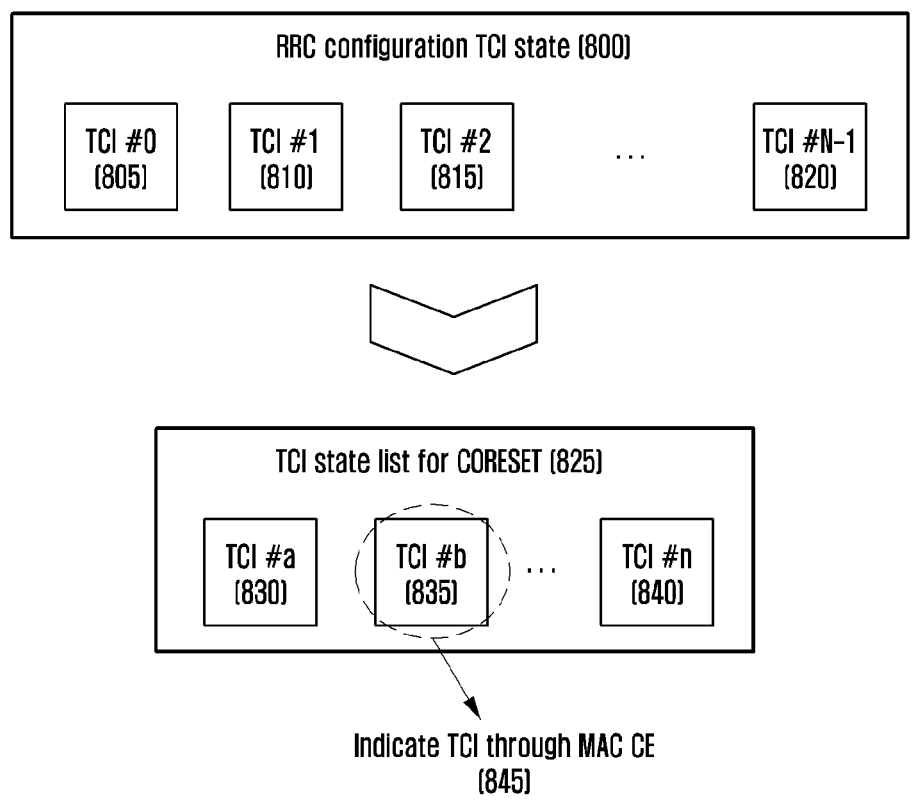
FIG. 8 illustrates an example of a method of allocating TCI states for a PDCCH in a wireless communication system according to an embodiment of the disclosure.

NR supports the hierarchical signaling method as illustrated in FIG. 8 for dynamical allocation of PDCCH beams.

FIG. 8 illustrates an example of a method of allocating TCI states for a PDCCH in a wireless communication system according to an embodiment of the disclosure.

Referring to FIG. 8, the BS may configure N TCI states 805, 810, ..., 820 in the UE through RRC signaling 800 and configure some thereof as TCI states for the CORESET as indicated by reference numeral 825. Thereafter, the BS may indicate one of the TCI states 830, 835, and 840 for the CORESET to the UE through MAC CE signaling as indicated by reference numeral 845. The UE receives a PDCCH on the basis of beam information included in the TCI state indicated by the MAC CE signaling.

Figure 9:
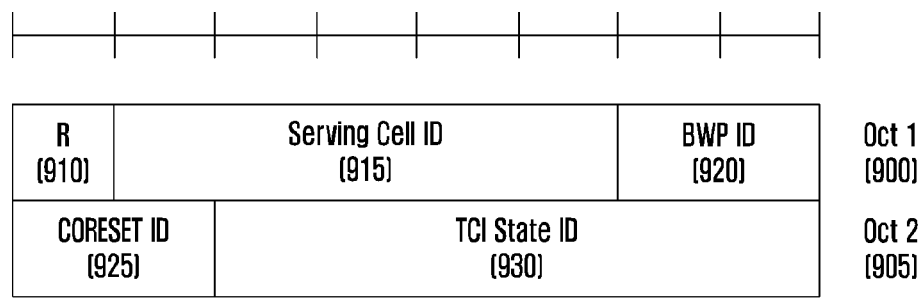
FIG. 9 illustrates a TCI indication medium access control (MAC) control element (CE) signaling structure for a PDCCH demodulation reference signal (DMRS) in a wireless communication system according to an embodiment of the disclosure.

FIG. 9 illustrates a TCI indication MAC CE indication signaling structure for a PDCCH DMRS in a wireless communication system according to an embodiment of the disclosure.

Referring to FIG. 9, the TCI indication MAC CE signaling for the PDCCH DMRS is configured by 2 bytes (16 bits), and includes a reserved bit 910 of 1 bit, a serving cell ID 915 of 5 bits, a BWP ID 920 of 2 bits, a CORESET ID 925 of 2 bits, and a TCI state ID 930 of 6 bits.

Figure 10:
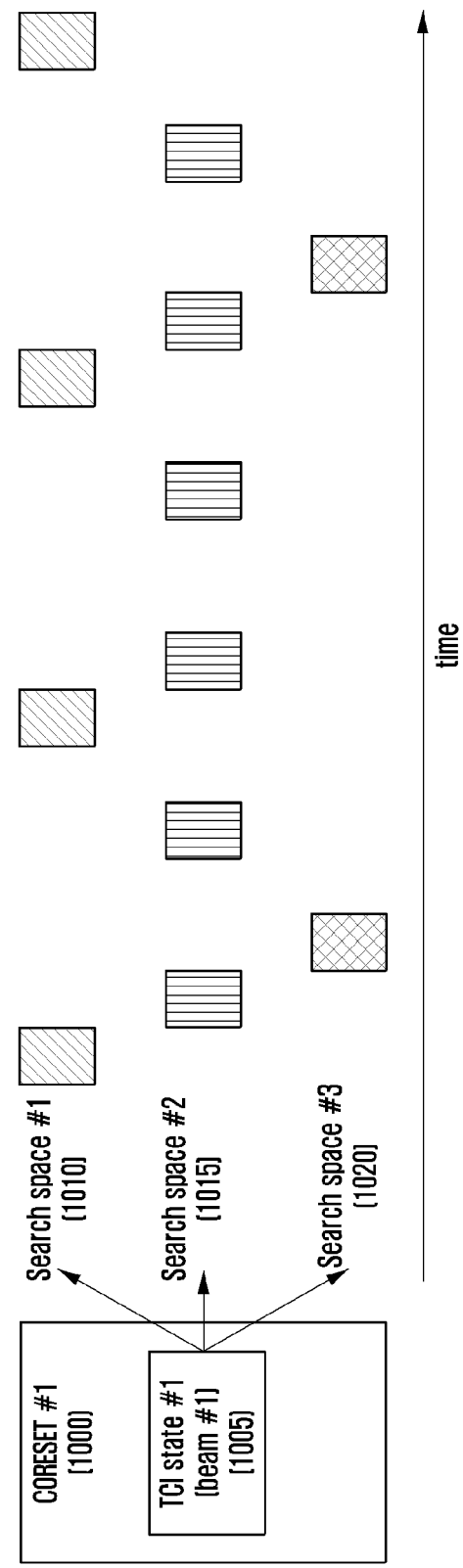
FIG. 10 illustrates an example of a CORESET and search space beam configuration in a wireless communication system according to an embodiment of the disclosure.

FIG. 10 illustrates an example of a CORESET and search space beam configuration in a wireless communication system according to an embodiment of the disclosure.

Referring to FIG. 10, the BS may indicate one state in the TCI state list included in the configuration of a CORSET 1000 through MAC CE signaling as indicated by reference numeral 1005. Thereafter, before another TCI state is indicated to the corresponding CORSET through other MAC CE signaling, the UE considers that the same QCL information 1005 (beam #1) is applied to one or more search spaces 1010, 1015, and 1020 connected to the CORESET 1000. The PDCCH beam allocation method has difficulty in indicating a beam change earlier than a MAC CE signaling delay and has a disadvantage of applying the same beam to all CORESETs regardless of a search space characteristic, and thus makes flexible PDCCH beam operation difficult. Hereinafter, embodiments of the disclosure provide a more flexible PDCCH beam configuration and operation method. In the following description of embodiments of the disclosure, several examples are provided for convenience of description, but the examples are not exclusive and can be combined and applied according to a circumstance.

The BS may configure one or a plurality of TCI states for a specific CORESET in the UE and activate one of the configured TCI states through a MAC CE activation command. For example, {TCI state #0, TCI state #1, TCI state #2} are configured in CORESET #1 as the TCI states, and the BS may transmit a command for activating TCI state #0 assumed as the TCI state for CORESET #1 to the UE through the MAC CE. The UE may correctly receive a DMRS of the corresponding CORESET on the basis of QCL information within the activated TCI state by means of the activation command for the TCI state received through the MAC CE.

When the UE does not receive the MAC CE activation command for the TCI state of CORESET #0 for the CORESET (CORESET #0) having an index of 0, the UE may assume that a DMRS transmitted in CORESET #0 is QCLed with an SS/PBCH block identified in an initial access process or a non-contention-based random access process which is not triggered by a PDCCH command.

When the UE does not receive a configuration of the TCI state for CORESET #X or the UE receives the configuration of one or more TCI states but does not receive a MAC CE activation command for activating one of the TCI states for the CORESET (CORESET #X) having an index configured as a value other than 0, the UE may assume that a DMRS transmitted in CORESET #X is QCLed with an SS/PBCH block identified in an initial access process.
[PDSCH: Related to Frequency Resource Allocation]

Figure 11:
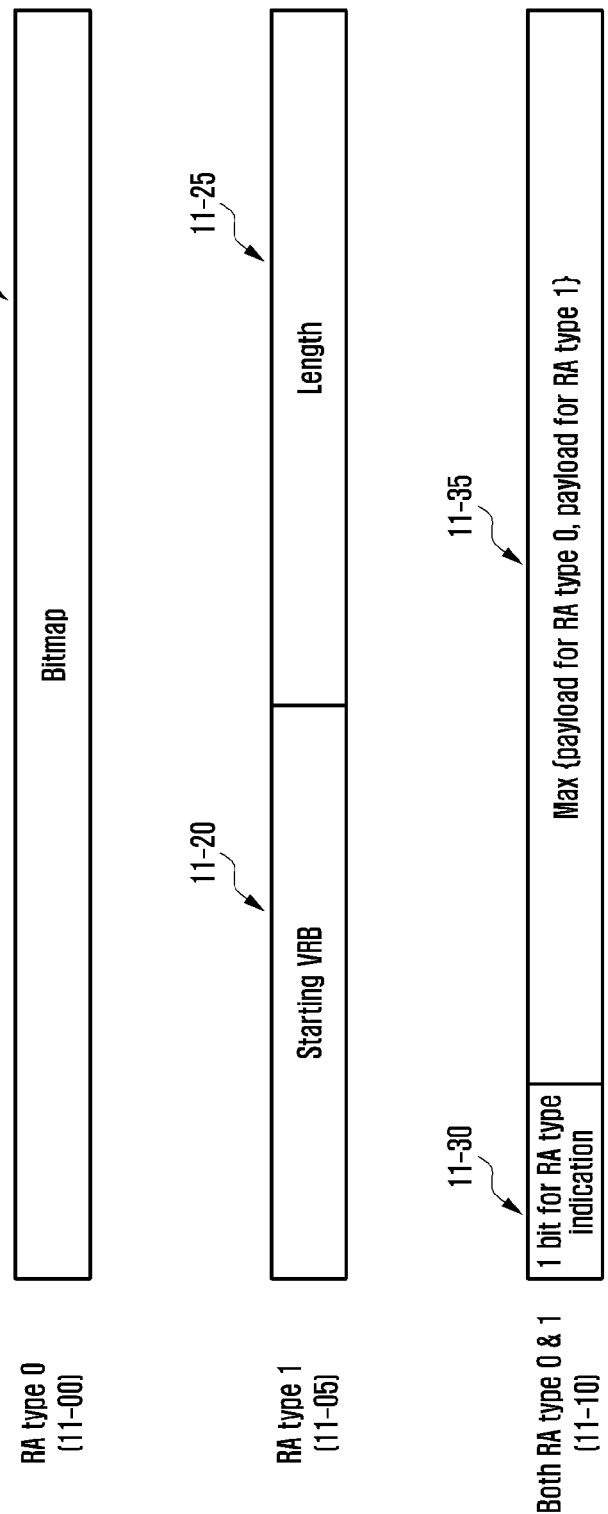
FIG. 11 illustrates an example of frequency axis resource allocation of a PDSCH in a wireless communication system according to an embodiment of the disclosure.

FIG. 11 illustrates an example of frequency axis resource allocation of the PDSCH in a wireless communication system according to an embodiment of the disclosure.

FIG. 11 illustrates three frequency axis resource allocation methods of type 0 11-00, type 1 11-05, and dynamic switch 11-10 which can be configured through a higher layer in an NR wireless communication system.

Referring to FIG. 11, when the UE is configured to use only resource type 0 through higher-layer signaling as indicated by reference numeral 11-00, some pieces of downlink control information (DCI) for allocating the PDSCH to the corresponding UE includes a bitmap of NRBG bits. A condition therefor is described again later. At this time, NRBG is the number of resource block groups (RBGs) determined as shown in [Table 15-1] below according to a BWP size allocated by a BWP indicator and a higher-layer parameter rbg-Size, and data is transmitted to an RBG indicated as 1 by the bitmap.

TABLE 15-1

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher-layer signaling as indicated by reference numeral 11-05, some pieces of DCI for allocating the PDSCH to the corresponding UE has frequency axis resource allocation information including $\lceil \log_2(N_{RB}^{DL,BWP}(N_{RB}^{DL,BWP}+1)/2) \rceil$ bits. A condition therefor is described again later. The BS may configure a starting VRB 11-20 and a length 11-25 of frequency axis resources allocated successively therefrom.

When the UE is configured to use both resource type 0 and resource type 1 through higher-layer signaling as indicated by reference numeral 11-10, some pieces of DCI for allocating the PDSCH to the corresponding UE includes frequency axis resource allocation information of bits of a larger value 11-35 among payload 11-15 for configuring resource type 0 and payload 11-20 and 11-25 for configuring resource type 1. A condition therefor is described again later. At this time, one bit may be added to the first part (MSB) of the frequency axis resource allocation information within the DCI, and the use of resource type 0 may be indicated when the corresponding bit is "0" and the use of resource type 1 may be indicated when the corresponding bit is "1".

[PDSCH/PUSCH: Related to Time Resource Allocation]

Hereinafter, a time domain resource allocation method for a data channel in a next-generation mobile communication system (5G or NR system) is described.

The BS may configure a table for time domain resource allocation information of a downlink data channel (PDSCH) and an uplink data channel (PUSCH) through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. In an embodiment, the time domain resource allocation information may include PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), a location and a length of a start symbol in which a PDSCH or a PUSCH is scheduled within the slot, a mapping type of a PDSCH or a PUSCH, and the like. For example, information shown in [Table 15-2] or [Table 15-3] below may be transmitted from the BS to the UE.

TABLE 15-2

| PDSCH-TimeDomainResourceAllocationList infomration element |
|---|
| PDSCH-TimeDomainResourceAllocationList ::= SEQUENCE (SIZE(1.. maxNrofDL-Allocations)) OF PDSCH-TimeDomainResourceAllocation PDSCH-TimeDomainResourceAllocation ::= SEQUENCE { k0 INTEGER (0..32) OPTIONAL, --Need S (PDCCH-to-PDSCH timing, slot units) mapping type ENUMERATED {typeA, typeB}, (PDSCH mapping type) startSymbolAndLength INTEGER (0..127) (Start symbol and length of PDSCH) } |

TABLE 15-3

| PUSCH-TimeDomainResourceAllocationList infomration element |
|---|
| PUSCH-TimeDomainResourceAllocationList ::= SEQUENCE (SIZE(1.. maxNrofUL-Allocations)) OF |

TABLE 15-3-continued

| PUSCH-TimeDomainResourceAllocationList infomration element |
|---|
| PUSCH-TimeDomainResourceAllocation PUSCH-TimeDomainResourceAllocation ::= SEQUENCE { k2 INTEGER (0..32) OPTIONAL, --Need S (PDCCH-to-PUSCH timing, slot units) mapping type ENUMERATED {typeA, typeB}, (PUSCH mapping type) startSymbolAndLength INTEGER (0..127) (Start symbol and length of PUSCH) } |

The BS may inform the UE of one of the entries in the table for the time domain resource allocation information through L1 signaling (for example, DCI) (for example, indicated through a 'time domain resource allocation' field within DCI). The UE may acquire time domain resource allocation information for a PDSCH or a PUSCH on the basis of the DCI received from the BS.

Figure 12:
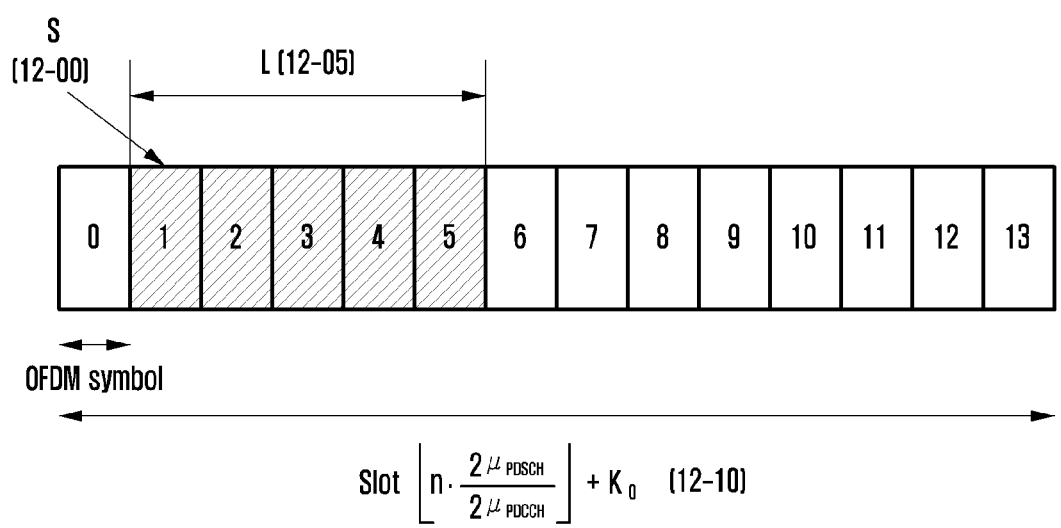
FIG. 12 illustrates an example of time axis resource allocation of a PDSCH in a wireless communication system according to an embodiment of the disclosure.

FIG. 12 illustrates an example of time axis resource allocation of the PDSCH in a wireless communication system according to an embodiment of the disclosure.

Referring to FIG. 12, the BS may indicate a time axis location of PDSCH resources according to subcarrier spacing (SCS) (PDSCH, PDCCH) of a data channel and a control channel configured using a higher layer, a scheduling offset (K0) value, and an OFDM symbol start location 12-00 and length 12-05 within one slot dynamically indicated through DCI.

Figure 13A:
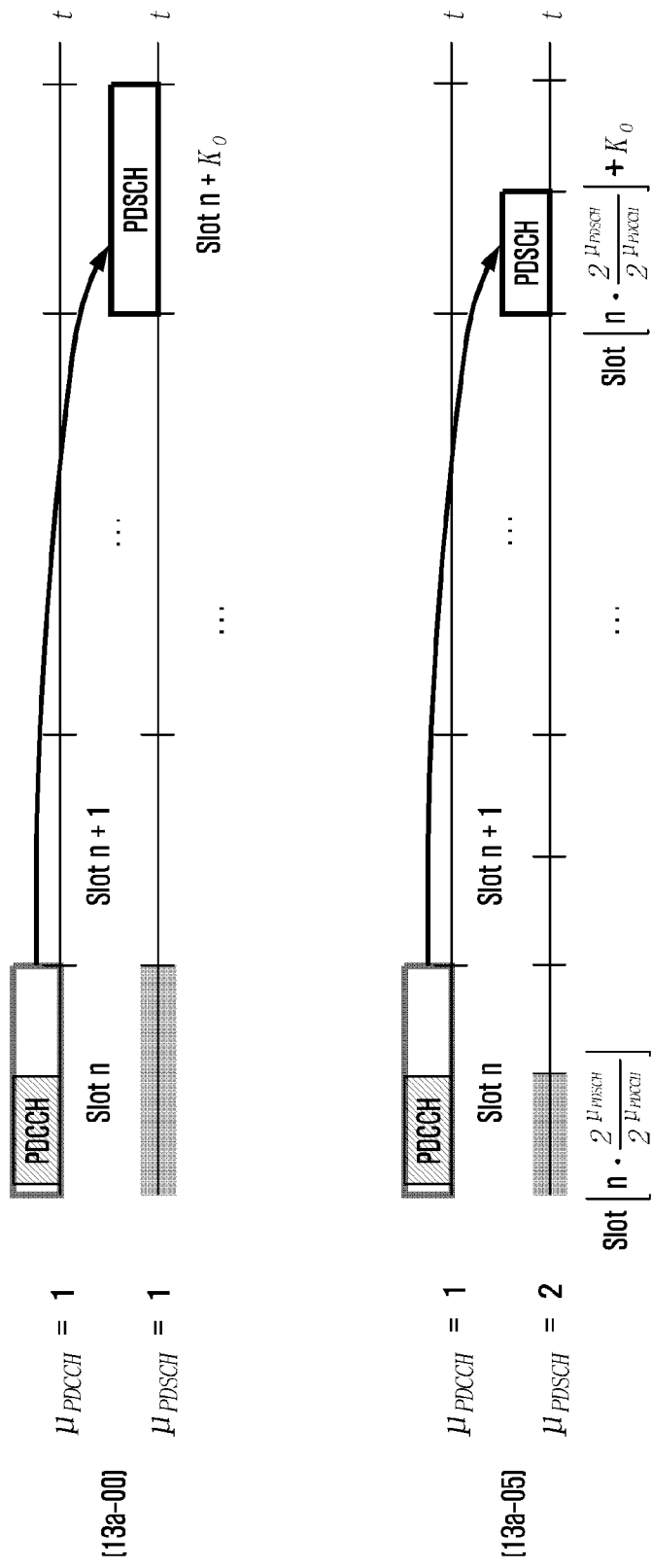
FIG. 13A illustrates an example of time axis resource allocation according to subcarrier spacing of a data channel and a control channel in a wireless communication system according to an embodiment of the disclosure.

FIG. 13A illustrates an example of time axis resource allocation according to subcarrier spacing of a data channel and a control channel in a wireless communication system according to an embodiment of the disclosure.

Referring to FIG. 13A, when subcarrier spacings of a data channel and a control channel are the same as each other (PDSCH=μPDCCH) as indicated by reference numeral 13a-00, slot numbers for the data and the control are the same as each other, and thus the BS and the UE may generate a scheduling offset according to a predetermined slot offset K0. On the other hand, when subcarrier spacings of a data channel and a control channel are different from each other (PDSCH: tPDCCH) as indicated by reference numeral 13a-05, slot numbers for the data and the control are different from each other, and thus the BS and the UE may generate a scheduling offset according to a predetermined slot offset K0 on the basis of subcarrier spacing of the PDCCH.

[Related to SRS]

Subsequently, a method of estimating an uplink channel using sounding reference signal (SRS) transmission by the UE is described. The BS may configure at least one SRS configuration in every uplink BWP and configure at least one SRS resource set in every SRS configuration in order to transmit configuration information for SRS transmission. For example, the BS and the UE may exchange higher-layer signaling information below in order to transmit information related to an SRS resource set.

srs-ResourceSetId: SRS resource set index
  srs-ResourceIdList: set of SRS resource indexes referred to by SRS resource index set
  resourceType: indicates a time-axis transmission configuration of SRS resources referred to by an SRS resource set and is configured as one of 'periodic', 'semi-persistent', and 'aperiodic'. When 'periodic' or 'semi-persistent' is configured, associated CSI-RS information may be provided according to a used place of the SRS resource set. When 'aperiodic' is configured, an aperiodic SRS resource trigger list and slot offset information may be provided and associated CSI-RS information may be provided according to a used place of the SRS resource set.

usage: indicates a configuration for a used place of SRS resources referred to by the SRS resource set and is configured as one of 'beamManagement', 'codebook', 'nonCodebook', and 'antennaSwitching'.

alpha, p0, pathlossReferenceRS, srs-PowerControlAdjustmentStates:

provides a parameter configuration for controlling transmission power of SRS resources referred to by the SRS resource set.

The UE may understand that SRS resources included in the set of SRS resource indexes referred to by the SRS resource set follow information configured in the SRS resource set.

Further, the BS and the UE may transmit and receive high-layer signaling information in order to transmit individual configuration information for SRS resources. For example, the individual configuration information for SRS resources may include time-frequency axis mapping information within the slot of SRS resources, which may include information on intra-slot or inter-slot frequency hopping of SRS resources. Further, the individual configuration information for SRS resources may include a time-axis transmission configuration of SRS resources and may be configured as one of 'periodic', 'semi-persistent', and 'aperiodic'. This may be limited to have the time-axis transmission configuration such as the SRS resources set including SRS resources. When the time-axis transmission configuration of SRS resources is configured as 'periodic' or 'semi-persistent', an SRS resource transmission period and a slot offset (for example, periodicityAndOffset) may be additionally configured in the time-axis transmission configuration.

The BS may activate, deactivate, or trigger SRS transmission to the UE through higher-layer signaling including RRC signaling or MAC CE signaling or L1 signaling (for example, DCI). For example, the BS may activate or deactivate periodic SRS transmission to the UE through higher-layer signaling. The BS may indicate activation of an SRS resource set having a resourceType configured as periodic through higher-layer signaling, and the UE may transmit SRS resources referred to by the activated SRS resource set. Time-frequency axis resource mapping within the slot of the transmission SRS resources follows resource mapping information configured in the SRS resources, and slot mapping including the transmission period and the slot offset follows a periodicityAndOffset configured in the SRS resources. Further, a spatial domain transmission filter applied to the transmission SRS resources may refer to spatial relation info configured in the SRS resources or refer to associated CSI-RS information configured in the SRS resource set including the SRS resources. The UE may transmit SRS resources within an uplink BWP activated for activated semi-persistent SRS resources through higher-layer signaling.

For example, the BS may activate or deactivate semi-persistent SRS transmission to the UE through high-layer signaling. The BS may indicate activation of the SRS resource set through MAC CE signaling, and the UE may transmit SRS resources referred to by the activated SRS resource set. The SRS resource set activated through MAC CE signaling may be limited to an SRS resource set having the resourceType configured as semi-persistent. Time-frequency axis resource mapping within the slot of the transmission SRS resources follows resource mapping information configured in the SRS resources, and slot mapping including the transmission period and the slot offset follows a periodicityAndOffset configured in the SRS resources. Further, a spatial domain transmission filter applied to the transmission SRS resources may refer to spatial relation info configured in the SRS resources or refer to associated CSI-RS information configured in the SRS resource set including the SRS resources. When spatial relation info is configured in the SRS resources, a spatial domain transmission filter may be determined with reference to configuration information for spatial relation info transmitted through MAC CE signaling activating semi-persistent SRS transmission without following the spatial relation info. The UE may transmit SRS resources within an uplink BWP activated for activated semi-persistent SRS resources through higher-layer signaling.

For example, the BS may trigger aperiodic SRS transmission to the UE through DCI. The BS may indicate one of the aperiodic SRS resource triggers (aperiodicSRS-ResourceTrigger) through an SRS request field of DCI. The UE may understand that an SRS resource set including the aperiodic SRS resource trigger indicated through DCI in an aperiodic SRS resource trigger list among SRS resource set configuration information is triggered. The UE may transmit the SRS resources referred to by the triggered SRS resource set. Time-frequency axis resource mapping within the slot of the transmitted SRS resources follows resource mapping information configured in the SRS resources. Further, slot mapping of the transmitted SRS resources may be determined through a slot offset between a PDCCH including DCI and the SRS resources, which may refer to a value(s) included in a slot offset set configured in the SRS resource set. Specifically, the slot offset between the PDCCH including DCI and the SRS resources may apply a value indicated by a time domain resource assignment field of DCI among an offset value(s) included in the slot offset set configured in the SRS resource set. Further, a spatial domain transmission filter applied to the transmission SRS resources may refer to spatial relation info configured in the SRS resources or refer to associated CSI-RS information configured in the SRS resource set including the SRS resources. The UE may transmit SRS resources within an uplink BWP activated for triggered aperiodic SRS resources through DCI.

When the BS triggers aperiodic SRS transmission to the UE through DCI, the UE may need a minimum time interval between the PDCCH including DCI for triggering aperiodic SRS transmission and the transmitted SRS in order to transmit the SRS through the application of configuration information for SRS resource. The time interval for SRS transmission by the UE may be defined as the number of symbols between the last symbol of the PDCCH including DCI for triggering aperiodic SRS transmission and the first symbol to which the SRS resource that is first transmitted among the transmitted SRS resource(s) is mapped. The minimum time interval may be defined with reference to a PUSCH preparation procedure time required for preparing PUSCH transmission by the UE. Further, the minimum time interval may have different values according to a used place of the SRS resource set including the transmitted SRS resource. For example, the minimum time interval may be defined as N2 symbols defined in consideration of the UE processing capability according to the UE capability with reference to the PUSCH preparation procedure of the UE. Further, the minimum time interval may be determined as N2 symbols when the used place of the SRS resource set is configured as 'codebook' or 'antennaSwitching' in consideration of the used place of the SRS resource set including the transmitted SRS resource, and may be determined as N2+14 symbols when the used place of the SRS resource set is configured as 'nonCodebook' or 'beamManagement'. The UE may perform aperiodic SRS transmission when the time interval for aperiodic SRS transmission is longer than or equal to the minimum time interval, and may ignore DCI for triggering the aperiodic SRS when the time interval for aperiodic SRS transmission is shorter than the minimum time interval.

TABLE 16-1

```
SRS-Resource ::=           SEQUENCE {
    srs-ResourceId              SRS-ResourceId,
    nrofSRS-Ports               ENUMERATED {port1, ports2, ports4},
    ptrs-PortIndex              ENUMERATED {n0, n1 }
OPTIONAL,    -- Need R
    transmissionComb            CHOICE {
        n2                          SEQUENCE {
            combOffset-n2               INTEGER (0..1),
            cyclicShift-n2              INTEGER (0..7)
        },
        n4                          SEQUENCE {
            combOffset-n4               INTEGER (0..3),
            cyclicShift-n4              INTEGER (0..11)
        }
    },
    resourceMapping             SEQUENCE {
        startPosition               INTEGER (0..5),
        nrofSymbols                 ENUMERATED {n1, n2, n4},
        repetitionFactor            ENUMERATED {n1, n2, n4}
    },
    freqDomainPosition          INTEGER (0..67),
    freqDomainShift             INTEGER (0..268),
    freqHopping                 SEQUENCE {
        c-SRS                       INTEGER (0..63),
        b-SRS                       INTEGER (0..3),
        b-hop                       INTEGER (0..3)
    },
    groupOrSequenceHopping      ENUMERATED { neither, groupHopping,
sequenceHopping },
    resourceType                CHOICE {
        aperiodic                   SEQUENCE {
            ...
        },
        semi-persistent             SEQUENCE {
            periodicityAndOffset-sp         SRS-PeriodicityAndOffset,
            ...
        },
        periodic                    SEQUENCE {
            periodicityAndOffset-p          SRS-PeriodicityAndOffset,
            ...
        }
    },
    sequenceId                  INTEGER (0..1023),
    spatialRelationInfo         SRS-SpatialRelationInfo
OPTIONAL,    -- Need. R
    ...
}
```

In [Table 16-1] above, spatialRelationInfo configuration information is applied to a beam used for corresponding SRS transmission of beam information of the corresponding reference signal with reference to one reference signal. For example, the configuration of spatialRelationInfo may include information shown in [Table 16-2] below.

TABLE 16-2

```
SRS-SpatialRelationInfo ::=   SEQUENCE {
    servingCellId                 ServCellIndex
OPTIONAL,    -- Need S
    referenceSignal               CHOICE {
        ssb-Index                     SSB-Index,
        csi-RS-Index                  NZP-CSI-RS-ResourceId,
        srs                           SEQUENCE {
```

TABLE 16-2-continued

```
            resourceId                    SRS-ResourceId,
            uplinkBWP                     BWP-Id
        }
    }
}
```

Referring to the spatialRelationInfo configuration, an SS/PBCH block index, a CSI-RS index, or an SRS index may be configured as an index of a reference signal to be referred to for using beam information of a specific reference signal. Higher-layer signaling referenceSignal is configuration information indicating a reference signal of which beam information is referred to for corresponding SRS transmission, ssb-Index is an index of an SS/PBCH block, csi-RS-Index is an index of a CSI-RS, and srs is an index of an SRS. When a value of higher-layer signaling referenceSignal is configured as 'ssb-Index', the UE may apply a reception beam used for receiving the CSI-RS corresponding to ssb-Index as a transmission beam of the corresponding SRS transmission. When a value of higher-layer signaling referenceSignal is configured as 'csi-RS-Index', the UE may apply a reception beam used for receiving the CSI-RS corresponding to csi-RS-Index as a transmission beam of the corresponding SRS transmission. When a value of higher-layer signaling referenceSignal is configured as 'srs', the UE may apply a reception beam used for receiving the SRS corresponding to srs as a transmission beam of the corresponding SRS transmission.

[PUSCH: Related to Transmission Scheme]

Subsequently, a scheduling scheme of PUSCH transmission is described. PUSCH transmission may be dynamically scheduled by a UL grant within DCI or may operate by configured grant Type 1 or Type 2. Dynamic scheduling of PUSCH transmission can be indicated by DCI format 0_0 or 0_1.

Configured grant Type 1 PUSCH transmission may be semi-statically configured through reception of configuredGrantConfig including rrc-ConfiguredUplinkGrant in [Table 16-3] through higher-layer signaling without reception of a UL grant within DCI. Configured grant Type 2 PUSCH transmission may be semi-persistently scheduled by a UL grant within DCI after reception of configuredGrant-Config which does not include rrc-ConfiguredUplinkGrant in [Table 16-3] through higher-layer signaling. When PUSCH transmission operates by a configured grant, parameters applied to PUSCH transmission are applied through configuredGrantConfig which is higher-layer signaling of [Table 16-3] except for dataScramblingIdentityPUSCH, txConfig, codebookSubset, maxRank, and scaling of UCI-OnPUSCH provided as pusch-Config of [Table 16-4] which is higher-layer signaling. When the UE receives transformPrecoder within configuredGrantConfig which is higher-layer signaling of [Table 16-3], the UE applies tp-pi2BPSK within pusch-Config of [Table 16-4] to PUSCH transmission operating by the configured grant.

TABLE 16-3

```
ConfiguredGrantConfig ::=            SEQUENCE {
   frequencyHopping                     ENUMERATED {intraSlot, interSlot}                              OPTIONAL,  --
Need S,
   cg-DMRS-Configuration                DMRS-UplinkConfig,
   mcs-Table                            ENUMERATED {qam256, qam64LowSE}
OPTIONAL,   -- Need S
   mcs-TableTransformPrecoder           ENUMERATED {qam256, qam64LowSE}                               OPTIONAL,
-- Need S
   uci-OnPUSCH                               SetupRelease { CG-UCI-OnPUSCH }                          OPTIONAL,
-- Need M
   resourceAllocation                   ENUMERATED { resourceAllocationType0, resourceAllocationType1, dynamicSwitch },
   rbg-Size                             ENUMERATED (config2)                                          OPTIONAL,
-- Need S
   powerControlLoopToUse                ENUMERATED {n0, n1},
   p0-PUSCH-Alpha                       P0-PUSCH-AlphaSetId,
   transformPrecoder                    ENUMERATED {enabled, disabled}                                OPTIONAL,  --
Need S
   nrofHARQ-Processes                   INTEGER(1..16),
   repK                                 ENUMERATED {n1, n2, n4, n8},
   repK-RV                              ENUMERATED {s1-0231, s2-0303, s3-0000}                        OPTIONAL,
-- Need R
   periodicity                          ENUMERATED {
                                                sym2, sym7, sym1x14, sym2x14, sym4x14, sym5x14, sym8x14,
sym10x14, sym16x14, sym20x14,
                                                sym32x14, sym40x14, sym64x14, sym80x14, sym128x14, sym160x14,
sym256x14, sym320x14, sym512x14,
                                                sym640x14, sym1024x14, sym1280x14, sym2560x14, sym5120x14,
                                                sym6, sym1x12, sym2x12, sym4x12, sym5x12, sym8x12, sym10x12,
sym16x12, sym20x12, sym32x12,
                                                sym40x12, sym64x12, sym80x12, sym128x12, sym160x12, sym256x12,
sym320x12, sym512x12, sym640x12,
                                                syma1280x12, sym2560x12
   },
   configuredGrantTimes                 INTEGER (1..64)                                               OPTIONAL,  --
Need R
   rrc-ConfiguredUplinkGrant            SEQUENCE {
      timeDomainOffset                          INTEGER (0..5119),
      timeDomainAllocation                      INTEGER   (0..15),
      FrequencyDomamAllocation                  BIT STRING (SIZE(18)),
      antennaPort                               INTEGER (0..31),
      dmrs-SeqInitialization                    INTEGER (0..1)                                        OPTIONAL,  --
Need R
      precodingAndNumberOfLayers                INTEGER (0..63),
      srs-ResourceIndicator                     INTEGER (0..15)                                       OPTIONAL,  --
Need R
      mcsAndTBS                                 INTEGER (0..31),
      frequencyHoppingOffset                    INTEGER (1..                                          OPTIONAL,  --
                                                maxNrofPhysicalResourceBlocks-1)
Need R
      pathlossReferenceIndex                    INTEGER (0..maxNrofPUSCH-PathlossReferenceRSs-1),
      ...                                                                                             OPTIONAL,
   }
-- Need R
   ...
}
```

Subsequently, a PUSCH transmission method is described. A DMRS antenna port for PUSCH transmission is the same as an antenna port for SRS transmission. PUSCH transmission may follow each of a codebook-based transmission method and a non-codebook-based transmission method according to whether a value of txConfig within pusch-Config of [Table 16-4] which is higher-layer signaling is 'codebook' or 'nonCodebook'.

As described above, PUSCH transmission may be dynamically scheduled through DCI format 0_0 or 0_1 or semi-statically configured by the configured grant. When the UE receives an indication of scheduling of PUSCH transmission through DCI format 00, the UE performs a beam configuration for PUSCH transmission by using pucch-spatialRelationInfoID corresponding to a UE-specific PUCCH resource corresponding to a minimum ID within the activated uplink BWP in the serving cell in which case the PUSCH transmission is based on a single antenna port. The UE does not expect scheduling of PUSCH transmission through DCI format 0_0 within a BWP in which the PUCCH resource including pucch-spatialRelationInfo is not configured. When the UE does not receive a configuration of txConfig within pusch-Config of [Table 16-4], the UE does not expect reception of scheduling through DCI format 0_1.

format 0_1 or is semi-statically configured by the configured grant, the UE determines a precoder for PUSCH transmission on the basis of an SRS resource indicator (SRI), a transmission precoding matrix indicator (TPMI), and a transmission rank (the number of PUSCH transmission layers).

At this time, the SRI may be given through an SRS resource indicator field within DCI or may be configured through srs-ResourceIndicator which is higher-layer signaling. In codebook-based PUSCH transmission, the UE may receive a configuration of at least one SRS resource and a maximum of two SRS resources. When the UE receives the SRI through DCI, the SRS resource indicated by the corresponding SRI is the SRS resource corresponding to the SRI among SRS resources transmitted earlier than the PDCCH including the corresponding SRI. Further, the TPMI and the transmission rank may be given through field information and number of layers within DCI or may be configured through precodingAndNumberOfLayers which is higher-layer signaling. The TPMI is used to indicate a precoder applied to PUSCH transmission. When the UE receives a configuration of one SRS resource, the TPMI is used to indicate a precoder to be applied to the one configured SRS resource. When the UE received a configuration of a plu-

TABLE 16-4

```
PUSCH-Config ::=                             SEQUENCE {
    dataScramblingIdentityPUSCH                  INTEGER (0..1023)
OPTIONAL,  -- Need S
    txConfig                                     ENUMERATED {codebook,
nonCodebook}                                         OPTIONAL,  -- Need S
    dmrs-UplinkForPUSCH-MappingTypeA             SetupRelease { DMRS-
UplinkConfig }                                       OPTIONAL,  -- Need M
    dmrs-UplinkForPUSCH-MappingTypeB             SetupRelease { DMRS-
UplinkConfig }                                       OPTIONAL,  -- Need M
    pusch-PowerControl                       PUSCH-PowerControl
OPTIONAL,  -- Need M
    frequencyHopping                             ENUMERATED {intraSlot,
interSlot}                                           OPTIONAL,  -- Need S
    frequencyHoppingOffsetLists              SEQUENCE (SIZE (1..4)) OF
INTEGER (1.. maxNrofPhysicalResourceBlocks-1)
OPTIONAL,  -- Need M
    resourceAllocation                       ENUMERATED
{ resourceAllocationType0, resourceAllocationType1, dynamicSwitch},
    pusch-TimeDomainAllocationList               SetupRelease { PUSCH-
TimeDomainResourceAllocationList }                   OPTIONAL,  -- Need M
    pusch-AggregationFactor                      ENUMERATED { n2, n4, n8 }
OPTIONAL,  -- Need S
    mcs-Table                                    ENUMERATED {qam256,
qam64LowSE}                                          OPTIONAL,  -- Need S
    mcs-Table TransformPrecoder              ENUMERATED {qam256,
qam64LowSE}                                          OPTIONAL,  -- Need S
    transformPrecoder                            ENUMERATED {enabled,
disabled}                                            OPTIONAL,  -- Need S
    codebookSubset                           ENUMERATED
{fullyAndPartialAndNonCoherent, partialAndNonCoherent,nonCoherent}
OPTIONAL, -- Cond codebookBased
    maxRank                                      INTEGER (1..4)
OPTIONAL, -- Cond codebookBased
    rbg-Size                                     ENUMERATED { config2}
OPTIONAL, -- Need S
    uci-OnPUSCH                                      SetupRelease { UCI-
OnPUSCH}                                     OPTIONAL, -- Need M
    tp-pi2BPSK                                   ENUMERATED {enabled}
OPTIONAL, -- Need S
    ...
}
```

Subsequently, codebook-based PUSCH transmission is described. Codebook-based PUSCH transmission may be dynamically scheduled through DCI format 0_0 or 0_1 or semi-statically operate by the configured grant. When the codebook-based PUSCH is dynamically scheduled by DCI rality of SRS resources, the TPMI is used to indicate a precoder to be applied to SRS resources indicated through the SRI.

The precoder to be used for PUSCH transmission is selected from an uplink codebook having the number of antenna ports which is the same as a value of nrofSRS-Ports within SRS-Config which is higher-layer signaling. In codebook-based PUSCH transmission, the UE determines a codebook subset on the basis of the TPMI and a codebookSubset within pusch-Config which is higher-layer signaling. The codebookSubset within pusch-Config which is higher-layer signaling may be configured as one of 'fullyAndPartialAndNonCoherent', 'partialAndNonCoherent', or 'nonCoherent' on the basis of the UE capability which the UE reports to the BS. When the UE reports 'partialAndNonCoherent' as the UE capability, the UE does not expect a configuration of the value of the codebookSubset which is higher-layer signaling as 'fullyAndPartialAndNonCoherent'. Further, when the UE reports 'nonCoherent' as the UE capability, the UE does not expect a configuration of the value of the codebookSubset which is higher-layer signaling as 'fullyAndPartialAndNonCoherent' or 'partialAndNonCoherent'. When nrofSRS-Ports within SRS-ResourceSet which is higher-layer signaling indicate two SRS antenna ports, the UE does not expect a configuration of the value of the codebookSubset which is higher-layer signaling as 'partialAndNonCoherent'.

The UE may receive a configuration of one SRS resource set having a value of usage within SRS-ResourceSet which is higher-layer signaling configured as 'codebook', and one SRS resource may be indicated through the SRI within the corresponding SRS resource set. When several SRS resources are configured within the SRS resource set having the value of usage within SRS-ResourceSet which is higher-layer signaling configured as 'codebook', the UE expects a configuration of the same value of nrofSRS-Ports within the SRS-Resource which is higher-layer signaling for all SRS resources.

The UE may transmit one or a plurality of SRS resources included in the SRS resource set having the value of usage configured as 'codebook' to the BS according to higher-layer signaling, and the BS may select one of the SRS resources transmitted by the UE and instruct the UE to perform PUSCH transmission by using transmission beam information of the corresponding SRS resource. At this time, in codebook-based PUSCH transmission, the SRI is used as information for selecting an index of one SRS resource and is included in DCI. In addition, the BS may insert information indicating the TPMI and the rank to be used for PUSCH transmission by the UE into DCI. The UE performs PUSCH transmission by applying a precoder indicated by the rank and the TPMI indicated on the basis of the transmission beam of the corresponding SRS resource using the SRS resource indicated by the SRI.

Subsequently, non-codebook-based PUSCH transmission is described. Non-codebook-based PUSCH transmission may be dynamically scheduled through DCI format 0_0 or 0_1 or semi-statically operate by the configured grant. When at least one SRS resource is configured within the SRS resource set having the value of usage configured as 'nonCodebook' within SRS-ResourceSet which is higher-layer signaling, the UE may receive scheduling of non-codebook-based PUSCH transmission through DCI format 0_1.

For the SRS resource set having the value of usage configured as 'nonCodebook' within SRS-ResourceSet which is higher-layer signaling, the UE may receive a configuration of one connected non-zero power CSI-RS (NZP CSI-RS). The UE may calculate a precoder for SRS transmission through measurement for the NZP CSI-RS resource connected to (or associated with) the SRS resource set. When a difference between the last reception symbol of the aperiodic NZP CSI-RS resource connected to the SRS resource set and the first symbol of aperiodic SRS transmission in the UE is smaller than 42 symbols, the UE does not expect an update of information on the precoder for SRS transmission.

When the value of resource Type within SRS-ResourceSet which is higher-layer signaling is configured as 'aperiodic', the connected NZP CSI-RS is indicated by an SRS request which is a field within DCI format 0_1 or 1_1. At this time, when the connected NZP CSI-RS resource is an aperiodic NZP CSI-RS resource, the case in which the value of the SRS request field within DCI format 0_1 or 1_1 is not '00' indicates the existence of the connected NZP CSI-RS. At this time, the corresponding DCI should not indicate cross carrier or cross BWP scheduling. Further, when the value of the SRS request indicates the existence of the NZP CSI-RS, the corresponding NZP CSI-RS is located in a slot in which the PDCCH including the SRS request field is transmitted. At this time, TCI states configured in the scheduled subcarrier are not configured as QCL-TypeD.

When the periodic or semi-persistent SRS resource set is configured, the connected NZP CSI-RS may be indicated through an associatedCSI-RS within SRS-ResourceSet which is higher-layer signaling. For non-codebook-based transmission, the UE does not expect configurations of both spatialRelationInfo which is higher layer signaling for the SRS resource and associatedCSI-RS within SRS-ResourceSet which is higher-layer signaling.

When the UE receives a configuration of a plurality of SRS resources, the UE may determine a precoder and a transmission rank to be applied to PUSCH transmission on the basis of an SRI indicated by the BS. At this time, the SRI may be indicated through an SRS resource indicator field within DCI or may be configured through srs-ResourceIndicator which is higher-layer signaling. Like the codebook-based PUSCH transmission, when the UE receives the SRI through DCI, the SRS resource indicated by the corresponding SRI is the SRS resource corresponding to the SRI among SRS resources transmitted earlier than the PDCCH including the corresponding SRI. The UE may use one or a plurality of SRS resources for SRS transmission, and the maximum number of SRS resources which can be simultaneously transmitted in the same symbol within one SRS resource set and the maximum number of SRS resources are determined by the UE capability which the UE reports to the BS. At this time, SRS resources which the UE simultaneously transmits occupy the same RB. The UE configures one SRS port for each SRS resource. The number of SRS resource sets having the value of usage configured as 'nonCodebook' within SRS-ResourceSet which is higher-layer signaling is only one, and the maximum number of SRS resources for non-codebook-based PUSCH transmission can be 4.

The BS transmits one NZP-CSI-RS connected to the SRS resource set, and the UE calculates a precoder to be used for one or a plurality of SRS resource transmissions within the corresponding SRS resource set on the basis of the measurement result when the corresponding NZP-CSI-RS is received. When transmitting one or a plurality of SRS resources within the SRS resource set having usage configured as 'nonCodebook' to the BS, the UE applies the calculated precoder and the BS selects one or a plurality of SRS resources from among the one or plurality of received SRS resources. At this time, in non-codebook-based PUSCH transmission, the SRI indicates an index which may express one SRS resource or a combination of a plurality of SRS resources, and the SRI is included in the DCI. The number of SRS resources indicated by the SRI transmitted by the BS may be the number of transmission layers of the PUSCH, and the UE transmits the PUSCH by applying the precoder applied to SRS resources to each layer.

[PUSCH: Preparation Procedure Time]

Subsequently, a PUSCH preparation procedure time (PUSCH preparation procedure time) is described. When the BS schedules the UE to transmit a PUSCH by using DCI format 0_0 or DCI format 01, the UE may need a PUSCH preparation procedure time for transmitting a PUSCH by applying a transmission method (a transmission precoding method of SRS resources, the number of transmission layers, and a spatial domain transmission filter) indicated through DCI. In NR, a PUSCH preparation procedure time considering the same is defined. The PUSCH preparation procedure time of the UE may follow [Equation 3] below.

$$T_{proc,2} = \max((N_2 + d_{2,1} + d_2)(2048 + 144)\kappa 2^{-\mu} T_c + T_{ext} + T_{switch}, d_{2,2})$$ [Equation 3]

In Tproc,2 described above, each parameter may have the following meaning.

N2: the number of symbols determined according to UE processing capability 1 or 2 based on a UE capability and numerology. It may have a value in [Table 16-5] when UE processing capability 1 is reported according to a UE capability report and may have a value in [Table 16-6] when UE processing capability 2 is reported and information indicating that UE processing capability 2 can be used is configured through higher-layer signaling.

TABLE 16-5

| μ | PUSCH preparation time N$_2$ [symbols] |
|---|---|
| 0 | 10 |
| 1 | 12 |
| 2 | 23 |
| 3 | 36 |

TABLE 16-6

| μ | PUSCH preparation time N$_2$ [symbols] |
|---|---|
| 0 | 5 |
| 1 | 5.5 |
| 2 | 11 for frequency range 1 | d2,1: the number of symbols determined as 0 when all resource elements of a first OFDM symbol in PUSCH transmission include only DM-RSs and, otherwise, determined as 1.

κ: 64

μ: follows a value making Tproc,2 larger among $\mu_{DL}$ or $\mu_{UL}$. $\mu_{DL}$ is downlink numerology for transmitting a PDCCH including DCI scheduling a PUSCH and $\mu_{UL}$ is uplink numerology for transmitting a PUSCH.

Tc: $1/(\Delta f_{max} \cdot N_f)$, $\Delta f_{max} = 480 \cdot 10^3$ Hz, $N_f = 4096$.

d2,2: follows a BWP switching time when DCI scheduling a PUSCH indicates BWP switching and, otherwise, has 0.

d2: a value of d2 of a PUSCH having a high priority index is used when OFDM symbols of the PUCCH, the PUSCH having the high priority index, and a PUCCH having a low priority index overlap in the time. Otherwise, d2 is 0.

Text: the UE may calculate Text and apply the same to a PUSCH preparation procedure time when the UE uses a shared spectrum channel access scheme. Otherwise, it is assumed that Text is 0.

Tswitch: it is assumed that Tswitch is a switching interval time when an uplink switching interval is triggered. Otherwise, it is assumed that Tswitch is 0.

In consideration of time axis resource mapping information of the PUSCH scheduled through DCI and an effect of uplink-downlink timing advance (TA), the BS and the UE may determine that the PUSCH preparation procedure time is not sufficient when a first symbol of the PUSCH starts earlier than a first uplink symbol at which the CP starts after Tproc,2 from a last symbol of the PDCCH including the DCI scheduling the PUSCH. Otherwise, the BS and the UE determine that the PUSCH preparation procedure time is sufficient. The UE may transmit the PUSCH only when the PUSCH preparation procedure time is sufficient, and may ignore the DCI scheduling the PUSCH when the PUSCH preparation procedure time is not sufficient.

Subsequently, PUSCH repetitive transmission is described. When the UE receives scheduling of PUSCH transmission in DCI format 0_1 within the PDCCH including CRC scrambled by a C-RNTI, an MCS-C-RNTI, or a CS-RNTI, if the UE receives a configuration of pusch-AggregationFactor which is higher-layer signaling, the same symbol allocation is applied in successive slots of pusch-AggregationFactor and PUSCH transmission is limited to single rank transmission. For example, the UE should repeat the same TB in successive slots of pusch-AggregationFactor and apply the same symbol allocation for each slot. [Table 16-7] shows a redundancy version applied to PUSCH repetitive transmission for each slot. When the UE receives scheduling of PUSCH repetitive transmission in a plurality of slots by DCI format 0_1 and at least one symbol in slots for PUSCH repetitive transmission is indicated as downlink symbols according to information on tdd-UL-DL-ConfigurationCommon or tdd-UL-DL-ConfigurationDedicated which is higher-layer signaling, the UE does not perform PUSCH transmission in the slot in which the corresponding symbol is located.

TABLE 16-7

| rv$_{id}$ indicated by the DCI scheduling the PUSCH | rv$_{id}$ to be applied to n$^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

[PUSCH: Related to Repetitive Transmission]

Hereinafter, repetitive transmission of an uplink data channel in a 5G system is described in detail. In the 5G system, two types such as a PUSCH repetitive transmission type A and a PUSCH repetitive transmission type B are supported as the repetitive transmission method of the uplink data channel. The UE may receive a configuration of one of PUSCH repetitive transmission type A or B through higher-layer signaling.

PUSCH Repetitive Transmission Type A

As described above, the symbol length of the uplink data channel and the location of a start symbol may be determined through the time domain resource allocation method within one slot, and the BS may notify the UE of the number of repetitive transmissions through higher-layer signaling (for example, RRC signaling) or L1 signaling (for example, DCI).

The UE may repeatedly transmit uplink data channels having the configured same uplink data channel length and start symbol in successive slots on the basis of the number of repetitive transmissions received from the BS. At this time, when slots which are configured as the downlink in the UE by the BS or one or more symbols among the symbols of the uplink data channel configured in the UE are configured as the downlink, the UE omits uplink data channel transmission but counts the number of repetitive transmissions of the uplink data channel.

PUSCH Repetitive Transmission Type B

As described above, the symbol length of the uplink data channel and the location of a start symbol may be determined through the time domain resource allocation method within one slot, and the BS may notify the UE of the number numberofrepetitions of repetitive transmissions through higher-layer signaling (for example, RRC signaling) or L1 signaling (for example, DCI).

First, nominal repetition of the uplink data channel is determined on the basis of the start symbol and the length of the configured uplink data channel. A slot in which nth nominal repetition starts is given by $$K_s + \left\lfloor \frac{S + n \cdot L}{N_{symb}^{slot}} \right\rfloor,$$

and a symbol starting in the slot is given by mod(S+n·L, $N_{symb}^{slot}$). A slot in which nth nominal repetition ends is given by $$K_s + \left\lfloor \frac{S + (n+1) \cdot L - 1}{N_{symb}^{slot}} \right\rfloor,$$

and a symbol ending in the slot is given by mod(S+ (n+1)·L−1, $N_{symb}^{slot}$). Here, n=0, . . . , numberofrepetitions−1, S is a start symbol of a configured uplink data channel, and L is the symbol length of the configured uplink data channel. $K_s$ denotes a slot in which PUSCH transmission starts and $N_{symb}^{slot}$ denotes the number of symbols per slot.

The UE determines an invalid symbols for the PUSCH repetitive transmission type B. A symbol configured as the downlink by tdd-UL-DL-ConfigurationCommon or tdd-UL-DL-ConfigurationDedicated is determined as an invalid symbol for the PUSCH repetitive transmission type B. In addition, the invalid symbol may be configured in a higher-layer parameter (for example, InvalidSymbolPattern). The higher-layer parameter (for example, InvalidSymbolPattern) provides a symbol level bit map over one or two slots to configure the invalid symbol. In the bitmap, 1 indicates an invalid symbol. In addition, a period and a pattern of the bitmap may be configured through a higher-layer parameter (for example, periodicityAndPattern). When the higher-layer parameter (for example, InvalidSymbolPattern) is configured, the UE applies an invalid symbol pattern if an InvalidSymbolPatternIndicator-ForDCIFormat0_1 or InvalidSymbolPatternIndicator-ForDCIFormat0_2 parameter indicates 1, or the UE may not apply the invalid symbol pattern if the parameter indicates 0. When the higher-layer parameter (for example, InvalidSymbolPattern) is configured and the InvalidSymbolPatternIndicator-ForDCIFormat0_1 or InvalidSymbolPatternIndicator-ForDCIFormat0_2 is not configured, the UE applies the invalid symbol pattern.

After the invalid symbol is determined, for each nominal repetition, the UE may consider symbols except for the invalid symbol as valid symbols. When one or more valid symbols are included in each nominal repetition, the nominal repetition may include one or more actual repetitions. Each actual repetition includes successive sets of valid symbols which can be used for the PUSCH repetitive transmissions type B in one slot.

Figure 13B:
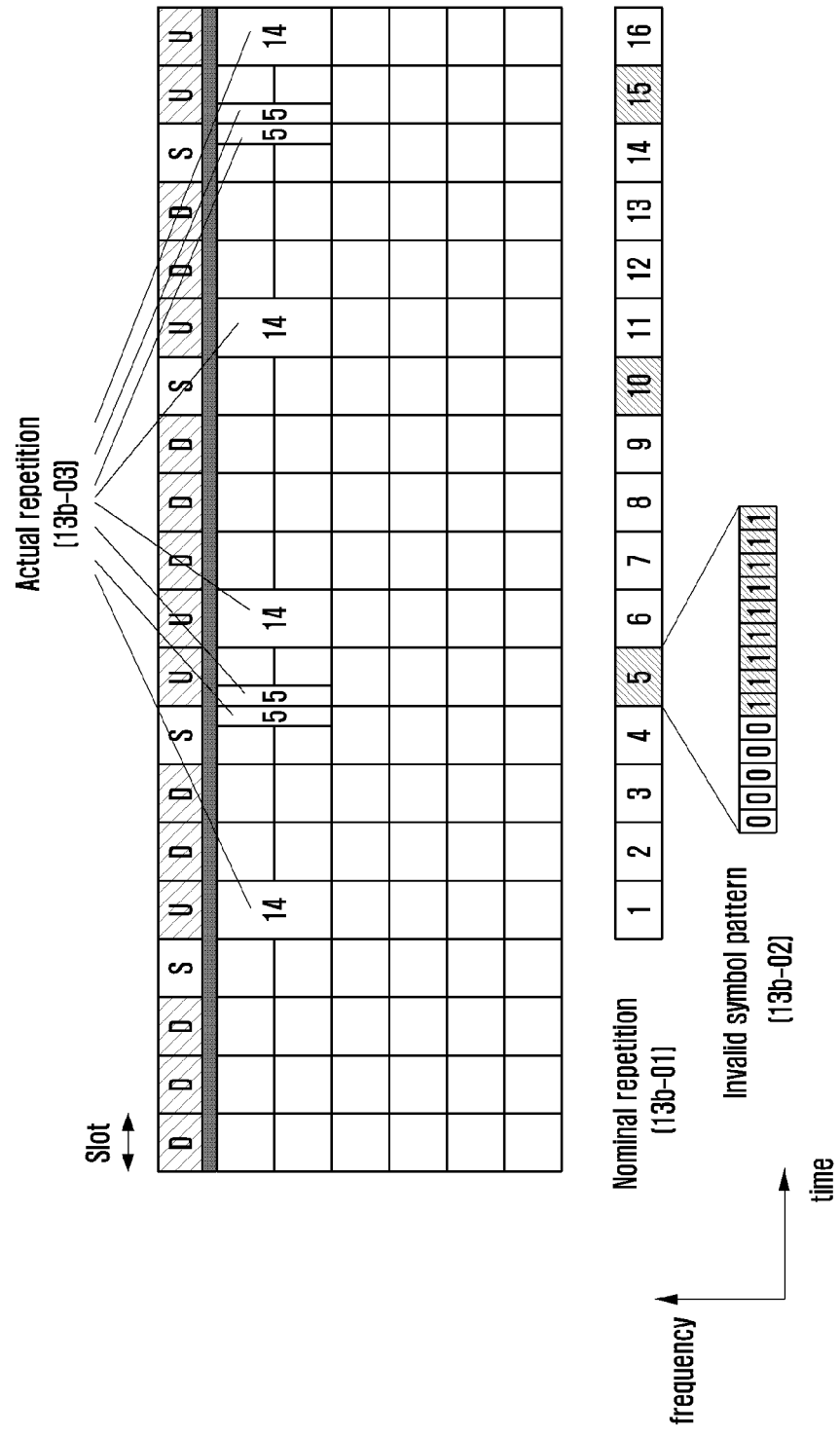
FIG. 13B illustrates an example of PUSCH repetitive transmission type B in a wireless communication system according to an embodiment of the disclosure.

FIG. 13B illustrates an example of PUSCH repetitive transmission type B in a wireless communication system according to an embodiment of the disclosure.

Referring to FIG. 13B, the UE may receive a configuration of the start symbol S of the uplink data channel as 0, the length L of the uplink data channel as 14, and the number of repetitive transmissions as 16. In this case, nominal repetition 13b-01 appears in 16 successive slots. Thereafter, the UE may determine a symbol configured as a downlink symbol in each nominal repetition 13b-01 as an invalid symbol. Further, the UE determines symbols configured as 1 in an invalid symbol pattern 13b-02 as invalid symbols. When valid symbols other than the invalid symbol in each nominal repetition includes one or more successive symbols in one slot, the valid symbols are configured and transmitted as actual repetition 13b-03.

Further, for PUSCH repetitive transmission, the following additional methods may be defined for UL grant-based PUSCH transmission and configured grant-based PUSCH transmission beyond the slot boundary in NR Release 16.

Method 1 (mini-slot level repetition): two or more PUSCH repetitive transmissions are scheduled within one slot or beyond the boundary of successive slots through one UL grant. In method 1, time domain resource allocation information within DCI indicates resources of first repetitive transmission. Time domain resource information of the remaining repetitive transmissions may be determined according to the domain resource information of first repetitive transmission and an uplink or downlink direction determined for each symbol. Each repetitive transmission occupies successive symbols.

Method 2 (multi-segment transmission): two or more PUSCH repetitive transmissions are scheduled in successive slots through one UL grant. At this time, one transmission is designated for each slot, and start points or repetition lengths may vary depending on each transmission. In method 2, the time domain resource allocation information within DCI indicates start points and repetition lengths of all repetitive transmissions. When repetitive transmission is performed within a single slot through method 2 and there are sets of successive uplink symbols within the corresponding slot, each repetitive transmission is performed for each uplink symbol set. When there is only one set of successive uplink symbols within the corresponding slot, one PUSCH repetitive transmission is performed according to the method of NR Release 15.

Method 3: two or more PUSCH repetitive transmissions are scheduled in successive slots through two or more UL grants. At this time, one transmission is designated for each slot, and an nth UL grant may be received before PUSCH transmission scheduled by an (n−1)th UL grant ends.

Method 4: one or a plurality of PUSCH repetitive transmissions may be supported within a signal slot or two or more PUSCH repetitive transmissions may be supported over boundaries of successive slots through one UL grant or one configured grant. The number of repetitions which the BS indicates to the UE is only a nominal value, and the number of PUSCH repetitive transmissions which the UE actually performs may be larger than the nominal number of repetitions. Time domain resource allocation information within the DCI or the configured grant is resources of the first repetitive transmission indicated by the BS. Time domain resource information of the remaining repetitive transmissions may be determined with reference to resource information of the first repetitive transmission and uplink or downlink directions of symbols. When the time domain resource information of repetitive transmission indicated by the BS is over the slot boundary or includes an uplink/downlink switching point, the corresponding repetitive transmission may be divided into a plurality of repetitive transmissions. At this time, one repetitive transmission may be included for each uplink period in one slot.

[PUSCH: Frequency Hopping Process]

Hereinafter, frequency hopping of an uplink data channel (physical uplink shared channel (PUSCH)) in a 5G system is described in detail.

In 5G, two methods are supported for each PUSCH repetitive transmission type as the frequency hopping method of the uplink data channel. First, intra-slot frequency hopping and inter-slot frequency hopping are supported in a PUSCH repetitive transmission type A, and inter-repetition frequency hopping and inter-slot frequency hopping are supported in a PUSCH repetitive transmission type B.

The intra-slot frequency hopping method supported in the PUSCH repetitive transmission type A is a method of changing allocated resources in the frequency domain by a frequency offset in two hops within one slot to perform transmission. In intra-slot frequency hopping, a start RB of each hop may be indicated through [Equation 4].

$$RB_{start} = \begin{cases} RB_{start} & i = 0 \\ (RB_{start} + RB_{offset}) \bmod N_{BWP}^{size} & i = 1 \end{cases} \quad \text{[Equation 4]}$$

In [Equation 4], i=0 and i=1 denote a first hop and a second hop, and $RB_{start}$ denotes a start RB in an UL BWP and is calculated by a frequency resource allocation method. $RB_{offset}$ denotes a frequency offset between two hops through a higher-layer parameter. The number of symbols of the first hop may be indicated as $\lfloor N_{symb}^{PUSCH,s}/2 \rfloor$, and the number of symbols of the second hop may be indicated as $N_{symb}^{PUSCH,s} - \lfloor N_{symb}^{PUSCH,s}/2 \rfloor$. $N_{symb}^{PUSCH,s}$ denotes the length of PUSCH transmission within one slot and indicated by the number of OFDM symbols.

Subsequently, the inter-slot frequency hopping method supported in the PUSCH repetitive transmission types A and B is a method by which the UE changes allocated resources in the frequency domain by a frequency offset in every slot to perform transmission. In inter-slot frequency hopping, a start RB during slots may be indicated through [Equation 5].

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 5]}$$

In [Equation 5], $n_s^\mu$ denotes a current slot number in multi-slot PUSCH transmission, and $RB_{start}$ denotes a start RB in an UP BWP and is calculated by a frequency resource allocation method. $RB_{offset}$ denotes a frequency offset between two hops through a higher-layer parameter.

Subsequently, the inter-repetition frequency hopping method supported in the PUSCH repetitive transmission type B is a method of moving allocated resources in the frequency domain by a configured frequency offset to perform transmission for one or a plurality of repetitions within each nominal repetition. For one or a plurality of actual repetitions within an nth nominal repetition, RBstart(n) which is an index of the start RB in the frequency domain may follow [Equation 6] below.

$$RB_{start}(n) = \begin{cases} RB_{start} \\ (RB_{start} + RB_{offset}) \bmod N_{BWP}^{size} \end{cases} \quad \text{[Equation 6]}$$

In [Equation 6], n denotes an index of nominal repetition, and $RB_{offset}$ denotes an RB offset between two hops through a higher-layer parameter.

[Related to UE Capability Report]

In LTE and NR, the UE may perform a procedure of reporting a capability supported by the UE to the corresponding BS in the state in which the UE is connected to a serving BS. In the following description, this is referred to as a UE capability report.

The BS may transmit a UE capability enquiry message that makes a request for a capability report to the UE in the connected state. The message may include a UE capability request for each radio access technology (RAT) type of the BS. The request for each RAT type may include supported frequency band combination information. In the case of the UE capability enquiry message, UE capabilities for each of a plurality of RAT types may be requested through one RRC message container transmitted by the BS or the BS may insert the UE capability enquiry message including the UE capability request for each RAT type multiple times and transmit the same to the UE. That is, the UE capability enquiry is repeated multiple times within one message and the UE may configure a UE capability information message corresponding thereto and report the same multiple times. In the next-generation mobile communication system, a UE capability request for NR, LTE, E-UTRA-NR dual connectivity (EN-DC), and multi-RAT dual connectivity (MR-DC) may be made. The UE capability enquiry message is generally transmitted initially after the UE is connected to the BS, but may be requested at any time when the BS needs the same.

The UE receiving the UE capability report request from the BS in the above operation configures a UE capability according to RAT type and band information requested by the BS. Hereinafter, a method by which the UE configures the UE capability in the NR system is described.

1. When the UE receives a list of LTE and/or NR bands from the BS through a UE capability request, the UE configures a band combination (BC) for EN-DC and NR stand alone (SA). That is, the UE configures a candidate list of BCs for EN-DC and NR SA on the basis of requested bands in FreqBandList. The bands sequentially have priorities as stated in FreqBandList.
2. When the BS sets a "eutra-nr-only" flag or a "eutra" flag and makes a request for the UE capability report, the UE completely removes NR SA BCs from the configured candidate list of BCs. Such an operation may occur only when the LTE BS (eNB) makes a request for a "eutra" capability.
3. Thereafter, the UE removes fallback BCs from the candidate list of BCs configured in the above stage. The fallback BC is a BC which can be obtained by removing a band corresponding to at least one SCell from a predetermined BC, and a BC before the removal of the band corresponding at least one SCell can cover the fallback BC and thus the fallback BC can be omitted. This operation is applied to MR-DC, that is, LTE bands. BCs left after the operation correspond to a final "candidate BC list".
4. The UE selects BCs suitable for a requested RAT type in the final "candidate BC list" and selects BCs to be reported. In this operation, the UE configures supportedBandCombinationList according to a determined order. That is, the UE configures BCs and UE capability to be reported according to an order of a preset rat-Type (nr→eutra-nr→eutra). Further, the UE configures featureSetCombination for the configured supportedBandCombinationList and configures a list of "candidate feature set combination" in a candidate BC list from which a list for fallback BCs (including capability at the same or lower stage) is received. The "candidate feature set combination" may include all feature set combinations for NR and EUTRA-NR BCs, and may be acquired from a feature set combination of UE-NR-Capabilities and UE-MRDC-Capabilities containers.
5. When the requested rat Type is eutra-nr and influences, featureSetCombinations are included in all of the two containers of UE-MRDC-Capabilities and UE-NR-Capabilities. However, the NR feature set includes only UE-NR-Capabilities.

After the UE capability is configured, the UE transmits a UE capability information message including the UE capability to the BS. The BS performs scheduling and transmission/reception management suitable for the corresponding UE on the basis of the UE capability received from the UE.
[Related to CA/DC]

Figure 14:
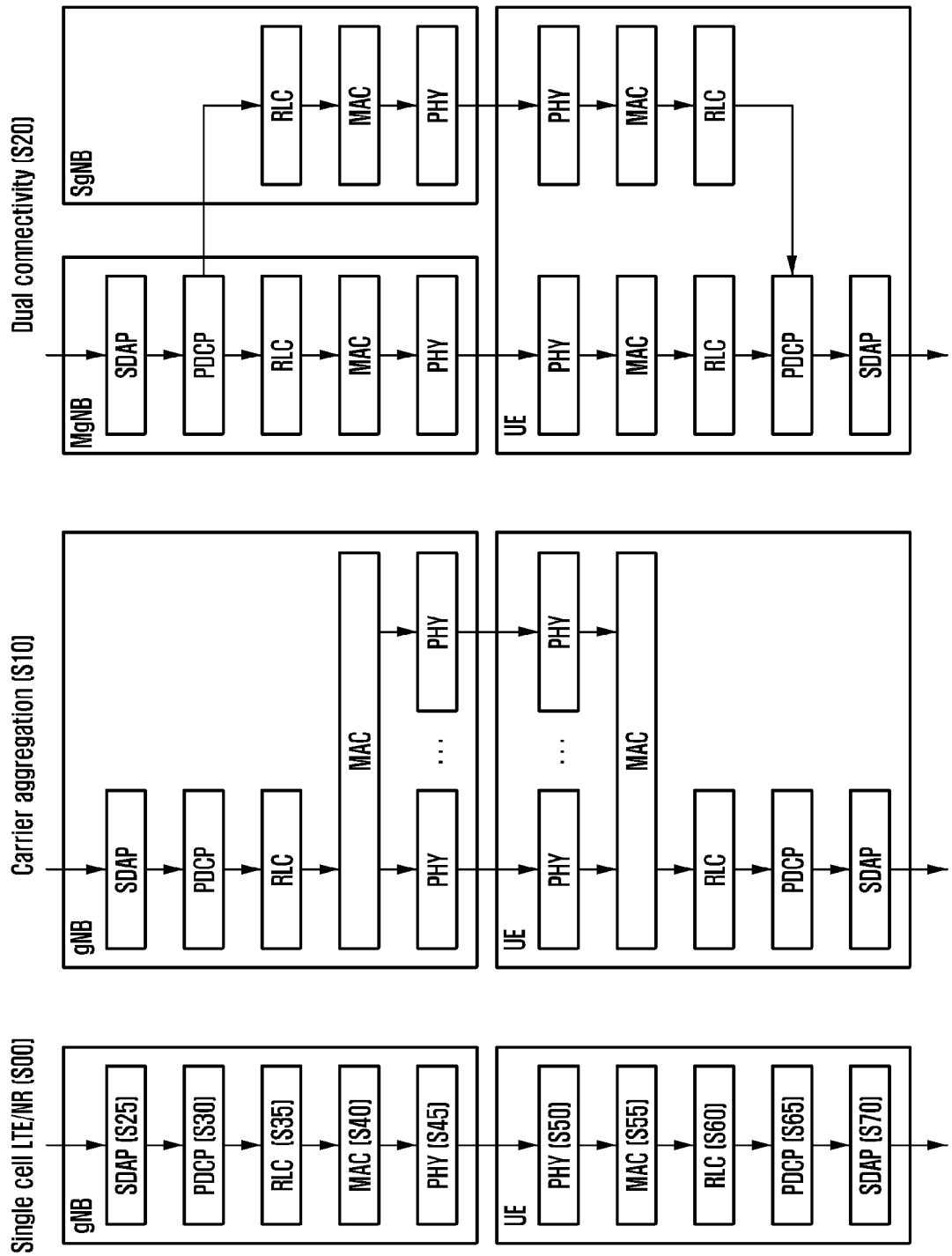
FIG. 14 illustrates a wireless protocol structure of the BS and the UE in single cell, carrier aggregation, and dual connectivity in a wireless communication system according to an embodiment of the disclosure.

FIG. 14 illustrates a wireless protocol structure of the BS and the UE in single cell, carrier aggregation, and dual connectivity in a wireless communication system according to an embodiment of the disclosure.

Referring to FIG. 14, in a wireless protocol of the next-generation mobile communication system, the UE and the NR BS include NR service data adaptation protocols (SDAPs) S25 and S70, NR packet data convergence protocols (PDCPs) S30 and S65, NR radio link controls (RLCs) S35 and S60, and NR medium access controls (MACs) S40 and S55, respectively.

Main functions of the NR SDAPs S25 and S70 may include some of the following functions.
  User data transmission function (transfer of user-plane data)
  Function of mapping QoS flow and a data bearer for uplink and downlink (mapping between a QoS flow and a DRB for both DL and UL)
  Function of marking a QoS flow ID for uplink and downlink (marking QoS flow ID in both DL and UL packets)
  Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data processing priority and scheduling information for seamlessly supporting a service.

Main functions of the NR PDCPs S30 and S65 may include some of the following functions
  Header compression and decompression function (Header compression and decompression: ROHC only)
  User data transmission function (Transfer of user data)
  Sequential delivery function (In-sequence delivery of upper layer PDUs)
  Non-sequential delivery function (Out-of-sequence delivery of upper layer PDUs)
  Reordering function (PDCP PDU reordering for reception)
  Duplicate detection function (Duplicate detection of lower layer SDUs)
  Retransmission function (Retransmission of PDCP SDUs)
  Ciphering and deciphering function (Ciphering and deciphering)
  Timer-based SDU removal function (Timer-based SDU discard in uplink)

The reordering function of the NR PDCP device is a function of sequentially reordering PDCP PDUs received by a lower layer on the basis of a PDCP sequence number (SN), and may include a function of sequentially transferring the reordered data to a higher layer. Alternatively, the reordering function of the NR PDCP device may include a function of directly transmitting data regardless of the sequence, a function of recording PDCP PDUs lost due to the reordering, a function of reporting statuses of the lost PDCP PDUs to a transmitting side, and a function of making a request for retransmitting the lost PDCP PDUs.

Main functions of the NR RLCs S35 and S60 may include some of the following functions.
  Data transmission function (Transfer of upper layer PDUs)
  Sequential delivery function (In-sequence delivery of upper layer PDUs)
  Non-sequential delivery function (Out-of-sequence delivery of upper layer PDUs)
  ARQ function (Error correction through ARQ)
  Concatenation, segmentation, and reassembly function (Concatenation, segmentation, and reassembly of RLC SDUs)
  Re-segmentation function (Re-segmentation of RLC data PDUs)
  Reordering function (Reordering of RLC data PDUs)
  Duplicate detection function (Duplicate detection)
  Error detection function (Protocol error detection)
  RLC SDU deletion function (RLC SDU discard)
  RLC re-establishment function (RLC re-establishment)

The sequential delivery function (in-sequence delivery) of the NR RLC device is a function of sequentially transmitting RLC SDUs received from a lower layer to the higher layer. When one original RLC SDU is divided into a plurality of RLC SDUs and then received, the sequential delivery function (In-sequence delivery) of the NR RLC layer device may include a function of reassembling and transmitting the RLC SDUs, a function of reordering the received RLC PDUs on the basis of an RLC sequence number (SN) or a PDCP SN, a function of recording RLC PDUs lost due to the reordering, a function of reporting statuses of the lost RLC PDUs to a transmitting side, and a function of making a request for retransmitting the lost RLC PDUs. When there are lost RLC SDUs, the sequential delivery function (In-sequence delivery) of the NR RLC layer device may include a function of sequentially transferring only RLC SDUs preceding the lost RLC SDUs to the higher layer or a function of, if a predetermined timer expires even though there are lost RLC SDUs, sequentially transferring all RLC SDUs received before the timer starts to the higher layer. Alternatively, the sequential delivery function (in-sequence delivery) of the NR RLC layer device may include may include a function of, if a predetermined timer expires even though there are lost RLC SDUs, sequentially transferring all RLC SDUs received up to now to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs S40 and S55 may be connected to a plurality of NR RLC layer devices configured in one UE and main functions of the NR MAC may include some of the following functions.

Mapping function (Mapping between logical channels and transport channels)
 Multiplexing and demultiplexing function (Multiplexing/demultiplexing of MAC SDUs)
 Scheduling information report function (scheduling information reporting)
 HARQ function (Error correction through HARQ)
 Logical channel priority control function (Priority handling between logical channels of one UE)
 UE priority control function (Priority handling between UEs by means of dynamic scheduling)
 MBMS service identification function (MBMS service identification)
 Transport format selection function (Transport format selection)
 Padding function (Padding)

The NR PHY layers S45 and S50 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

A detailed structure of the wireless protocol structure may be variously changed according to a carrier (or cell) operation scheme. For example, when the BS transmits data to the UE on the basis of a single carrier (or cell), the BS and the UE use a protocol structure having a single structure for each layer as indicated by reference numeral S00. On the other hand, when the BS transmits data to the UE on the basis of carrier aggregation (CA) using multiple carriers in a single TRP, the BS and the UE use a protocol structure in which layers up to RLC have a single structure but the PHY layer is multiplexed through the MAC layer as indicated by reference numeral S10. In another example, when the BS transmits data to the UE on the basis of dual connectivity (DC) using multiple carriers in multiple TRPs, the BS and the UE use a protocol structure in which layers up to RLC have a single structure but the PHY layer is multiplexed through the MAC layer as indicated by reference numeral S20.

[Related to NC-JT]

According to an embodiment of the disclosure, in order to receive a PDSCH from a plurality of TRPs, the UE may use non-coherent joint transmission (NC-JT).

Unlike the conventional system, the 5G wireless communication system supports not only a service requiring a high transmission rate but also both a service having a very short transmission delay and a service requiring a high connection density. In a wireless communication network including a plurality of cells, transmission and reception points (TRPs), or beams, cooperative communication (coordinated transmission) between respective cells, TRPs, or/and beams may satisfy various service requirements by increasing the strength of a signal received by the UE or efficiently controlling interference between the cells, TRPs, or/and beams. In the following description of the disclosure, for convenience, a cell, a TRP, a panel, a beam, or/and a transmission direction distinguished by an indicator such as a higher layer/L1 parameter of a TCI state and spatial relation information, a cell ID, a TRP ID, or a panel ID is commonly described as a transmission reception point (TRP). Accordingly, in the actual application, the TRP can be properly replaced with one of the above terms.

Joint transmission (JT) is a representative transmission technology for the cooperative communication and may increase the strength of a signal received by the UE or throughput by transmitting signals to one UE through different cells, TRPs, or/and beams. At this time, a channel between each cell, TRP, or/and beam and the UE may have different characteristics, and particularly, non-coherent joint transmission (NC-JT) supporting non-coherent precoding between respective cells, TRPs, or/and beams may need individual precoding, MCS, resource allocation, and TCI indication according to the channel characteristics for each link between each cell, TRP, or/and beam and the UE.

The NC-JT may be applied to at least one of a downlink data channel (PDSCH), a downlink control channel (PDCCH), an uplink data channel (PUSCH), and an uplink control channel (PUCCH). In PDSCH transmission, transmission information such as precoding, MCS, resource allocation, and TCI may be indicated through DL DCI, and should be independently indicated for each cell, TRP, or/and beam for the NC-JT. This is a main factor that increases payload required for DL DCI transmission, which may have a bad influence on reception performance of a PDCCH for transmitting the DCI. Accordingly, in order to support JT of the PDSCH, it is required to carefully design a tradeoff between an amount of DCI information and reception performance of control information.

Figure 15:
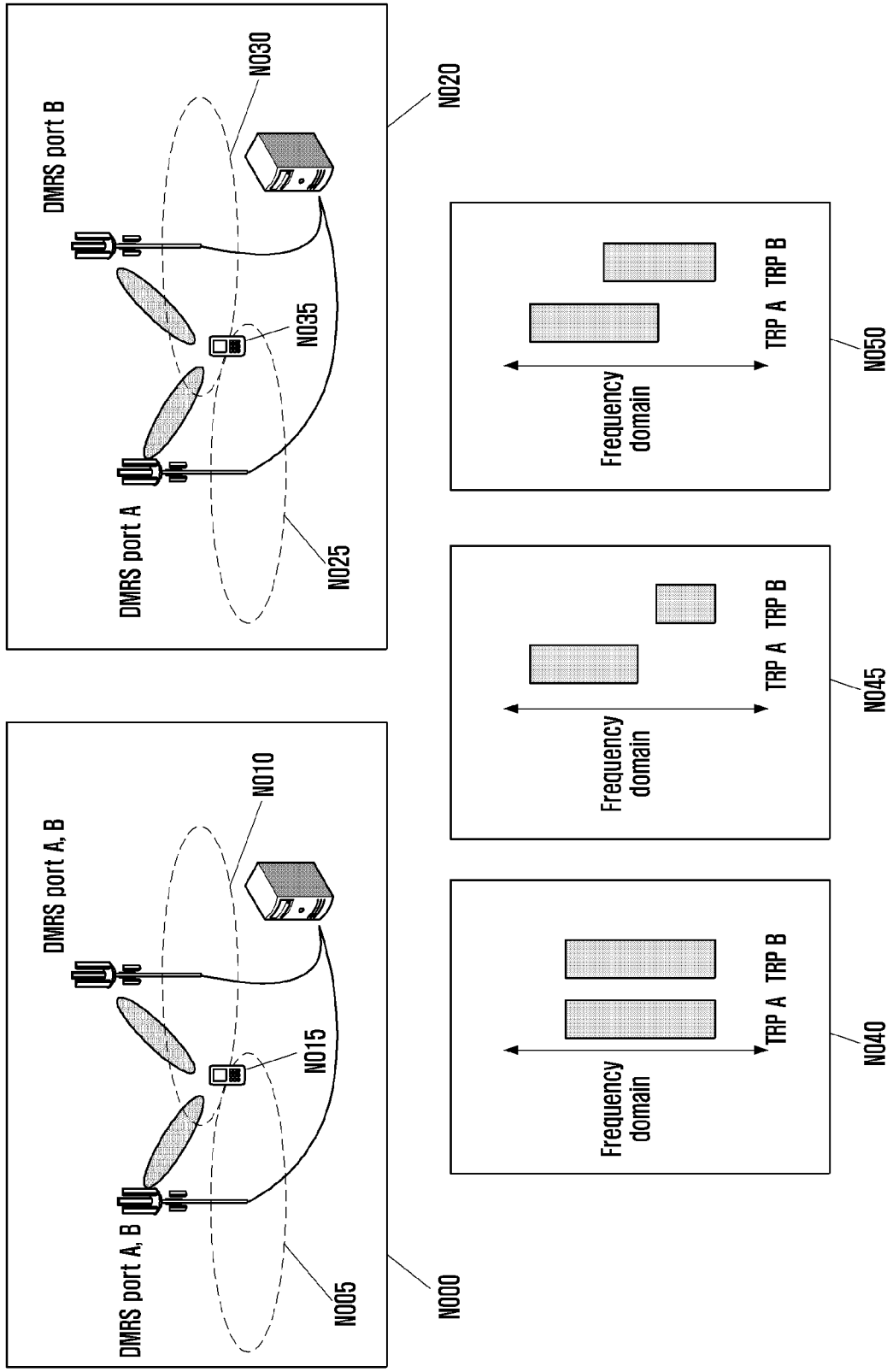
FIG. 15 illustrates a configuration of antenna ports and an example of resource allocation for cooperative communication in a wireless communication system according to an embodiment of the disclosure.

FIG. 15 illustrates a configuration of antenna ports and an example of resource allocation to transmit a PDSCH through cooperative communication in a wireless communication system according to an embodiment of the disclosure.

Referring to FIG. 15, the example for PDSCH transmission is described for each scheme of joint transmission (JT), and examples for allocating radio resources for each TRP are described.

Referring to FIG. 15, an example N000 of coherent joint transmission (C-JT) supporting coherent precoding between respective cells, TRPs, or/and beams is illustrated.

In the case of C-JT, a TRP A N005 and a TRP B N010 transmit single data (PDSCH) to a UE N015, and the plurality of TRPs may perform joint precoding. This may mean that the TRP A N005 and the TPR B N010 transmit DMRSs through the same DMRS ports in order to transmit the same PDSCH. For example, the TRP A N005 and the TPR B N010 may transmit DMRSs to the UE through a DMRS port A and a DMRS port B, respectively. In this case, the UE may receive one piece of DCI information for receiving one PDSCH demodulated on the basis of the DMRSs transmitted through the DMRS port A and the DMRS port B.

FIG. 15 illustrates an example N020 of non-coherent joint transmission (NC-JT) supporting non-coherent precoding between respective cells, TRPs, or/and beams for PDSCH transmission.

In the case of NC-JT, the PDSCH is transmitted to a UE N035 for each cell, TPR, or/and beam, and individual precoding may be applied to each PDSCH. Respective cells, TRPs, or/and beams may transmit different PDSCHs or different PDSCH layers to the UE, thereby improving throughput compared to single cell, TRP, or/and beam transmission. Further, respective cells, TRPs, or/and beams may repeatedly transmit the same PDSCH to the UE, thereby improving reliability compared to single cell, TRP, or/and beam transmission. For convenience of description, the cell, TRP, or/and beam are commonly called a TRP.

At this time, various wireless resource allocations such as the case N040 in which frequency and time resources used by a plurality of TRPs for PDSCH transmission are all the same, the case N045 in which frequency and time resources used by a plurality of TRPs do not overlap at all, and the case N050 in which some of the frequency and time resources used by a plurality of TRPs overlap each other may be considered.

In order to support NC-JT, DCI in various forms, structures, and relations may be considered to simultaneously allocate a plurality of PDSCHs to one UE.

Figure 16:
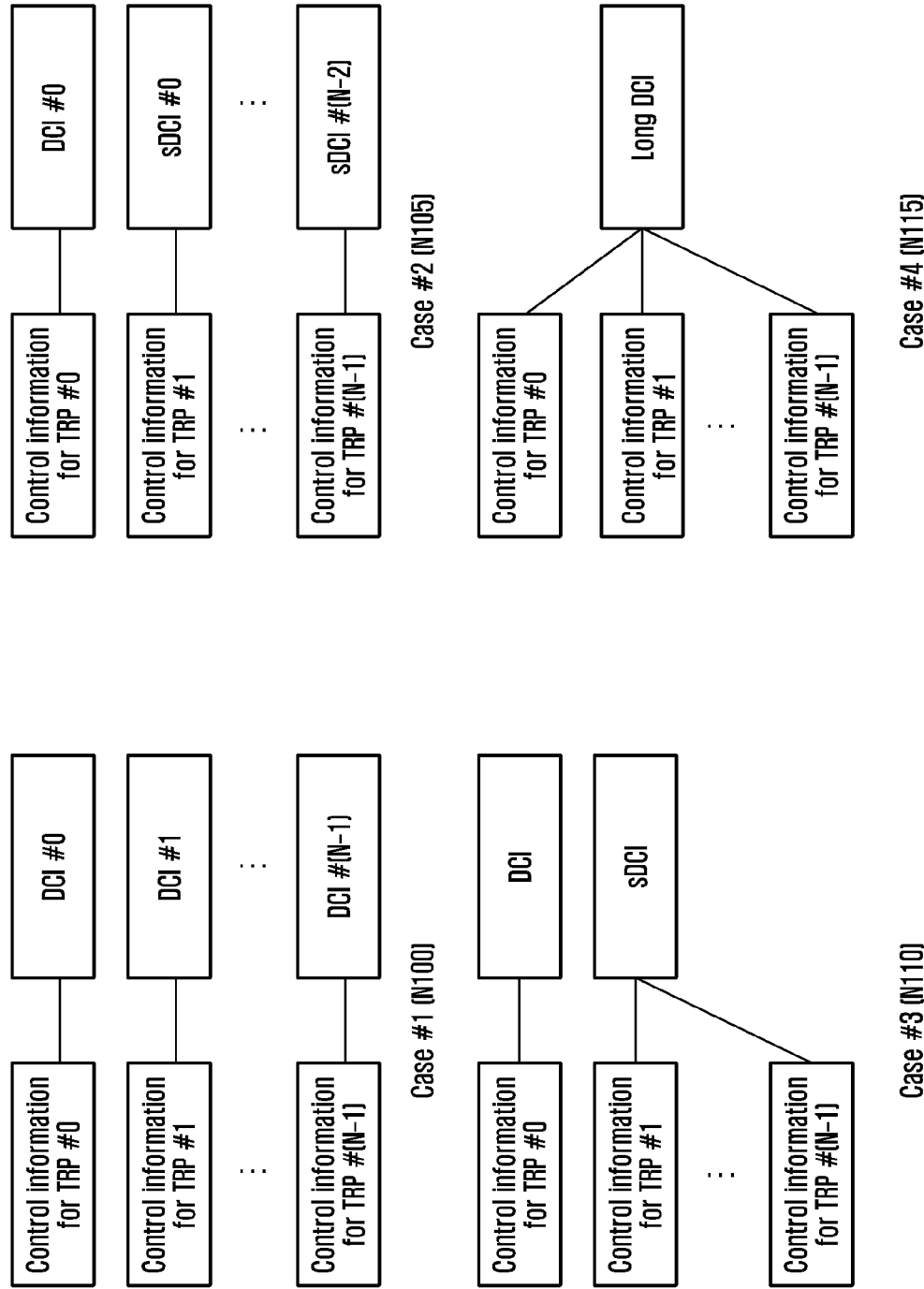
FIG. 16 illustrates an example for a configuration of downlink control information (DCI) for cooperative communication in a wireless communication system according to an embodiment of the disclosure.

FIG. 16 illustrates an example of a configuration of downlink control information (DCI) for NC-JT in which respective TRPs transmit different PDSCHs or different PDSCH layers to the UE in a wireless communication system according to an embodiment of the disclosure.

Referring to FIG. 16, case #1 N100 is an example in which control information for PDSCHs transmitted from (N−1) additional TRPs is transmitted independently from control information for a PDSCH transmitted by a serving TRP in a situation in which (N−1) different PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted from different TRPs (TRP #0 to TRP #(N−1)) through independent DCI (DCI #0 to DCI #(N−1)). Formats between the independent DCI may be the same as or different from each other, and payload between the DCI may also be the same as or different from each other. In case #1, a degree of freedom of PDSCH control or allocation can be completely guaranteed, but when respective pieces of DCI are transmitted by different TRPs, a difference between DCI coverages may be generated and reception performance may deteriorate.

Case #2 N105 is an example in which pieces of control information for PDSCHs of (N−1) additional TRPs are transmitted and each piece of the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for single PDSCH transmission.

For example, DCI #0 that is control information for a PDSCH transmitted from the serving TRP (TRP #0) may include all information elements of DCI format 1_0, DCI format 1_1, and DCI format 1_2, but shortened DCI (hereinafter, referred to as sDCI) (sDCI #0 to sDCI #(N−2)) that are control information for PDSCHs transmitted from the cooperative TRPs (TRP #1 to TRP #(N−1)) may include only some of the information elements of DCI format 1_0, DCI format 11, and DCI format 1_2. Accordingly, the sDCI for transmitting control information of PDSCHs transmitted from cooperative TPRs has smaller payload compared to the normal DCI (nDCI) for transmitting control information related to the PDSCH transmitted from the serving TRP, and thus can include reserved bits compared to the nDCI.

In case #2 N105, a degree of freedom of each PDSCH control or allocation may be limited according to content of information elements included in the sDCI, but reception capability of the sDCI is better than the nDCI, and thus a probability of the generation of difference between DCI coverages may become lower.

Case #3 N110 is an example in which one piece of control information for PDSCHs of (N−1) additional TRPs is transmitted and the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for single PDSCH transmission.

For example, in the case of DCI #0 that is control information for the PDSCH transmitted from the serving TRP (TRP #0), all information elements of DCI format 10, DCI format 1_1, and DCI format 1_2 may be included, and in the case of control information for PDSCHs transmitted from cooperative TRPs (TRP #1 to TRP #(N−1)), only some of the information elements of DCI format 10, DCI format 11, and DCI format 1_2 may be gathered in one "secondary" DCI (sDCI) and transmitted. For example, the sDCI may include at least one piece of HARQ-related information such as frequency domain resource assignment and time domain resource assignment of the cooperative TRPs and the MCS. In addition, information that is not included in the sDCI such as a BWP indicator and a carrier indicator may follow DCI (DCI #0, normal DCI, or nDCI) of the serving TRP.

In case #3 N110, a degree of freedom of PDSCH control or allocation may be limited according to content of the information elements included in the sDCI but reception performance of the sDCI can be controlled, and case #3

N110 may have smaller complexity of DCI blind decoding of the UE compared to case #1 N100 or case #2 N105.

Case #4 N115 is an example in which control information for PDSCHs transmitted from (N−1) additional TRPs is transmitted in DCI (long DCI) that is the same as that of control information for the PDSCH transmitted from the serving TRP in a situation in which different (N−1) PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted from different TRPs (TRP #0 to TRP #(N−1)) through single DCI. In case #4 1615, complexity of DCI blind decoding of the UE may not be increased, but a degree of freedom of PDSCH control or allocation may be low since the number of cooperative TRPs is limited according to long DCI payload restriction.

In the following description and embodiments, the sDCI may refer to various pieces of supplementary DCI such as shortened DCI, secondary DCI, or normal DCI (DCI formats 1_0 and 1_1) including PDSCH control information transmitted in the cooperative TRP, and unless a specific restriction is mentioned, the corresponding description may be similarly applied to the various pieces of supplementary DCI.

In the following description and embodiments, case #1 N100, case #2 N105, and case #3 N110 in which one or more pieces of DCI (or PDCCHs) are used to support NC-JT may be classified as multiple PDCCH-based NC-JT and case #4 N115 in which single DCI (or PDCCH) is used to support NC-JT may be classified as single PDCCH-based NC-JT. In multiple PDCCH-based PDSCH transmission, a CORESET for scheduling DCI of the serving TRP (TRP #0) is separated from CORESETs for scheduling DCI of cooperative TRPs (TRP #1 to TRP #(N−1)). A method of distinguishing the CORESETs may include a distinguishing method through a higher-layer indicator for each CORESET and a distinguishing method through a beam configuration for each CORESET. Further, in single PDCCH-based NC-JT, single DCI schedules a single PDSCH having a plurality of layers instead of scheduling a plurality of PDSCHs, and the plurality of layers may be transmitted from a plurality of TRPs. At this time, the correlation between the layer and the TRP transmitting the corresponding layer may be indicated through a TCI indication for the layer.

Meanwhile, in embodiments of the disclosure, the "cooperative TRP" may be replaced with various terms such as a "cooperative panel" or a "cooperative beam" when actually applied.

In embodiments of the disclosure, "the case in which NC-JT is applied" may be variously interpreted as "the case in which the UE simultaneously receives one or more PDSCHs in one BWP", "the case in which the UE simultaneously receives PDSCHs on the basis of two or more transmission configuration indicator (TCI) indications in one BWP", and "the case in which the PDSCHs received by the UE are associated with one or more DMRS port groups" according to circumstances, but is used by one expression for convenience of description.

In the disclosure, the wireless protocol structure for NC-JT may be variously used according to a TRP development scenario. For example, when there is no backhaul delay between cooperative TRPs or there is a small backhaul delay, a method (CA-like method) using a structure based on MAC layer multiplexing can be used similarly to reference numeral S10 of FIG. 14. On the other hand, when the backhaul delay between cooperative TRPs is too large to be ignored (for example, when a time of 2 ms or longer is needed to exchange information such as CSI, scheduling, and HARQ-ACK between cooperative TRPs), a method (DC-like method) of securing a characteristic robust to a delay can be used through an independent structure for each TRP from an RLC layer similarly to reference numeral S20 of FIG. 14.

The UE supporting C-JT/NC-JT may receive a C-JT/NC-JT-related parameter or a setting value from a higher-layer configuration and set an RRC parameter of the UE on the basis thereof. For the higher-layer configuration, the UE may use a UE capability parameter, for example, tci-StatePDSCH. The UE capability parameter, for example, tci-StatePDSCH may define TCI states for PDSCH transmission, the number of TCI states may be configured as 4, 8, 16, 32, 64, and 128 in FR1 and as 64 and 128 in FR2, and a maximum of 8 states which can be indicated by 3 bits of a TCI field of the DCI may be configured through a MAC CE message among the configured numbers. A maximum value 128 means a value indicated by maxNumberConfiguredTCIstatesPerCC within the parameter tci-StatePDSCH which is included in capability signaling of the UE. As described above, a series of configuration processes from the higher-layer configuration to the MAC CE configuration may be applied to a beamforming indication or a beamforming change command for at least one PDSCH in one TRP.

Hereinafter, for convenience of description, a cell, a TRP, a panel, a beam, or/and a transmission direction distinguished by an indicator such as a higher layer/L1 parameter of a TCI state and spatial relation information, a cell ID, a TRP ID, or a panel ID are commonly described as a transmission reception point (TRP). Accordingly, the TRP in the disclosure can be appropriately replaced with one of the above terms.

Referring to the PUSCH-related description, the current Rel-15/16 NR focuses on a single cell or/and a single TRP, or/and a single panel, or/and a single beam, or/and a single transmission direction for the PUSCH repetitive transmission. Specifically, in the case of PUSCH repetitive transmission, transmission to a single TRP is considered regardless of codebook-based or non-codebook-based transmission. For example, in codebook-based PUSCH transmission, a transmission beam of the UE may be determined by an SRI and a TRPMI transmitted from the BS, that is, a single TRP to the UE. Similarly, in non-codebook-based PUSCH transmission, an NZP CSI-RS which can be configured by the BS, that is, a single TRP may be configured in the UE and a transmission beam of the UE may be determined by an SRI transmitted from a single TRP. Accordingly, when a channel between the UE and a specific TRP has a deteriorating element having the temporal and spatial large correlation such as blockage, PUSCH repetitive transmission to a single TRP is highly likely to not satisfy the expected performance. Accordingly, in order to remove the deterioration, Rel-17 or release thereafter may support PUCCH repetitive transmission considering a plurality of TRPs. This may be a method of maximizing a diversity gain in consideration of channels between a plurality of TRPs having different spatial characteristics and the UE. In order to support the same, the UE should support a configuration for PUSCH repetitive transmission to multiple TRPs. For example, configuration and indication methods for a plurality of transmission beams and power control to be used for PUSCH repetitive transmission considering multiple TRPs are needed. Further, higher-layer signaling or dynamic indication for distinguishing between the repetitive transmission scheme considering a single TRP defined in Rel-15/16 and PUSCH repetitive transmission considering multiple TRPs to be newly defined in Rel-17 is needed. In addition, for an operation considering multiple TRPs, a method of determining the relation between an SRI indicated to the UE and an SRS resource indicated by the SRI is needed to transmit a PUSCH.

In the disclosure, it is possible to minimize uplink data loss and a transmission delay time during PUSCH repetitive transmission considering multiple TRPs by providing a method of processing the requirements. In various numbers of cases, the configuration and indication method of PUSCH repetitive transmission to multiple TRPs by the UE is described in detail in the following embodiments.

Hereinafter, embodiments of the disclosure are described in detail along with the accompanying drawings. The BS is the entity that allocates resources to the UE, and may be at least one of a gNode B, a gNB, an eNode B, a Node B, a base station (BS), a radio access unit, an eNB controller, and a node on a network. The UE may include a user equipment (UE), a mobile station (MS), a cellular phone, a smart phone, a computer, or a multimedia system capable of performing a communication function. Hereinafter, although embodiments of the disclosure are described with an example of the 5G system, the embodiments of the disclosure may be applied to other communication systems having a similar technical background or channel form. For example, mobile communication technologies developed after LTE or LTE-A mobile communication and 5G may be included therein. Accordingly, embodiments of the disclosure may be applied to other communication systems through some modifications without departing from the scope of the disclosure on the basis of a determination of those skilled in the art. The content in the disclosure can be applied to FDD and TDD systems.

In description of the disclosure, detailed description of a relevant function or configuration is omitted if it is determined that the detailed description makes the subject of the disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the following description of the disclosure, higher-layer signaling may be singling corresponding to at least one of or a combination of one or more of the following signaling.
  MIB (Master Information Block)
  SIB (System Information Block) or SIB X(X=1, 2, . . . )
  RRC (Radio Resource Control)
  MAC (Medium Access Control) CE (Control Element)
  L1 signaling may be signaling corresponding to at least one of or a combination of one or more of signaling methods using the following physical layer channels or signaling.
  PDCCH (Physical Downlink Control Channel)
  DCI (Downlink Control Information)
  UE-specific DCI
  Group common DCI
  Common DCI
  Scheduling DCI (for example, DCI used to schedule downlink or uplink data)
  Non-scheduling DCI (for example, DCI other than DCI used to schedule downlink or uplink data)
  PUCCH (Physical Uplink Control Channel)
  UCI (Uplink Control Information)

Hereinafter, determining priorities of A and B in the disclosure may be variously expressed as selecting one having a higher priority according to a predetermined priority rule and performing an operation corresponding thereto or omitting (or dropping) an operation for one having a lower priority.

In the disclosure, transmitting a physical channel such as a PDCCH, a PDSCH, a PUCCH, or a PUSCH may mean transmitting a signal (or data) through the corresponding physical channel. For example, in the disclosure, transmitting or receiving a PDCCH may mean transmitting or receiving a signal (for example, DCI) through the PDCCH. Alternatively, transmitting or receiving a PDSCH may mean transmitting or receiving a signal (for example, downlink data) through the PDSCH. Alternatively, transmitting or receiving a PUCCH may mean that transmitting or receiving a signal (for example, UCI) through the PUCCH. Alternatively, transmitting or receiving a PUSCH may mean that transmitting or receiving a signal (for example, uplink data) through the PUSCH.

Hereinafter, the disclosure describes the examples through a plurality of embodiments but the examples are not independent, and one or more embodiments can be simultaneously or complexly applied.

Embodiment 1: PUSCH Repetitive Transmission Method Considering Multiple TRPs

Embodiment 1 of the disclosure describes a method of configuring higher-layer signaling for PUSCH repetitive transmission considering multiple TRPs and indicating L1 signaling. PUSCH repetitive transmission considering multiple TRPs may operate through single or multiple DCI-based indication and is described in embodiments 1-1 and 1-2.

The UE may support one of the PUSCH repetitive transmission through an indication based on single or multiple DCI on the basis of the configuration of the BS or may support both the two methods and separately use the two methods through L1 signaling. The corresponding content is described in embodiment 1-3.

Embodiment 1-4 of the disclosure describes an SRS resource set configuration method for PUSCH repetitive transmission considering multiple TRPs based on single or multiple DCI. Embodiment 1-5 of the disclosure describes a method indicating an SRI according to an SRS resource set for PUSCH repetitive transmission considering multiple TRPs based on single or multiple DCI.

Embodiment 1-1: PUSCH Repetitive Transmission Method Considering Multiple TRPs Based on Single DCI As an embodiment of the disclosure, embodiment 1-1 describes a PUSCH repetitive transmission method considering multiple TRPs based on single DCI. The UE may report possibility of a PUSCH repetitive transmission method considering multiple TRPs based on single DCI through a UE capability report. The BS may configure which PUSCH repetitive transmission scheme is used through higher-layer signaling for the UE reporting the corresponding UE capability (for example, the UE capability supporting PUSCH repetitive transmission considering multiple TRPs based on single DCI). At this time, higher-layer signaling may select and configure one of the two types such as the PUSCH repetitive transmission type A or the PUSCH repetitive transmission type B.

In Rel-15/16, in the PUSCH repetitive transmission method considering a single TRP, all of the codebook or non-codebook-based transmission scheme are performed on the basis of single DCI. The UE may apply the same value to respective PUSCH repetitive transmissions by using the SRI or the TPMI indicated by one DCI in codebook-based PUSCH transmission. Further, the UE may apply the same value to respective PUSCH repetitive transmissions by using the SRI indicated by one DCI in non-codebook-based PUSCH transmission. For example, when codebook-based PUSCH transmission and the PUSCH repetitive transmission scheme A are configured through higher-layer signaling and a time resource allocation index having the number of PUSCH repetitive transmissions configured as 4, SRI index 0, and TPMI index 0 are indicated through DCI, the UE applies both of SRI index 0 and TPMI index 0 to each of four PUSCH repetitive transmissions. The SRI may be associated with a transmission beam and the TPMI may be associated with a transmission precoder. Unlike the PUSCH repetitive transmission method considering a single TRP, the PUSCH repetitive transmission method considering multiple TRPs should apply different transmission beams and transmission precoders to transmissions to respective TRPs. Accordingly, the UE may receive an indication of a plurality of SRIs or TPMIs through DCI and apply the same to respective PUSCH repetitive transmission to perform PUSCH repetitive transmission considering multiple TRPs.

When the PUSCH repetitive transmission method considering multiple TRPs based on single DCI is indicated to the UE, methods by which the PUSCH transmission method indicates a plurality of SRIs or TPMIs in the codebook or non-codebook case may be described below.

[Method 1] Single DCI Transmission Having a Plurality of SRI or TPMI Fields

In order to support the PUSCH repetitive transmission method considering multiple TRPs based on single DCI, the BS may transmit DCI having a plurality of SRI or TPMI fields to the UE. The corresponding DCI has a new format (for example, DCI format 03) or the existing format (for example, DCI format 0_1 or 0_2) or additional higher-layer signaling (for example, signaling for determining whether a plurality of SRI or TPMI fields can be supported) may be configured therein. For example, when codebook-based PUSCH transmission is configured through higher-layer signaling, the UE may perform PUSCH repetitive transmission considering multiple TRPs by receiving DCI of a new format (for example, DCI format 0_3) having two SRI fields and two TPMI fields. In another example, in the case of non-codebook-based PUSCH transmission, the UE may be configured to support a plurality of SRI fields through higher-layer signaling and may receive DCI of the existing format (for example, DCI format 0_1 or 0_2) having two SRI fields. When a plurality of SRS resources are indicated using a plurality of SRI fields, a transmission power control parameter of the SRS resources is configured for each SRS resource set, and thus respective SRS resources may exist within different SRS resource sets in order to configure different transmission power control parameters for respective TRPs. Accordingly, the number of SRS resource sets having usage which is higher-layer signaling configured as codebook or non-codebook may be two or more.

Figure 17:
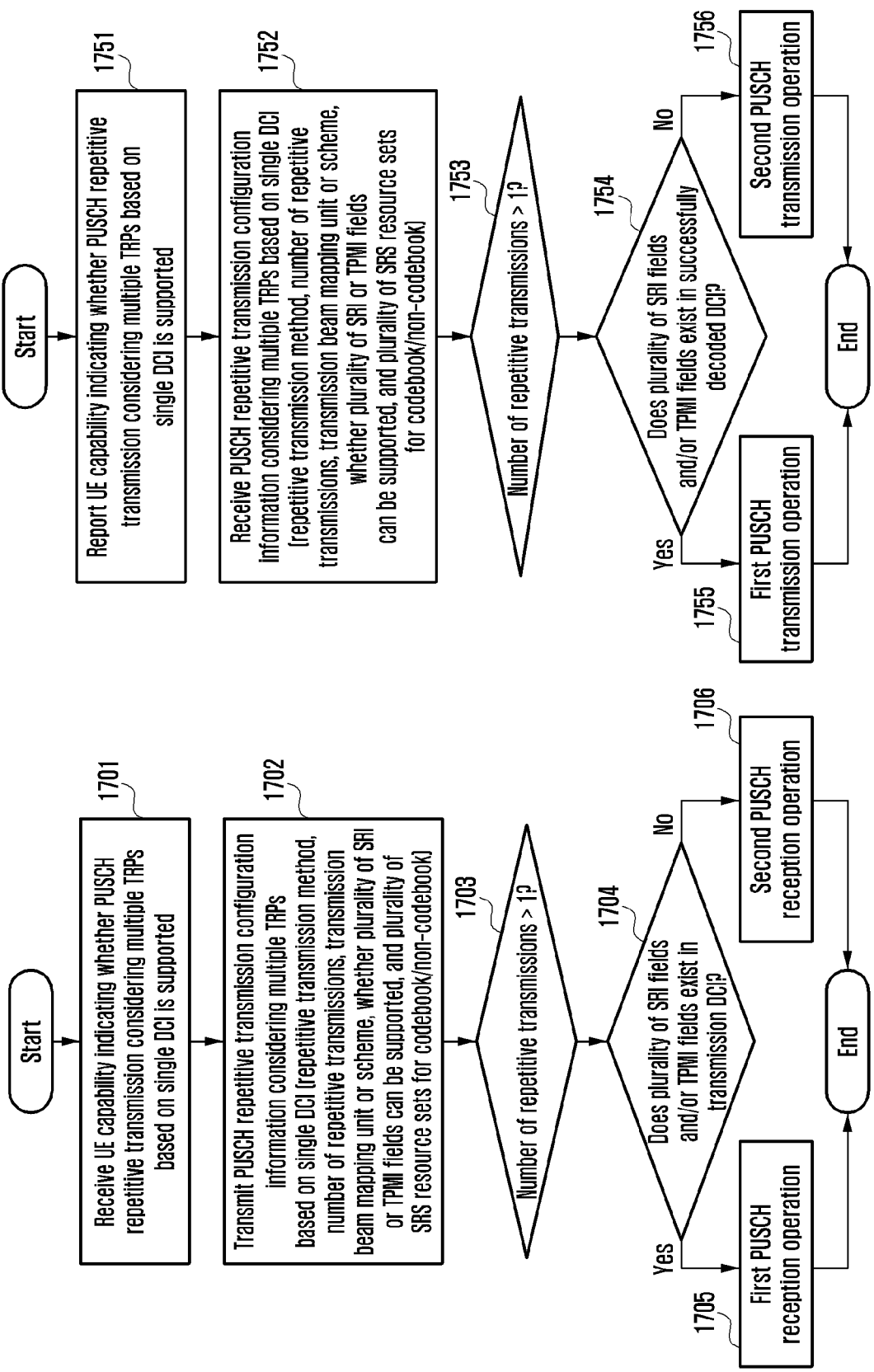
FIG. 17 illustrates an operation of the BS and the UE for PUSCH repetitive transmission considering multiple TRPs based on single DCI transmission having a plurality of SRI or TPMI fields according to an embodiment of the disclosure.

FIG. 17 illustrates an operation of the BS and the UE for PUSCH repetitive transmission considering multiple TRPs based on single DCI transmission having a plurality of SRI or TPMI fields according to an embodiment of the disclosure.

Referring to FIG. 17, the UE transmits a UE capability report indicating whether PUSCH repetitive transmission considering multiple TRPs based on single DCI is supported in operation 1751, and the BS receiving the corresponding UE capability report in operation 1701 transmits a PUSCH repetitive transmission configuration considering multiple TRPs based on single DCI to the UE in operation 1702. At this time, as transmitted configuration information, a repetitive transmission method, the number of repetitive transmissions, a transmission beam mapping unit or scheme, whether a plurality of SRI or TPMI fields can be supported, a plurality of SRS resource sets for codebook or non-codebook, and the like may be included. When the number of repetitive transmissions is two or more, the UE receiving the corresponding configuration information in operation 1752 performs a first PUSCH transmission operation in operation 1755 if the transmission is codebook-based PUSCH transmission and a plurality of SRI fields and TPMI fields exist in the successfully received DCI or if the transmission is non-codebook-based PUSCH transmission and a plurality of SRI fields exist in the successfully received DCI in operation 1754, and, otherwise, performs a second PUSCH transmission operation in operation 1756. The first PUSCH transmission operation is an operation of repeatedly transmitting a PUSCH through a plurality of SRI and TPMI fields in the case of codebook-based PUSCH transmission and through a plurality of SRI fields in the case of non-codebook-based PUSCH transmission, and the PUSCH is repeatedly transmitted through the application of a plurality of transmission beams and/or a plurality of transmission precoders. The second PUSCH transmission operation is an operation of repeatedly transmitting a PUSCH through a single SRI and TPMI field in the case of codebook-based PUSCH transmission and through a single SRI field in the case of non-codebook-based PUSCH transmission, and the PUSCH is repeatedly transmitted through the application of one transmission beam and/or one transmission precoder.

[Method 2] DCI Transmission to which Improved SRI and TPMI Fields are Applied

In order to support the PUSCH repetitive transmission method considering multiple TRPs based on single DCI, the UE may receive a MAC-CE for supporting improved SRI or TPMI fields from the BS. The corresponding MAC-CE may contain information indicating a change in interpretation of the codepoint in the DCI field in order to indicate a plurality of transmission beams for a specific codepoint in the SRI field within DCI or indicate a plurality of transmission precoders for a specific codepoint in the TPMI field. A method of indicating a plurality of transmission beams may consider two matters below.

- A MAC-CE activated to allow the specific codepoint in the SRI field to indicate one SRS resource connected to (or associated with) a plurality of pieces of SRS spatial relation info is received.
- A MAC-CE activated to allow the specific codepoint in the SRI field to indicate a plurality of SRS resources connected to (or associated with) one piece of SRS spatial relation info is received.

When a plurality of SRS resources are indicated using the improved SRI field, a transmission power control parameter of the SRS resource is designed for each SRS resource set, and thus respective SRS resources may exist within different SRS resource sets in order to control different transmission power control parameters for respective TRPs. Accordingly, the number of SRS resource sets having usage which is higher-layer signaling configured as codebook or non-codebook may be two or more.

Figure 18:
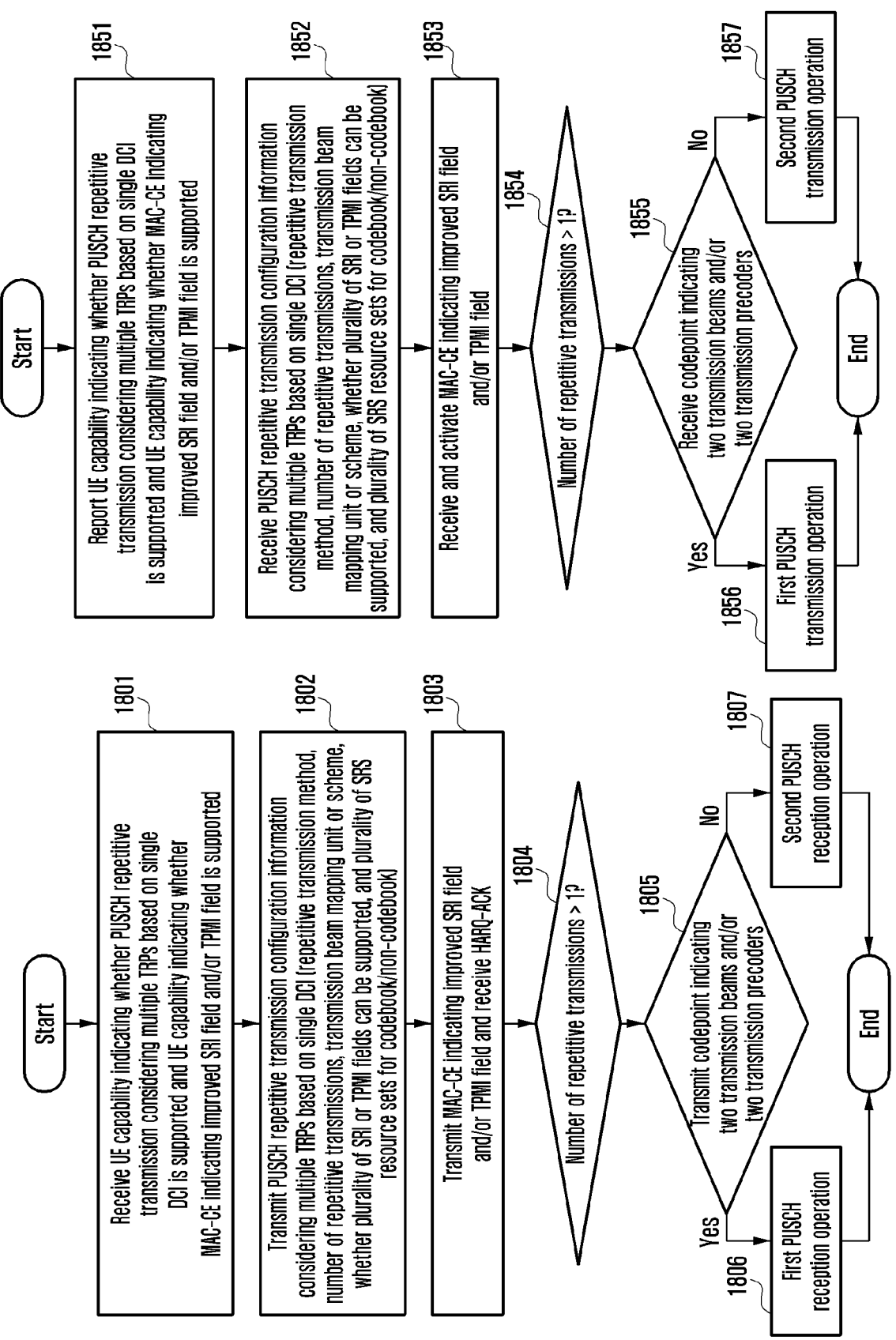
FIG. 18 illustrates an operation of the BS and the UE for PUSCH repetitive transmission considering multiple TRPs based on single DCI transmission using improved SRI and TPMI fields according to an embodiment of the disclosure.

FIG. 18 illustrates an operation of the BS and the UE for PUSCH repetitive transmission considering multiple TRPs based on single DCI transmission using improved SRI and TPMI fields according to an embodiment of the disclosure.

Referring to FIG. 18, the UE transmits a UE capability report indicating whether PUSCH repetitive transmission considering multiple TRPs based on single DCI can be supported and a UE capability report indicating whether an MAC-CE for indicating an improved SIR field or TPMI field can be activated in operation 1851, and the BS receiving the corresponding UE capability report in operation 1801 transmits a PUSCH repetitive transmission configuration considering multiple TRPs based on single DCI to the UE in operation 1802. At this time, as transmitted configuration information, a repetitive transmission method, the number of repetitive transmissions, a transmission beam mapping unit or scheme, a plurality of SRS resource sets for codebook or non-codebook, and the like may be included. The UE receiving the corresponding configuration in operation 1852 receives an MAC-CE activating the indication of the improved SRI field or the improved TPMI field in operation 1853, and transmits HARQ-ACK to the BS after 3 ms from the reception in operation 1803. When the number of repetitive transmissions is two or more in operation 1854, the UE performs a first PUSCH transmission operation in operation 1856 if the transmission is codebook-based PUSCH transmission and the improved SIR field and TPMI field exist in the successfully received DCI or if the transmission is non-codebook-based PUSCH transmission and the improved SRI field exists in the successfully received DCI in operation 1855, and, otherwise, performs a second PUSCH transmission operation in operation 1857. The first PUSCH transmission operation is an operation of repeatedly transmitting a PUSCH through a codepoint of the SRI and TPMI fields indicating a plurality of SRIs and TPMIs in the case of codebook-based PUSCH transmission and through a codepoint of the SRI field indicating a plurality of SRIs in the case of non-codebook-based PUSCH transmission, and the PUSCH is repeatedly transmitted through the application of a plurality of transmission beams and/or a plurality of transmission precoders. The second PUSCH transmission operation is an operation of receiving DCI meaning an indication of a single SRI and a single TPMI through all codepoints of the SRI field and the TPMI field and repeatedly transmitting a PUSCH, and a PUSCH is repeatedly transmitted through the application of one transmission beam and/or one transmission precoder.

Embodiment 1-2: PUSCH Repetitive Transmission Method Considering Multiple TRPs Based on Multiple DCI As an embodiment of the disclosure, embodiment 1-2 describes a PUSCH repetitive transmission method considering multiple TRPs based on multiple DCI. As described above, since the PUSCH repetitive transmission methods in Rel-15/16 all are methods considering single TRP, the same value could be used for transmission beam, transmission precoder, resource allocation, and power control parameters. However, in PUSCH repetitive transmission considering multiple TRPs, it may be required to configure higher-layer signaling for respective PUSCH repetitive transmissions to multiple TRPs or apply different parameters to TRPs for PUSCH transmission-related parameters indicated by DCI. For example, when multiple TRPs exist in different direction from the UE, transmission beams or transmission precoders may be different, and accordingly it is needed to separately configure or indicate the transmission beams or the transmission precoders for respective TRPs. In another example, when multiple TRPs exist at different distances from the UE, an independent power control method between the multiple TRPs and the UE may be needed and accordingly different time/frequency resource allocations may be performed. For example, for a TRP existing at a relatively long distance compared to a specific TRP, the relatively smaller number of RBs and larger number of symbols may be allocated to increase power per RE. Accordingly, when different pieces of information are transmitted to the UE through single DCI, the length of bits of the corresponding DCI may become very large, and thus it may be more efficient to indicate PUSCH repetitive transmission to the UE through a plurality of DCI.

The UE may report possibility of a PUSCH repetitive transmission method considering multiple TRPs based on multiple DCI through a UE capability report. The BS may inform the UE reporting the corresponding UE capability (for example, the UE capability supporting PUSCH repetitive transmission considering multiple TRPs based on multiple DCI) of the performance of PUSCH repetitive transmission considering multiple TRPs through multiple DCI by using a configuration through higher-layer signaling, an indication through L1 signaling, or a configuration and an indication through a combination of higher-layer signaling and L1 signaling. The BS may use a method of configuring or indicating PUSCH repetitive transmission considering multiple TRPs based on multiple DCI as described below.

In PUSCH repetitive transmission considering multiple TRPs based on multiple DCI, the UE may expect different pieces of time/frequency resource allocation information indicated by respective DCI in consideration of TRPs at different distances from the UE. The UE may report whether different time/frequency resources can be allocated to the UE through the BS capability. The BS may configure whether different time/frequency resources can be allocated to the UE through higher-layer signaling, and the UE receiving the corresponding configuration may expect different pieces of time/frequency resource allocation information indicated by respective DCI. At this time, the UE may receive a configuration or an indication of PUSCH repetitive transmission considering multiple TRPs based on multiple DCI from the BS in consideration of a higher-layer signaling configuration and a condition between a plurality of DCI fields.

The BS may configure CORESETPoolIndex which is higher-layer signaling in the UE for each CORESET, and the UE may know, when receiving any CORESET, a TRP from which the corresponding CORESET is transmitted. For example, when CORESETPoolIndex is configured as 0 in CORESET #1 and CORESETPoolIndex is configured as 1 in CORESET #2, the UE may know that CORESET #1 is transmitted from TRP #0 and CORESET #2 is transmitted from TRP #1. Further, an indication of the repetitive PUSCH by DCI transmitted within each CORESET having CORESETPoolIndex configured as 0 and 1 may be an implicit indication by a condition between specific fields within a plurality of transmitted DCI. For example, when HARQ process number field values within a plurality of DCI which the BS transmits to the UE are the same and NDI field values are the same, the UE may implicitly consider that the plurality of corresponding DCI schedule repetitive PUSCHs in consideration of multiple TRPs. Meanwhile, when HARQ process number field values are the same and NDI field values are the same, reception of a plurality of DCI may be limited. For example, a maximum interval between the plurality of DCI receptions may be defined within the number of one or more specific slots or the number of one or more specific symbols. At this time, the UE may perform PUSCH transmission on the basis of a minimum transport block size calculated (or identified) on the basis of time/frequency resource allocation information differently indicated by a plurality of DCI.

Embodiment 1-3: Configured Grant PUSCH Repetitive Transmission Method Considering Multiple TRPs Embodiment 1-3 describes a configured grant PUSCH repetitive transmission method considering multiple TRPs as an embodiment of the disclosure. The UE may report whether to transmit a configured grant PUSCH repetitive transmission considering multiple TPRs to the BS through the UE capability. The BS may configure or indicate the configured grant PUSCH repetitive transmission considering multiple TRPs through higher-layer signaling, L1 signaling, or a combination of higher-layer signaling or L1 signaling by using various methods below.

[Method 1] Activation of a Single DCI-Based Configured Grant Configuration

Method 1 is a method of indicating a plurality of SRIs or TPMIs to the UE on the basis of the single DCI and activating a single configured grant configuration in addition to the corresponding indication. The method indicating the plurality of SRIs or TPMIs through the single DCI may follow the method in Embodiment 1-1 and, when only one configured grant exists in the UE, all bits in the HARQ process number field and the redundancy version field within the corresponding DCI may be indicated as 0. When a plurality of configured grant configurations exist in the UE and one thereof is activated by the corresponding DCI, the HARQ process number field within the corresponding DCI may indicate an index of the configured grant configuration and all bits in the redundancy version field may be indicated as 0.

[Method 2] Activation of a Single Configuration Grant Configuration Based on Multiple DCI Method 2 is a method of indicating SRIs or TPMIs to the UE through respective DCI on the basis of multiple DCI and activating a single configured grant configuration in addition to the corresponding indication. The method indicating the respective SRIs or TPMIs through multiple DCI may follow the method in embodiment 1-2 and, when only one configured grant configuration exists in the UE, all bits in all of the HARQ process number fields and the redundancy version fields within the multiple DCI may be indicated as 0. When a plurality of configured grant configurations exist in the UE and one thereof is activated by the multiple DCI, all of the HARQ process number fields within the corresponding multiple DCI may indicate an index of the same configured grant configuration and all bits in all of the redundancy version fields within the corresponding multiple DCI may be indicated as 0. There may be a characteristic that the NDI field also has the same value as well as the HARQ process number field according to the DCI field condition in the PUSCH repetitive transmission based on multiple DCI. The UE may map transmission beams and transmission precoders to respective activated configured grant PUSCH repetitive transmissions according to the following transmission beam mapping method by using a plurality of SRIs or TPMIs indicated by multiple DCI. For example, when transmission beam and transmission precoder-related information indicated by the first received DCI are SRI #1 and TPMI #1, transmission beam and transmission precoder-related information indicated by the second received DCI are SRI #2 and TPMI #2, and the transmission beam mapping method configured through higher-layer signaling is cyclical, the UE may perform the PUSCH transmission by applying SRI #1 and TPMI #1 to odd-numbered transmissions (1, 3, 5, . . . ) of the activated configured grant PUSCH repetitive transmissions and applying SRI #2 and TPMI #2 to even-numbered transmissions (2, 4, 6, . . . ) of the repetitive transmissions.

[Method 3] Activation of Multiple Configuration Grant Configurations Based on Multiple DCI Method 3 is a method of indicating SRIs or TPMIs to the UE through respective DCI on the basis of multiple DCI and activating multiple configured grant configurations in addition to the corresponding indication. The method indicating the SRIs or the TPMIs through the respective DCI on the basis of the multiple DCI may follow the method in Embodiment 1-2, and the existence of a plurality of configured grant configurations and indexes of the configured grant configurations may be indicated through HARQ process number fields within the DCI. Further, all bits in all of the redundancy version fields within the corresponding multiple DCI may be indicated as 0. There may be a characteristic that the NDI field also has the same value as well as the HARQ process number field according to the DCI field condition in the PUSCH repetitive transmission based on multiple DCI. The UE may receive MAC-CE signaling indicating (instructing) the connection between a plurality of configured grant configurations activated by multiple DCI. After 3 ms from HARQ-ACK transmission for MAC-CE signaling, the UE may receive multiple DCI from the BS and, when the configured grant configuration index indicated by each DCI matches configured grant configuration indexes indicated (instructed) to be connected through MAC-CE signaling, the UE may perform PUSCH repetitive transmission considering multiple TRPs on the basis of the corresponding indicated configured grant configurations. At this time, the plurality of connected configured grant configurations may share the same value for some configurations. For example, repK which is higher-layer signaling meaning the number of repetitive transmissions, repK-RV which is higher-layer signaling meaning the order of redundancy versions in repetitive transmissions, and periodicity which is higher-layer signaling meaning the period of repetitive transmission may be configured to the same value within the connected configured grant configurations.

Embodiment 1-4: SRS Resource Set Configuration Method for PUSCH Repetitive Transmission Considering Multiple TRPs As an embodiment of the disclosure, embodiment 1-4 describes an SRS resource set configuration method for PUSCH repetitive transmission considering multiple TRPs. SRS power control parameters (for example, alpha, p0, pathlossReferenceRS, srs-PowerControlAjdustmentStates, and the like which can be configured through higher-layer signaling) may vary depending on each SRS resource set, and thus the number of SRS resource sets may be increased to two or more for different SRS power controls for respective TRPs in PUSCH repetitive transmission considering multiple TRPs and different SRS resource sets may be used to support different TRPs. The SRS resource set configuration method considered in the present embodiment may be applied to embodiments 1-1 to 1-3.

In PUSCH repetitive transmission considering multiple TRPs based on single DCI, a plurality of SRIs indicated by single DCI may be selected from SRS resources existing within different SRS resource sets. For example, when two SRIs are indicated by single DCI, a first SRI may be selected from SRS resource set #1 and a second SRI may be selected from SRS resource set #2.

In PUSCH repetitive transmission considering multiple TRPs based on multiple DCI, each SRI indicated by two DCI may be selected from SRS resources existing different SRS resource sets, and each SRS resource set may be explicitly or implicitly connected (may correspond to) to higher-layer signaling meaning each TRP (for example, CORESETPoolIndex). In the explicit connection method, a value of CORESETPoolIndex may be configured within a configuration of the SRS resource set configured through the higher layer and a semi-static connection state between the CORESET and the SRS resource set may be notified to the UE therethrough. In another example, in a more dynamic explicit connection method, a MAC-CE for activating the connection between a specific CORESET (including all of the cases in which the value of CORESETPoolIndex is configured as 0 or 1 or nothing is configured) and the SRS resource set may be used. It may be considered that the connection between the corresponding CORESET and the SRS resource set is activated after 3 ms from transmission of HARQ-ACK after reception of the MAC-CE for activating the connection between the specific CORESET (including all of the cases in which the value of CORESETPoolIndex is configured as 0 or 1 or nothing is configured) and the SRS resource set. In an implicit method, an implicit connection state is assumed using a specific reference between CORESETPoolIndex and an index of the SRS resource set. For example, when it is assumed that the UE receives a configuration of two SRS resource sets #0 and #1, the UE may assume that CORESETs in which no CORESETPoolIndex is configured or having CORESETPoolIndex configured as 0 are connected to SRS resource set #0 and CORESETs having CORESETPoolIndex configured as 1 are connected to SRS resource set #1.

For the methods based on single or multiple DCI, the UE explicitly or implicitly receiving a configuration or an indication of the connection between different SRS resource sets and respective TRPs may expect that an srs-PowerControlAdjustmentStates value configured through higher-layer signaling within each SRS resource set is configured as sameAsFci2 and may not expect a configuration as separateClosedLoop. Further, the UE may expect that usage configured through higher-layer signaling within each SRS resource set is equally configured as codebook or noncodebook.

Embodiment 2: Method of Determining Relation Between SRI and SRS Resource According to SRS Resource Set Configuration Method for PUSCH Repetitive Transmission Considering Multiple TRPs Based on Single or Multiple DCI As an embodiment of the disclosure, embodiment 2 describes a method of determining the relation between an SRI and an SRS resource set according to an SRS resource set configuration method for PUSCH repetitive transmission considering multiple TRPs based on single or multiple DCI.

In NR Release 15/16, when a codebook or noncodebook-based PUSCH is transmitted, an SRI received in slot n is associated with the latest transmission of SRS resource(s) indicated by the SRI in SRS transmission before a PDCCH including the corresponding SRI is received. At this time, the SRS resource may be an SRS resource for codebook or noncodebook existing in the SRS resource set. Meanwhile, only one SRS resource set for codebook or noncodebook was conventionally configured, and one SRI may be indicated by DCI.

Meanwhile, in PUSCH repetitive transmission considering multiple TRPs, the number of SRS resource sets increases to be two or more as described in embodiment 1-4, and respective SRS resource sets may be used to support different TRPs. Alternatively, when PUSCH repetitive transmission considering multiple TRPs is supported by one SRS resource set, the number of pieces of spatialRelationInfo within the SRS resources included in the SRS resource set may be one or more. As described above, for PUSCH repetitive transmission considering multiple TRPs, various SRS resource set configuration methods may be considered. Accordingly, the BS may indicate two SIR and two TPMIs to the UE for PUSCH transmission for each TRP. At this time, since there are two indicated SRIs and each SRI is a value selected to support each TRP, it is required to clearly determine the relation between each SRI and an SRS resource in a time domain. Accordingly, in embodiments 2-1, 2-2, and 2-3 below, a method of determining the relation between the SRI and the SRS resource according to the SRS resource set configuration method for PUSCH repetitive transmission considering multiple TRPs is described. Further, embodiment 2-4 describes a method of determining the relation between the SRI and the SRS resource in configured grant-based PUSCH repetitive transmission considering multiple TRPs.

Embodiment 2-1: Method of Determining Relation Between SRI and SRS Resource when Two SRS Resource Sets are Supported for PUSCH Repetitive Transmission Considering Multiple TRPs As an embodiment of the disclosure, embodiment 2-1 describes a method of determining the relation between the SRI and the SRS resource when two SRS resource sets are supported for PUSCH repetitive transmission considering multiple TRPs.

As described in embodiment 1-4, the number of SRS resource sets may increase to be two or more for PUSCH repetitive transmission considering multiple TRPs. When the number of SRS resource sets for codebook or noncodebook is configured as two in consideration of multiple TRPs, respective SRIs may be selected from SRS resources existing within different SRS resource sets. For example, a first SRI (SRI 1) is selected from an SRS resource existing within SRS resource set #1, and a second SRI (SRI 2) is selected form an SRS resource existing within SRS resource set #2. At this time, among SRS transmission for SRS resource set #1 before reception of the PDCCH including the first SRI, the first SRI is associated with the latest transmission of SRS resource(s) indicated by the corresponding SRI. Similarly, among SRS transmission for SRS resource set #2 before reception of the PDCCH including the second SRI, the second SRI is associated with the latest transmission of SRS resource(s) indicated by the corresponding SRI. That is, the UE may understand that the first SRI indicates the SRS resource corresponding to the SRI within most recently transmitted SRS resource set #1 among SRSs transmitted before reception of the PDCCH including the corresponding SRI. Further, the UE may understand that the second SRI indicates the SRS resource corresponding to the SRI within most recently transmitted SRS resource set #2 among SRSs transmitted before reception of the PDCCH including the corresponding SRI. Meanwhile, the first SRI and the second SRI may be indicated by a plurality of SRI fields within the same DCI on the basis of single DCI or indicated by respective DCI on the basis of multiple DCI. Meanwhile, in the first SRI and the second SRI, the terms "first" and "second" are used to distinguish between different SRIs, and may or may not mean the specific sequence according to an embodiment. Further, the first SRI of the embodiment may be referred to as SRI 1 and the second SRI may be referred to as SRI 2, or may be referred to as the term having the same or similar meaning.

Figure 19:
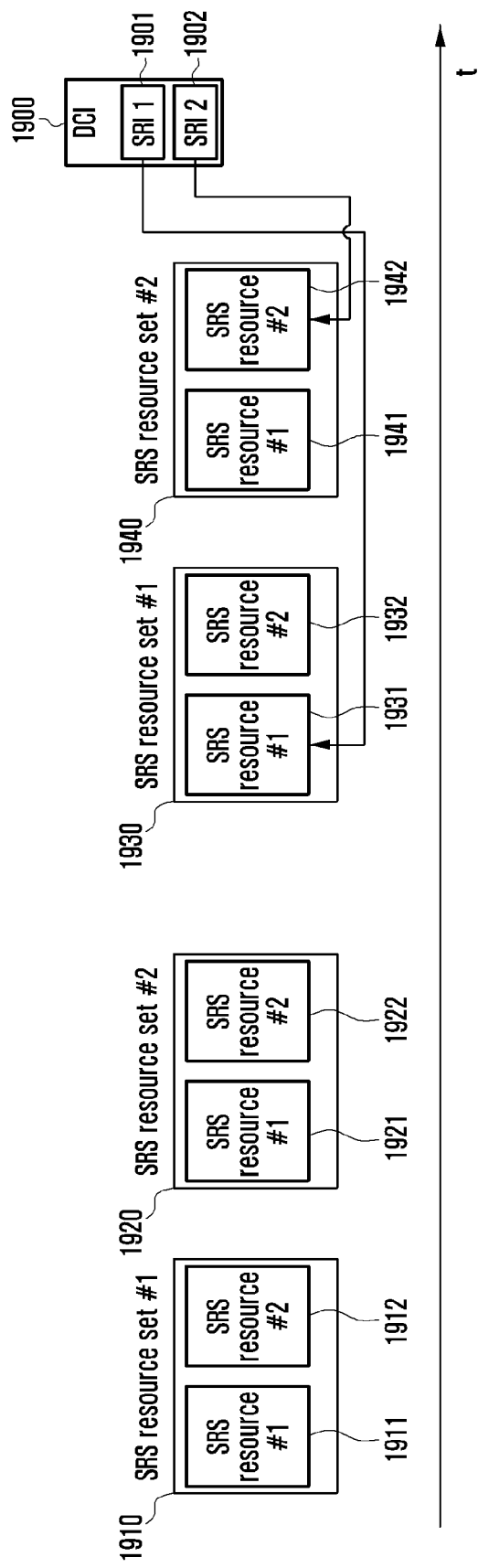
FIG. 19 illustrates a method of determining the relation between an SRI and an SRS resource for PUSCH repetitive transmission based on multiple TRPs using two SRS resource sets according to an embodiment of the disclosure.

FIG. 19 illustrates a method of determining the relation between an SRI and an SRS resource for PUSCH repetitive transmission based on multiple TRPs using two SRS resource sets.

Referring to FIG. 19, the UE may receive DCI 1900 for scheduling a PUSCH from the BS. At this time, the DCI may indicate two SRIs 1901 and 1902. FIG. 19 illustrates a PUSCH repetitive transmission method considering multiple TRPs based on single DCI. However, like in the method based on multiple DCI, SRI #1 1901 and SRI #2 1902 may be indicated through different DCI. When SRI #1 1901 is a value indicating SRS resource #1, SRI #1 1901 may be selected by the BS from among SRS resources of SRS resource set #1. The UE may understand that SRS resource #1 1931 corresponding SRI #1 1901 is indicated among SRS resources 1931 and 1932 of SRS resource set #1 1930 which the UE most recently transmitted before receiving the DCI 1900 including SRI #1 1901. When SRI #2 1902 is a value indicating SRS resource #2, SRI #2 1902 may be selected by the BS from among SRS resources of SRS resource set #2. The UE may understand that SRS resource #2 1942 corresponding SRI #2 1902 is indicated among SRS resources 1941 and 1942 of SRS resource set #1 1940 which the UE most recently transmitted before receiving the DCI 1900 including SRI #2 1902. Meanwhile, FIG. 19 illustrates the operation based on single DCI, but DCI including respective SRIs may be distinguished even when the operation based on multiple DCI is performed and thus the embodiment may be applied.

Embodiment 2-2: Method of Determining Relation Between SRI and SRS Resource in PUSCH Repetitive Transmission Considering Multiple TRPs Through One SRS Resource Set Including SRS Resources Configured as One Piece of Spatial Relation Info As an embodiment of the disclosure, embodiment 2-2 describes a method of determining the relation between the SRI and the SRS resource in PUSCH repetitive transmission considering multiple TRPs through one SRS resource set including SRS resources configured as one piece of spatial relation info.

In addition to the method of supporting respective TRPs through two SRS resource sets described in embodiment 1-4, PUSCH repetitive transmission considering multiple TRPs through one SRS resource set may be supported. At this time, a method of configuring an SRS power control parameter for supporting two TRPs in one SRS resource set may be considered. One piece of spatial relation info may be configured in SRS resource included in one SRS resource set. In this case, among all SRS resources within the SRS resource set, for example, some SRS resources may configure spatial relation info indicating an uplink beam for TRP 1, and the remaining SRS resources may indicate an uplink beam for TRP 2. More specifically, for example, the SRS resource set may include four SRS resources, SRS resources #1 and #2 may be configured as spatial relation info for TRP 1, and SRS resources #3 and #4 may be configured as spatial relation info for TRP 2. When the BS receives the corresponding SRS resource and selects the SRI for each TRP, TRP 1 may perform selection through SRS resources #1 and #2 according to the example and TRP 2 may perform selection through SRS resources #3 and #4 according to the example. Alternatively, TRP 1 and TRP 2 may select SRIs from among all of SRS resources #1, #2, #3, and #4. In the above case, the BS and the UE may predefine the method of determining the relation between each SRI and the SRS resource in the same way as the method of determining the relation between the SRI and the SRS resource of NR Release 15/16, and may determine associated SRS resources for two SRIs therethrough. Among SRS transmission for the SRS resource set before reception of the PDCCH including the first SRI (SRI1), the first SRI is associated with the latest transmission of SRS resource(s) indicated by the corresponding SRI. Similarly, among SRS transmission for the SRS resource set before reception of the PDCCH including the second SRI (SRI2), the second SRI 2002 is associated with the latest transmission of SRS resource(s) indicated by the corresponding SRI 2002. That is, the UE may understand that the first or second SRI indicates the SRS resources corresponding to the SRIs within most recently transmitted SRS resource set among SRSs transmitted before reception of the PDCCH including the corresponding SRIs. Meanwhile, the first SRI and the second SRI may be indicated by a plurality of SRI fields within the same DCI on the basis of single DCI or indicated by respective DCI on the basis of multiple DCI.

Figure 20:
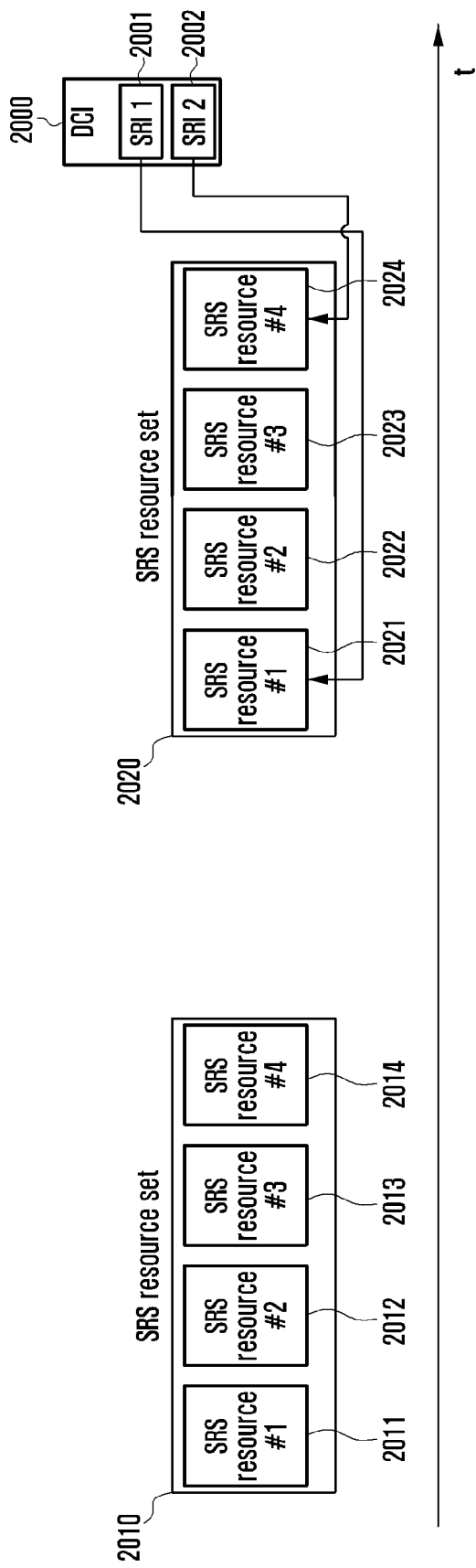
FIG. 20 illustrates a method of determining the relation between an SRI and an SRS resource for PUSCH repetitive transmission based on multiple TRPs using one SRS resource set including SRS resources configured as one piece of spatial relation info according to an embodiment of the disclosure.

FIG. 20 illustrates a method of determining the relation between the SRI and the SRS resource for PUSCH repetitive transmission based on multiple TRPs using one SRS resource set including SRS resources configured as one spatial relation info.

Referring to FIG. 20, the UE may receive DCI 2000 for scheduling a PUSCH from the BS. At this time, the DCI may indicate two SRIs 2001 and 2002. FIG. 20 illustrates a PUSCH repetitive transmission method considering multiple TRPs based on single DCI. However, like in the method based on multiple DCI, SRI #1 2001 and SRI #2 2002 may be indicated through different DCI. When SRI #1 2001 is a value indicating SRS resource #1, SRI #1 2001 may be selected by the BS from among SRS resources of SRS resource set. The UE may understand that SRS resource #1 2021 corresponding SRI #1 2001 is indicated among SRS resources 2021, 2022, 2023, and 2024 of the SRS resource set 2020 which the UE most recently transmitted before receiving the DCI 2000 including SRI #1 2001. When SRI #2 2002 is a value indicating SRS resource #4, SRI #2 2002 may be selected by the BS from among SRS resources of the SRS resource set. That is, the UE may understand that SRS resource #4 2024 corresponding SRI #2 2002 is indicated among SRS resources 2021, 2022, 2023, and 2024 of the SRS resource set 2020 which the UE most recently transmitted before receiving the DCI 2000 including SRI #2 2002. Meanwhile, FIG. 20 illustrates the operation based on single DCI, but the DCI including respective SRI is distinguished even when the operation based on multiple DCI is performed, and thus the embodiment can be applied.

Embodiment 2-3: Method of Determining Relation Between SRI and SRS Resource in PUSCH Repetitive Transmission Considering Multiple TRPs Through One SRS Resource Set Including SRS Resources Configured as Two Pieces of Spatial Relation Info As an embodiment of the disclosure, embodiment 2-3 descries a method of determining the relation between the SRI and the SRS resource in PUSCH repetitive transmission considering multiple TRPs through one SRS resource set including SRS resources configured as two pieces of spatial relation info.

Unlike embodiment 2-2, embodiment 2-3 relates to the case in which SRS resources within one SRS resource set are configured as two pieces of spatial relation info. Among two pieces of spatial relation info configured in the SRS resources, the first spatial relation info indicates a beam for TRP 1 and the second spatial relation info indicates a beam for TRP 2. When the BS receives the corresponding SRS resource and selects the SRI for each TRP, the first SRI (SRI 1) for TRP 1 may be selected from among SRS resources transmitted as the first spatial relation info, and the second SRI (SRI 2) for TRP 2 may be selected from among SRS resources transmitted as the second spatial relation info. At this time, in SRS transmission for the first spatial relation info before reception of the PDCCH including the first SRI, the first SRI is associated with the latest transmission of SRS resource(s) transmitted as the first spatial relation info and indicated by the corresponding SRI. Similarly, in SRS transmission for the second spatial relation info before reception of the PDCCH including the second SRI, the second SRI is associated with the latest transmission of SRS resource(s) transmitted as the second spatial relation info and indicated by the corresponding SRI. That is, the UE may understand that the most recently transmitted SRS resource corresponding to the SRI is indicated among SRSs transmitted as the first spatial relation info before receiving the PDCCH including the first SRI. The UE may understand that the most recently transmitted SRS resource corresponding to the SRI is indicated among SRSs transmitted as the second spatial relation info before receiving the PDCCH including the second SRI. Meanwhile, the first SRI and the second SRI may be indicated by a plurality of SRI fields within the same DCI on the basis of single DCI or indicated by respective DCI on the basis of multiple DCI.

Figure 21:
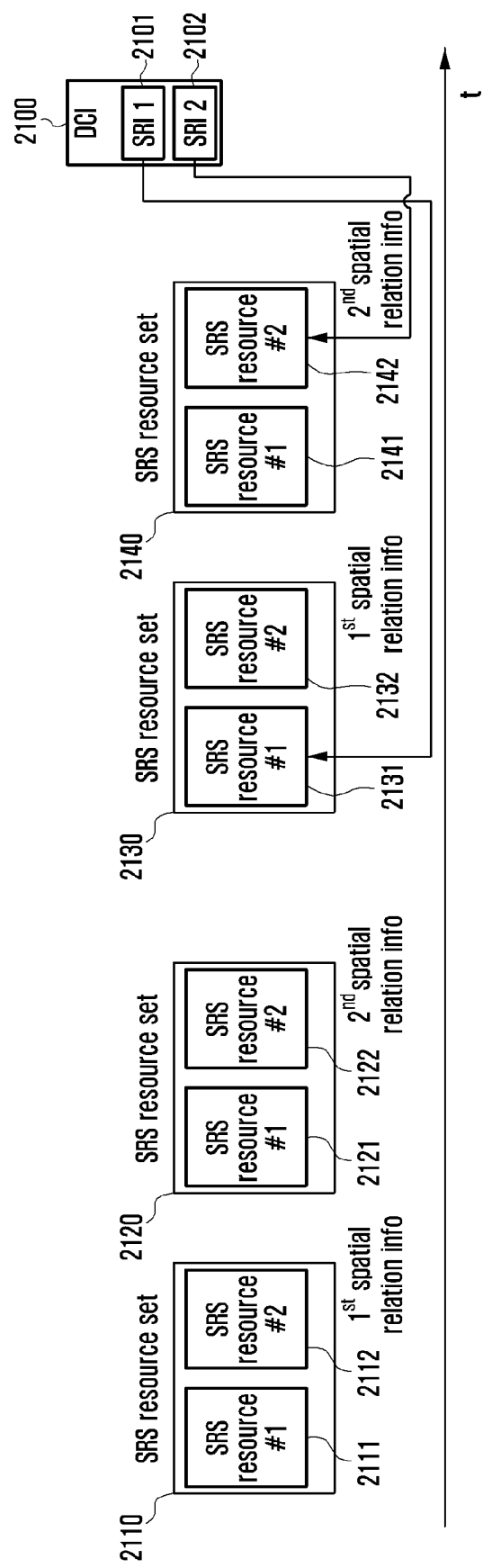
FIG. 21 illustrates a method of determining the relation between an SRI and an SRS resource for PUSCH repetitive transmission based on multiple TRPs using one SRS resource set including SRS resources configured as two pieces of spatial relation info according to an embodiment of the disclosure.

FIG. 21 illustrates a method of determining the relation between the SRI and the SRS resource for PUSCH repetitive transmission based on multiple TRPs using one SRS resource set including SRS resources configured as two pieces of spatial relation info.

Referring to FIG. 21, the UE may receive DCI 2100 for performing scheduling from the BS. At this time, the DCI may indicate two SRIs 2101 and 2102. FIG. 21 illustrates a PUSCH repetitive transmission method considering multiple TRPs based on single DCI. However, like in the method based on multiple DCI, SRI #1 2101 and SRI #2 2102 may be indicated through different DCI. When SRI #1 2101 is a value indicating SRS resource #1, SRI #1 2101 may be selected by the BS from among SRS resources of the SRS resource set transmitted as the first spatial relation info. The UE may understand that SRS resource #1 2131 corresponding SRI #1 2101 is indicated among SRS resources 2131 and 2132 of the SRS resource set 2130 transmitted as the first spatial relation info among the SRS resource sets 2130 or 2140 which the UE most recently transmitted before receiving the DCI 2100 including SRI #1 2101. When SRI #2 2102 is a value indicating SRS resource #2, SRI #2 2102 may be selected by the BS from among SRS resources of the SRS resource set transmitted as the second spatial relation info. The UE may understand that SRS resource #2 2142 corresponding SRI #2 2102 is indicated among SRS resources 2141 and 2142 of the SRS resource set 2140 transmitted as the second spatial relation info among the SRS resource sets 2130 or 2140 which the UE most recently transmitted before receiving the DCI 2100 including SRI #2 2102. Meanwhile, FIG. 21 illustrates the operation based on single DCI, but the DCI including respective SRI is distinguished even when the operation based on multiple DCI is performed, and thus the embodiment may be applied.

Embodiment 2-4: Method of Determining Relation Between SRI and SRS Resource for PUSCH Repetitive Transmission Based on Configured Grant Considering Multiple TRPs As an embodiment of the disclosure, embodiment 2-4 describes a method of determining the relation between the SRI and the SRS resource in configured grant-based PUSCH repetitive transmission considering multiple TRPs.

The configured grant PUSCH may be divided into semi-statically supporting type 1 and semi-persistently supporting type 2. In type 1, a higher-layer parameter rrc-ConfigureUplinkGrant is configured. The higher-layer parameter rrc-ConfiguredUplinkGrant may include parameters for configured grant-based PUSCH transmission such as resource allocation information of time and frequency domains, an antenna port, DMRS information, precoder and layer information, an SRI, an MCS, a TBS, and frequency hopping information. That is, in configured grant type 1 PUSCH transmission, the PUSCH is transmitted on the basis of higher-layer configuration information. On the other hand, in type 2, the UE does not receive a configuration of rrc-ConfiguredUplinkGrant for configured grant PUSCH transmission but may receive an indication of whether to activate configured grant type 2 PUSCH transmission, resources, and an SRI through DCI.

In NR Release 16, after an uplink grant for configured grant type 1 is configured, an MAC entity considers that an Nth grant is generated in a symbol derived according to [Equation 7] below. Further, the UE may transmit a configured grant type 1 PUSCH according to the Nth grant derived from [Equation 7]/

$$[(SFN \times numberOfSlotsPerFrame \times numberOfSymbolsPerSlot) + (\text{slot number in the frame} \times numberOfSymbolsPerSlot) + \text{symbol number in the slot}] = (timeReferenceSFN \times numberOfSlotsPerFrame \times numberOfSymbolsPerSlot + timeDomainOffset \times numberOfSymbolsPerSlot + S + N \times periodicity) \, \text{modulo} \, (1024 \times numberofSlotsPerFrame \times numberOfSymbolsPerSlot) \quad \text{[Equation 7]}$$

SFN denotes a system frame number, numberOfSlotsPerFrame denotes the number of slots per frame, numberOfSymbolsPerSlot denotes the number of symbols per slot, and S denotes a value indicating a start time point determined as SLIV or a value configured by a higher-layer parameter startSymbol. Parameters timeReferenceSFN and timeDomainOffset are values configured in rrc-ConfiguredUplinkGrant within the higher-layer parameter ConfiguredGrantConfig, and periodicity is a value configured within the higher-layer parameter ConfiguredGrantConfig. That is, the Nth grant may be calculated with reference to RRC parameters, and the UE may transmit the configured grant type 1 PUSCH according thereto.

Meanwhile, in NR Release 16, after an uplink grant for configured grant type 2 is configured, an MAC entity considers that an Nth grant is generated in a symbol derived according to [Equation 8] below. Further, the UE may transmit a configured grant type 2 PUSCH according to the Nth grant derived from [Equation 8].

$$[(SFN \times numberOfSlotsPerFrame \times numberOfSymbolsPerSlot) + (\text{slot number in the frame} \times numberOfSymbolsPerSot) + \text{symbol number in the}$$

slot]=(SFN$_{start\ frame}$×numberOfSlotsPerFrame×numberOfSymbolsPerSlot+slot$_{start\ time}$×numberOfSymbolsPerSlot+symbol$_{start\ time}$)+N×periodicity)modulo(1024×numberOfSlotsPerFrame×numberOfSymbolsPerSlot)  [Equation 8]

SFNstart time, slotstart time, symbolstart time denote an SFN, a slot, and a symbol of a first PUSCH transmission occasion in which the configured uplink grant is initialized or reinitialized. That is, they are values determined through DCI activating configured grant type 2 PUSCH transmission. The UE may calculate the Nth grant with reference to RRC parameters and DCI activating configured grant type 2 PUSCH transmission, and the UE may transmit the configured grant type 2 PUSCH according thereto.

When configured grant type 1 PUSCH repetitive transmission considering multiple TRPs is supported, the UE may receive a configuration of two SRIs as two higher-layer parameters srs-ResourceIndicator. At this time, two ConfigurdGrantConfig configurations may be supported or two srs-ResourceIndicator may be configured in rrc-ConfiguredUplinkGrant within one ConfiguredGrantConfig. Alternatively, the UE may configure two SRIs through RRC in order to transmit the configured grant type 1 PUSCH to two TRPs through another scheme similar thereto.

In configured grant type 1 PUSCH repetitive transmission considering multiple TRPs, SRS resources are determined through two SRIs configured by RRC. The first SRI (SRI 1) configured by RRC may be used to support TRP 1, and the second SRI (SRI 2) configured by RRC may be used to support TRP 2. At this time, the relation between the SRI configured by RRC and the SRS resource may be determined according to the SRS resource set configuration method for PUSCH repetitive transmission in consideration of multiple TRPs as described in embodiments 2-1 to 2-3. When configured grant type 1 PUSCH repetitive transmission considering multiple TRPs is supported by two SRS resource sets, the UE may detect that an SRS resource of SRS resource set #1 and an SRS resource of SRS resource set #2 which satisfy one of the following conditions according to a UE capability are indicated as SRI 1 and SRI 2 in order to repeatedly transmit initial (N=0) configured grant type 1 PUSCH after the RRC configuration:

Condition 1-1: an SRS resource corresponding to SRI 1 within most recently transmitted SRS resource set #1 and an SRS resource corresponding to SRI 2 within most recently transmitted SRS resource set #2 among SRS resource sets #1 and #2 transmitted by the UE before initial (N=0) configured grant type 1 PUSCH repetitive transmission after the RRC configuration Condition 1-2: an SRS resource corresponding to SRI 1 within most recently transmitted SRS resource set #1 which satisfies a minimum interval for PUSCH transmission and an SRS resource corresponding to SRI 2 within most recently transmitted SRS resource set #2 which satisfies a minimum interval for PUSCH transmission among SRS resource sets #1 and #2 transmitted by the UE before initial (N=0) configured grant type 1 PUSCH repetitive transmission after the RRC configuration; The minimum interval may be defined with reference to a PUSCH preparation procedure time required for preparing PUSCH transmission by the UE.

Condition 1-3: an SRS resource corresponding to SRI 1 within most recently transmitted SRS resource set #1 and an SRS resource corresponding to SRI 2 within most recently transmitted SRS resource set #2 among SRS resource sets #1 and #2 transmitted by the UE before a symbol derived for an uplink grant having N=0 from [Equation 7] after the RRC configuration When configured grant type 1 PUSCH repetitive transmission considering multiple TRPs is supported by one SRS resource set including SRS resources configured as one spatial relation info, SRS resources within the SRS resource set which satisfies one of the following conditions according to a UE capability are indicated as SRI 1 and SRI 2 in order to repeatedly transmit the initial (N=0) configured grant type 1 PUSCH after the RRC configuration:

Condition 2-1: an SRS resource corresponding to SRI 1 and an SRS resource corresponding to SRI 2 within the most recently transmitted SRS resource set among SRS resource sets transmitted by the UE before initial (N=0) configured grant type 1 PUSCH repetitive transmission after the RRC configuration Condition 2-2: an SRS resource corresponding to SRI 1 and an SRS resource corresponding to SRI 2 within the most recently transmitted SRS resource which satisfies a minimum interval for PUSCH transmission set among SRS resource sets transmitted by the UE before initial (N=0) configured grant type 1 PUSCH repetitive transmission after the RRC configuration The minimum interval may be defined with reference to a PUSCH preparation procedure time required for preparing PUSCH transmission by the UE.

Condition 2-3: an SRS resource corresponding to SRI 1 and an SRS resource corresponding to SRI 2 within the most recently transmitted SRS resource set among SRS resource sets transmitted by the UE before a symbol derived for the uplink grant having N=0 from [Equation 7] after the RRC configuration When configured grant type 1 PUSCH repetitive transmission considering multiple TRPs is supported by one SRS resource set including SRS resources configured as two pieces of spatial relation info, the UE may detect that SRS resources within the SRS resource set which satisfies one of the following conditions according to a UE capability are indicated as SRI 1 and SRI 2 in order to repeatedly transmit the initial (N=0) configured grant type 1 PUSCH after the RRC configuration:

Condition 3-1: an SRS resource corresponding to SRI 1 within an SRS resource set most recently transmitted as first spatial relation info and an SRS resource corresponding to SRI 2 within an SRS resource set most recently transmitted as second spatial relation info among SRS resource sets transmitted by the UE before initial (N=0) configured grant type 1 PUSCH repetitive transmission after the RRC configuration Condition 3-2: an SRS resource corresponding to SRI 1 within an SRS resource set most recently transmitted as first spatial relation info, which satisfies a minimum interval for PUSCH transmission, and an SRS resource corresponding to SRI 2 within an SRS resource set most recently transmitted as second spatial relation info, which satisfies a minimum interval for PUSCH transmission, among SRS resource sets transmitted by the UE before initial (N=0) configured grant type 1 PUSCH repetitive transmission after the RRC configuration The minimum time interval may be defined with reference to a PUSCH preparation procedure time required for preparing PUSCH transmission by the UE.

Condition 3-3: an SRS resource corresponding to SRI 1 within an SRS resource set most recently transmitted as first spatial relation info and an SRS resource corresponding to SRI 2 within an SRS resource set most recently transmitted as second spatial relation info among SRS resource sets transmitted by the UE before a symbol derived for the uplink grant having N=0 from [Equation 7] after the RRC configuration After the initial (N=0) configured grant type 1 PUSCH is repeatedly transmitted after the RRC configuration, the configured grant type 1 PUSCH may be repeatedly transmitted in every period configured by RRC. The relation between the SRI and the SRS resource for repetitive transmission after the initial configured grant type 1 PUSCH repetitive transmission may be determined according to the following options:

Option 1: an SRS resource referenced when the initial (N=0) configured grant type 1 PUSCH is repeatedly transmitted is used for configured grant type 1 PUSCH repetitive transmission thereafter.

Option 2: SRS resources indicated for two SRIs are newly determined through the same method of selecting the relation between the SRI and the SRS resource for initial (N=0) configured grant type 1 PUSCH repetitive transmission on the basis of a time at which configured grant type 1 PUSCH repetitive transmission starts.

Option 3: a symbol for an uplink grant having N>0 is derived from [Equation 7] after the RRC configuration. Thereafter, SRS resources indicated for two SRIs are newly determined through the same method of selecting the relation between the SRI and the SRS resource for initial (N=0) configured grant type 1 PUSCH repetitive transmission on the basis of the derived symbol. That is, SRS resources indicated for two SRIs are newly determined through one method among the above-described methods according to an SRS resource among SRS resource set(S) transmitted by the UE before the symbol derived for the uplink grant having N>0 from [Equation 7] after the RRC configuration and an SRS resource configuration method.

In configured grant type 2 PUSCH repetitive transmission considering multiple TRPs, SRS resources are determined through two SRIs indicated by DCI activating transmission. The first SRI (SRI 1) indicated by activation DCI may be used for supporting TRP 1, and the second SRI (SRI 2) indicated by activation DCI may be used for supporting TRP 2. At this time, the relation between the SRI configured by RRC and the SRS resource may be determined according to the SRS resource set configuration method for PUSCH repetitive transmission in consideration of multiple TRPs as described in embodiments 2-1 to 2-3. When configured grant type 2 PUSCH repetitive transmission considering multiple TRPs is supported by two SRS resource sets, the UE may detect that an SRS resource of SRS resource set #1 and an SRS resource of SRS resource set #2 which satisfy one of the following conditions according to a UE capability are indicated as SRI 1 and SRI 2 in order to repeatedly transmit initial (N=0) configured grant type 2 PUSCH after reception of activation DCI:

Condition 1-1: an SRS resource corresponding to SRI 1 within most recently transmitted SRS resource set #1 and an SRS resource corresponding to SRI 2 within most recently transmitted SRS resource set #2 among SRS resource sets #1 and #2 transmitted by the UE before reception of activation DCI Condition 1-2: an SRS resource corresponding to SRI 1 within most recently transmitted SRS resource set #1 which satisfies a minimum interval for PUSCH transmission and an SRS resource corresponding to SRI 2 within most recently transmitted SRS resource set #2 which satisfies a minimum interval for PUSCH transmission among SRS resource sets #1 and #2 transmitted by the UE before reception of activation DCI The minimum time interval may be defined with reference to a PUSCH preparation procedure time required for preparing PUSCH transmission by the UE.

Condition 1-3: an SRS resource corresponding to SRI 1 within most recently transmitted SRS resource set #1 and an SRS resource corresponding to SRI 2 within most recently transmitted SRS resource set #2 among SRS resource sets #1 and #2 transmitted by the UE before a symbol derived for an uplink grant having N=0 from [Equation 8] after the RRC configuration and reception of activation DCI When configured grant type 2 PUSCH repetitive transmission considering multiple TRPs is supported by one SRS resource set including SRS resources configured as one piece of spatial relation info, SRS resources within the SRS resource set which satisfies one of the following conditions according to a UE capability are indicated as SRI 1 and SRI 2 in order to repeatedly transmit the initial (N=0) configured grant type 2 PUSCH after reception of activation DCI:

Condition 2-1: an SRS resource corresponding to SRI 1 and an SRS resource corresponding to SRI 2 within the most recently transmitted SRS resource set among SRS resource sets transmitted by the UE before reception of activation DCI Condition 2-2: an SRS resource corresponding to SRI 1 and an SRS resource corresponding to SRI 2 within the most recently transmitted SRS resource set, which satisfies a minimum interval for PUSCH transmission. among SRS resource sets transmitted by the UE before reception of activation DCI. The minimum time interval may be defined with reference to a PUSCH preparation procedure time required for preparing PUSCH transmission by the UE.

Condition 2-3: an SRS resource corresponding to SRI 1 and an SRS resource corresponding to SRI 2 within the most recently transmitted SRS resource set among SRS resource sets transmitted by the UE before a symbol derived for the uplink grant having N=0 from [Equation 8] after the RRC configuration and reception of activation DCI When configured grant type 2 PUSCH repetitive transmission considering multiple TRPs is supported by one SRS resource set including SRS resources configured as two pieces of spatial relation info, SRS resources within the SRS resource set which satisfies one of the following conditions according to a UE capability are indicated as SRI 1 and SRI 2 in order to repeatedly transmit the initial (N=0) configured grant type 2 PUSCH after reception of activation DCI:

Condition 3-1: an SRS resource corresponding to SRI 1 within an SRS resource set most recently transmitted as first spatial relation info and an SRS resource corresponding to SRI 2 within an SRS resource set most recently transmitted as second spatial relation info among SRS resource sets transmitted by the UE before reception of activation DCI Condition 3-2: an SRS resource corresponding to SRI 1 within an SRS resource set most recently transmitted as first spatial relation info, which satisfies a minimum interval for PUSCH transmission, and an SRS resource corresponding to SRI 2 within an SRS resource set most recently transmitted as second spatial relation info, which satisfies a minimum interval for PUSCH transmission, among SRS resource sets transmitted by the UE before reception of activation DCI The minimum time interval may be defined with reference to a PUSCH preparation procedure time required for preparing PUSCH transmission by the UE.

Condition 3-3: an SRS resource corresponding to SRI 1 within an SRS resource set most recently transmitted as first spatial relation info and an SRS resource corresponding to SRI 2 within an SRS resource set most recently transmitted as second spatial relation info among SRS resource sets transmitted by the UE before a symbol derived for the uplink grant having N=0 from [Equation 8] after the RRC configuration and reception of activation DCI After the initial (N=0) configured grant type 2 PUSCH is repeatedly transmitted after reception of activation DCI, the configured grant type 2 PUSCH may be repeatedly transmitted in every period configured by RRC. The relation between the SRI and the SRS resource for repetitive transmission (N>0) after the initial (N=0) repetitive transmission may be determined according to the following options.

Option 1: an SRS resource referenced when the initial (N=0) configured grant type 2 PUSCH is repeatedly transmitted is used for repetitive transmission thereafter.

Option 2: SRS resources indicated for two SRIs are newly determined through the same method of selecting the relation between the SRI and the SRS resource for initial (N=0) configured grant type 2 PUSCH repetitive transmission on the basis of a time at which configured grant type 2 PUSCH repetitive transmission starts.

Option 3: a symbol for an uplink grant having N>0 is derived from [Equation 8] after the RRC configuration and reception of activation DCI. Thereafter, SRS resources indicated for two SRIs are newly determined through the same method of selecting the relation between the SRI and the SRS resource for initial (N=0) configured grant type 2 PUSCH repetitive transmission on the basis of the derived symbol. That is, SRS resources indicated for two SRIs are newly determined through one method among the above-described methods according to an SRS resource among SRS resource set(S) transmitted by the UE before the symbol derived for the uplink grant having N>0 from [Equation 8] and an SRS resource configuration method.

Figure 22:
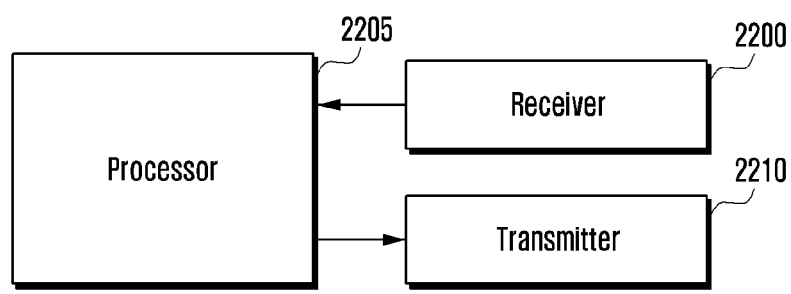
FIG. 22 illustrates a structure of the UE in a wireless communication system according to an embodiment of the disclosure.

FIG. 22 illustrates a structure of the UE in a wireless communication system according to an embodiment of the disclosure.

Referring to FIG. 22, the UE may include a transceiver including a receiver 2200 and a transmitter 2210, a memory (not shown), and a processing unit 2205 (or a controller or a processor). According to the communication method of the UE, the transceiver 2200 and 2210, the memory, and the processing unit 2205 of the UE may operate. However, the elements of the UE are not limited to the above example. For example, the UE may include more or fewer elements than the above elements. Further, the transceiver, the memory, and the processor may be implemented in the form of a single chip.

The transceiver may transmit and receive a signal to and from the BS. The signals may include control information and data. To this end, the transceiver may include an RF transmitter for up-converting and amplifying a frequency of the transmitted signal and an RF receiver for low-noise amplifying the received signal and down-converting the frequency. However, this is only an example of the transceiver, and elements of the transceiver are not limited to the RF transmitter and the RF receiver.

Further, the transceiver may receive a signal through a radio channel, output the signal to the processor, and transmit the signal output from the processor through the radio channel.

The memory may store a program and data required for the operation of the UE. Further, the memory may store control information or data included in the signal transmitted and received by the UE. The memory may be configured by storage media such as ROM, RAM, hard disc, CD-ROM, and DVD, or a combination of the storage media. The number of memories may be plural.

The processor 2205 may control a series of processes to allow the UE to operate according to the above-described embodiments. For example, the processor 2205 may control elements of the UE to receive DCI including two layers and simultaneously receive a plurality of PDSCHs. The number of processors may be plural, and the processor may perform an operation of controlling the elements of the UE by executing the program stored in the memory.

Figure 23:
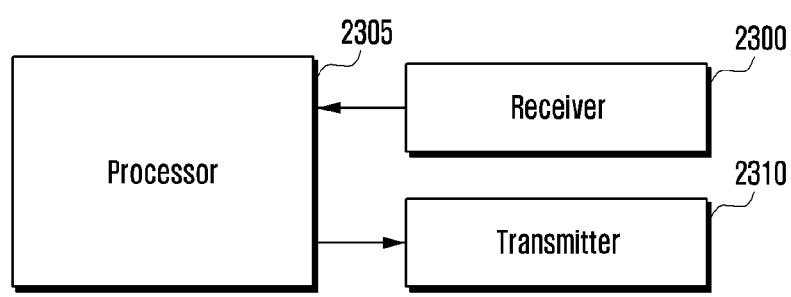
FIG. 23 illustrates a structure of the BS in a wireless communication system according to an embodiment of the disclosure.

FIG. 23 illustrates a structure of the BS in a wireless communication system according to an embodiment of the disclosure.

Referring to FIG. 23, the BS may include a transceiver including a receiver 2300 and a transmitter 2310, a memory (not shown), and a processing unit 2305 (or a BS controller or processor). According to the communication method of the BS, the transceiver 2300 and 2310, the memory, and the processing unit 2305 of the BS may operate. However, the elements of the BS are not limited to the above example. For example, the BS may include more or fewer elements than the above-described elements. Further, the transceiver, the memory, and the processor may be implemented in the form of a single chip.

The transceiver may transmit and receive a signal to/from the UE. The signals may include control information and data. To this end, the transceiver may include an RF transmitter for up-converting and amplifying a frequency of the transmitted signal and an RF receiver for low-noise amplifying the received signal and down-converting the frequency. However, this is only an example of the transceiver, and elements of the transceiver are not limited to the RF transmitter and the RF receiver.

The transceiver may receive a signal through a radio channel, output the signal to the processor, and transmit the signal output from the processor through the radio channel.

The memory may store a program and data required for the operation of the BS. The memory may store control information or data included in a signal transmitted and received by the BS. The memory may be configured by storage media such as ROM, RAM, hard disc, CD-ROM, and DVD, or a combination of the storage media. The number of memories may be plural.

The processor 2305 may control a series of processors to allow the BS to operate according to the embodiments of the disclosure. For example, the processor 23-05 may configure DCI of two layers including allocation information of a plurality of PDSCHs and control each element of the BS to transmit the DCI. The number of processors 23-05 may be plural and the processor 2305 may perform an operation of controlling the elements of the BS by executing programs stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Further, although the above embodiments have been presented on the basis of FDD LTE systems, other variants based on the technical idea of the embodiments may also be implemented in other systems such as TDD LTE, 5G, NR, or other systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in the methods of the disclosure, some or all of the contents included in each embodiment may be implemented in combination without departing from the essential spirit and scope of the disclosure.

Various embodiments of the disclosure have been described, The above description of the disclosure is for the purpose of illustration, and embodiments of the disclosure are not limited to the embodiments set forth herein. Those skilled in the art will appreciate that other specific modifications and changes may be easily made thereto the without departing from the technical idea or essential features of the disclosure. The scope of the disclosure is defined not by the above description but by the appended claims to be described below, and all modifications or changes derived from the meaning and scope of the claims and equivalent concepts thereof shall be construed as falling within the scope of the disclosure.

The invention claimed is:

1. A method performed by a user equipment (UE) in a wireless communication system, the method comprising: receiving, from a base station, a radio resource control (RRC) message including configuration information on a first sounding reference signal (SRS) resource set and a second SRS resource set; receiving, from the base station, downlink control information (DCI) on a physical downlink control channel (PDCCH) including a first SRS resource indicator (SRI) field and a second SRI field; and applying the first SRI and the second SRI to one or more physical uplink shared channel (PUSCH) repetitions, wherein the first SRI is associated with a most recent transmission of an SRS resource related to the first SRS resource set before the PDCCH, and wherein the second SRI is associated with a most recent transmission of an SRS resource related to the second SRS resource set before the PDCCH.

2. The method of claim 1, wherein the applying the first SRI and the second SRI to one or more PUSCH repetitions further comprises: applying the first SRI to one or more PUSCH repetitions associated with the first SRS resource set.

3. The method of claim 1, wherein the applying the first SRI and the second SRI to one or more PUSCH repetitions further comprises: applying the second SRI to one or more PUSCH repetitions associated with the second SRS resource set.

4. The method of claim 1, wherein the first SRS resource set is used for codebook based transmission or non-codebook based transmission, and wherein the second SRS resource set is used for codebook based transmission or non-codebook based transmission.

5. A method performed by a base station in a wireless communication system, the method comprising: transmitting, to a user equipment (UE), a radio resource control (RRC) message including configuration information on a first sounding reference signal (SRS) resource set and a second SRS resource set; and transmitting, to the UE, downlink control information (DCI) on a physical downlink control channel (PDCCH) including a first SRS resource indicator (SRI) field and a second SRI field, wherein the first SRI and the second SRI are applied to one or more physical uplink shared channel (PUSCH) repetitions, wherein the first SRI is associated with a most recent transmission of an SRS resource related to the first SRS resource set before the PDCCH, and wherein the second SRI is associated with a most recent transmission of an SRS resource related to the second SRS resource set before the PDCCH.

6. The method of claim 5, wherein the first SRI is applied to one or more PUSCH repetitions associated with the first SRS resource set.

7. The method of claim 5, wherein the second SRI is applied to one or more PUSCH repetitions associated with the second SRS resource set.

8. The method of claim 5, wherein the first SRS resource set is used for codebook based transmission or non-codebook based transmission, and wherein the second SRS resource set is used for codebook based transmission or non-codebook based transmission.

9. A user equipment (UE) in a communication system, the UE comprising: a transceiver; and a controller configured to: receive, from a base station, a radio resource control (RRC) message including configuration information on a first sounding reference signal (SRS) resource set and a second SRS resource set; receive, from the base station, downlink control information (DCI) on physical downlink control channel (PDCCH) including a first SRS resource indicator (SRI) field and a second SRI field; and apply the first SRI and the second SRI to one or more physical uplink shared channel (PUSCH) repetitions, wherein the first SRI is associated with a most recent transmission of an SRS resource related to the first SRS resource set before the PDCCH, and wherein the second SRI is associated with a most recent transmission of an SRS resource related to the second SRS resource set before the PDCCH.

10. The UE of claim 9, wherein the first SRI is applied to one or more PUSCH repetitions associated with the first SRS resource set.

11. The UE of claim 9, wherein the second SRI is applied to one or more PUSCH repetitions associated with the second SRS resource set.

12. The UE of claim 9, wherein the first SRS resource set is used for codebook based transmission or non-codebook based transmission, and wherein the second SRS resource set is used for codebook based transmission or non-codebook based transmission.

13. A base station (BS) in a communication system, the BS comprising: a transceiver; and a controller configured to: transmit, to a user equipment (UE), a radio resource control (RRC) message including configuration information on a first sounding reference signal (SRS) resource set and a second SRS resource set; and transmit, to the UE, downlink control information (DCI) on a physical downlink control channel (PDCCH) including a first SRS resource indicator (SRI) field and a second SRI field, wherein the first SRI and the second SRI are applied to one or more physical uplink shared channel (PUSCH) repetitions, wherein the first SRI is associated with a most recent transmission of an SRS resource related to the first SRS resource set before the PDCCH, and wherein the second SRI is associated with a most recent transmission of an SRS resource related to the second SRS resource set befor the PDCCH.

14. The BS of claim 13, wherein the first SRI is applied to one or more PUSCH repetitions associated with the first SRS resource set, and wherein the second SRI is applied to one or more PUSCH repetitions associated with the second SRS resource set.

15. The BS of claim 13, wherein the first SRS resource set is used for codebook based transmission or non-codebook based transmission, and wherein the second SRS resource set is used for codebook based transmission or non-codebook based transmission.

* * * * *